US008535492B2

(12) United States Patent
Matthews

(10) Patent No.: US 8,535,492 B2
(45) **Date of Patent: *Sep. 17, 2013**

(54) SYSTEM AND METHOD FOR ISOTOPE SELECTIVE CHEMICAL REACTIONS

(76) Inventor: Mehlin Dean Matthews, Saratoga, CA (US)

( * ) Notice: Subject to any disclaimer, the term of this patent is extended or adjusted under 35 U.S.C. 154(b) by 884 days.

This patent is subject to a terminal disclaimer.

(21) Appl. No.: 12/193,510

(22) Filed: Aug. 18, 2008

(65) Prior Publication Data

US 2009/0134017 A1 May 28, 2009

Related U.S. Application Data

(63) Continuation-in-part of application No. 12/109,792, filed on Apr. 25, 2008, now Pat. No. 8,043,486, which is a continuation-in-part of application No. 12/036,282, filed on Feb. 24, 2008.

(60) Provisional application No. 60/990,913, filed on Nov. 28, 2007.

(51) Int. Cl.

| | |
|---|---|
| ***C25B 9/04*** | (2006.01) |
| *B03C 1/00* | (2006.01) |
| *B03C 9/00* | (2006.01) |
| *G01N 27/00* | (2006.01) |

(52) U.S. Cl.
USPC ... 204/230.5; 204/155; 204/156; 204/157.15; 204/157.2; 204/157.21; 204/230.8; 204/557; 205/46

(58) Field of Classification Search
USPC ............ 204/DIG. 8, 155, 156, 157.2, 157.21, 204/230.2–230.8, 449, 454, 457, 550, 556, 204/557, 545, 157.15; 205/43–49
See application file for complete search history.

(56) References Cited

U.S. PATENT DOCUMENTS

| | | | | |
|---|---|---|---|---|
| 2,835,687 | A * | 5/1958 | Clewett et al. | 534/11 |
| 4,082,633 | A * | 4/1978 | Eerkens | 204/157.22 |
| 4,514,377 | A * | 4/1985 | Symons et al. | 204/157.21 |
| 4,624,766 | A * | 11/1986 | Boxall et al. | 204/294 |
| 4,668,338 | A * | 5/1987 | Maydan et al. | 438/714 |
| 4,668,925 | A * | 5/1987 | Towatari et al. | 333/219.1 |
| 4,786,478 | A * | 11/1988 | Ahmed et al. | 422/186.03 |
| 5,630,949 | A * | 5/1997 | Lakin | 216/61 |
| 5,795,452 | A * | 8/1998 | Kinoshita et al. | 204/298.37 |
| 6,211,749 | B1 * | 4/2001 | Yuzurihara et al. | 333/17.3 |
| 6,323,455 | B1 * | 11/2001 | Bailey et al. | 219/121.59 |

(Continued)

OTHER PUBLICATIONS

Radio Frequency and Antenna Fundamentals. Chapter 2. CCRI. Retrived online Apr. 29, 2013.*

*Primary Examiner* — Nicholas A Smith
*Assistant Examiner* — Ciel Thomas
(74) *Attorney, Agent, or Firm* — M. Dean Matthews

(57) ABSTRACT

A system providing selective spin modification and reaction in an electrolytic cell. An electrolytic cell is coupled to a magnet that provides a level-splitting magnetic field in a region of electrolyte adjacent to a working electrode, thus establishing a spin resonance for an unpaired electron associated with a chemical species in the region of electrolyte adjacent to the working electrode. The working electrode carries an excitation current produced by a switching source or amplifier. The excitation current produces an alternating magnetic field adjacent to the working electrode that alters the spin state population density for the unpaired electron associated with a chemical species within the electrolyte, thereby enhancing or inhibiting the reaction of the chemical species during subsequent electrolysis.

26 Claims, 57 Drawing Sheets

(56) References Cited

U.S. PATENT DOCUMENTS 6,589,410 B1 * 7/2003 Shoji et al. .................... 204/426
2003/0212516 A1 * 11/2003 Ulrich ............................ 702/60
2005/0248340 A1 * 11/2005 Berkcan et al. ............... 324/259
2009/0134006 A1 * 5/2009 Matthews ..................... 204/155

* cited by examiner

600

700

1401

2100

2600

2700

SYSTEM AND METHOD FOR ISOTOPE SELECTIVE CHEMICAL REACTIONS

CROSS-REFERENCE TO RELATED APPLICATIONS

This application is a continuation in part of U.S. application Ser. No. 12/109,792, now U.S. Pat. No. 8,043,486, filed Apr. 25, 2008, which in turn is a continuation in part of U.S. application Ser. No. 12/036,282, filed Feb. 24, 2008 claiming priority of U.S. application Ser. No. 60/990,913, filed Nov. 28, 2007. This application also claims priority of U.S. application Ser. No. 60/990,913, filed Nov. 28, 2007. This application is also related to U.S. application Ser. No. 11/564,855, now U.S. Pat. No. 7,879,216, filed Nov. 30, 2006, and to U.S. application Ser. No. 11/439,932, now U.S. Pat. No. 7,879,206, filed May 23, 2006; which are herein expressly incorporated by reference in their entirety.

BACKGROUND OF THE INVENTION

1. Field of the Invention

This invention relates to chemical reactions. In particular, the invention relates to the application of dynamic spin chemistry to electrolytic processes.

2. Description of Related Art

Since its discovery in 1944, Electron Spin Resonance (ESR) or Electron Paramagnetic Resonance (EPR), has been used to study chemical species having at least one unpaired electron. The combination of an applied DC magnetic field and electromagnetic radiation provides a resonant transition between two energy levels that allows for characterization of free radicals and their reactions.

In 1976-77, the Magnetic Isotope Effect (MIE) was discovered by Anatoly L. Buchachenko and others during investigation of the photolysis of dibenzyl ketone and benzoyl peroxide. In these particular cases, the MIE was due to a difference in spin evolution between radical pairs, depending upon whether the radical contained $^{13}C$ or $^{12}C$. Nicholas J. Turro subsequently determined that the behavior of radical pairs could be modified by the use of micelles, thus enhancing the MIE.

Further research led by Buchachenko resulted in the discovery of the MIE for uranium in 1989. It has been shown that uranyl photoreduction by phenols is a spin-selective reaction. A uranium MIE has been determined in two uranyl photosensitized reactions: the oxidation of phenols and the decomposition of oxalic acid. Buchachenko and Khudyakov estimated a single stage separation factor of A=1.02 for the MIE, which exceeds their estimate of 1.006 for the classical mass isotope effect (CIE).

Buchachenko was involved in both the theoretical development (1981) of the Microwave Induced Magnetic Isotope Effect and its demonstration by the enhancement of MIE in dibenzyl ketone through microwave pumping in 1991. Microwave pumping has typically involved irradiation of a physically confined volume of solution. Since its discovery, application of the MIE has been focused on the use of micelles or other confinement techniques for radical pairs, and on the use of microwave radiation as a pumping source. Spin modification of chemical reactions through magnetic pumping may be applied to both magnetic and nonmagnetic compounds.

Aqueous electrolytes, aprotic solvents, room temperature ionic liquids (RTILs) and other fluids provide a wide base for the development of magnetically pumped electrolytic processes. For example, there are a limited number of volatile uranium compounds that may be used in laser, diffusion and centrifuge processes, but the combination of electrochemistry and dynamic spin chemistry offers a vast number of systems for the investigation of enhanced uranium enrichment and nuclear fuel reprocessing.

In general, the great variety and complexity of electrochemical systems precludes a comprehensive theoretical model of their behavior, and thus empirical methods must be relied on to a considerable extent. In the investigation of magnetic pumping of electrolytic reactions, it is desirable to have a compact inexpensive instrument for evaluating spin modification of electrochemical reactions so that research involvement is not limited by capital equipment requirements or space. For example, a tabletop system that can be constructed with readily available parts would minimize the barriers confronting potential investigators, allowing individuals of modest means to contribute to the development of the uranium enrichment and nuclear fuel reprocessing technologies.

In 2001, Buchachenko wrote "Besides the many factors controlling nuclear spin selectivity, there are two outstanding and highly promising but not yet properly exploited, microwave induced MIE and dimensionality." Significantly, although the MIE for uranium and other elements has been established, an efficient approach to enhancement by microwave pumping has not been developed. Thus, there is a need for a system and method for providing efficient microwave pumping of unpaired electrons involved in chemical reactions. There is also a need for a compact, inexpensive, and scalable system that may be used in both research and manufacturing.

BRIEF SUMMARY OF THE INVENTION

Accordingly, a system and method for pumping of paramagnetic species combined with selective electrolysis is described herein. A DC magnetic field and/or an oscillating magnetic field at the surface of an electrode is used to alter the redox reaction probabilities of species at the electrode surface.

In an embodiment of the present invention, an electrolytic cell has a working electrode and a counter electrode. A high frequency current source is coupled to the working electrode to provide an oscillating magnetic field at the surface of the working electrode. An electrolyzing current source is applied across the working electrode and counter electrode of the electrolytic cell to provide for selective oxidation or reduction at the working electrode. In a further embodiment, the electrolyte contact area of the working electrode is confined to a portion of a duct wall, so that it is exposed to continuous flow. The location of the electrode in a duct wall minimizes the thickness of the stagnant electrolyte layer and improves heat exchange between the working electrode and the electrolyte.

In another embodiment, one or more counter electrodes are located outside of the duct space so that inductive and capacitive coupling between the high frequency current source and the counter electrode(s) is minimized. The counter electrode(s) may be located upstream and/or downstream of the working electrode.

In yet another embodiment, a plurality of electrolytic cells may be configured in an array, with each electrolytic cell having an independent high frequency current source and a microcontroller for monitoring the cell parameters and communicating with a system controller. The microcontroller may monitor and/or control current, voltage, frequency or temperature.

In a further embodiment, the high frequency current source includes a transistor used in a capacitor-coupled common source configuration. The transistor may also be coupled to a tunable circuit for optimizing the current level and power dissipation in the electrolytic cell.

DETAILED DESCRIPTION OF THE INVENTION

The prior art of dynamic spin chemistry has been largely directed to reactions involving radical pairs that occur in bulk solutions, or within micelles or other constrained volumes. The present invention adds a new dimension by addressing the spin modification of ionic species at an electrode surface. Redox reactions at the electrode surface may be used to produce stable products from unstable intermediates that are produced by photolysis and spin modification within the interphase.

The prior art of spin modification has relied upon microwave radiation to provide the high frequency magnetic field used for pumping unpaired electrons between magnetic energy levels. In contrast, the present invention provides a high frequency magnetic field by providing a current in the redox electrode, or another conductor adjacent to the interphase of the redox electrode. Local magnetic excitation avoids the difficulties associated with radiation propagation and reduces the problems associated with high electric fields and high electric potentials.

Figure 1:
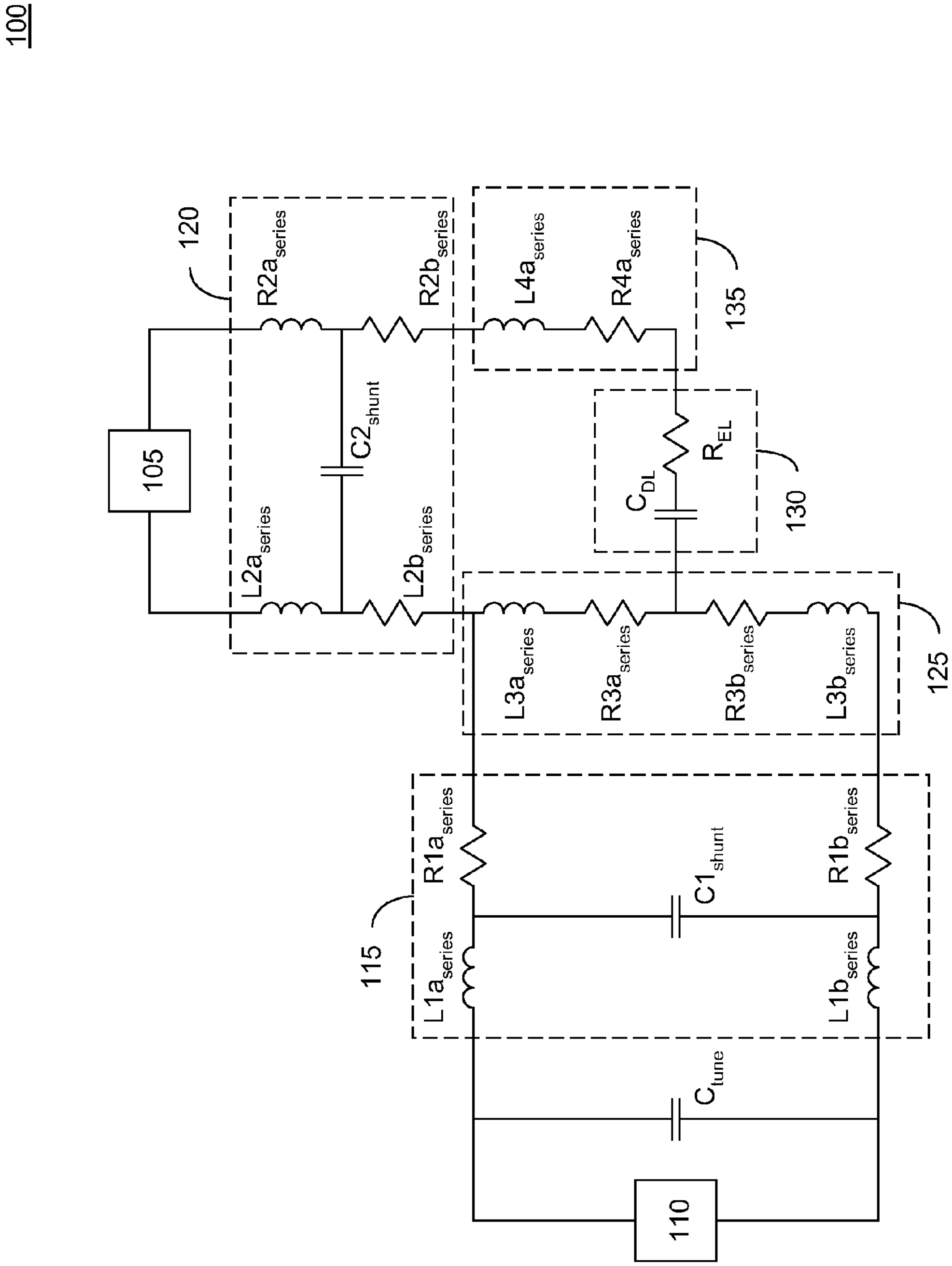
FIG. 1 shows a schematic for an electrolytic cell with a magnetic excitation source in accordance with an embodiment of the present invention.

FIG. 1 shows an electrical schematic diagram 100 for an embodiment of an electrolytic cell with a magnetic excitation source 110 coupled to a working electrode 125 by a transmission line 115. Magnetic excitation source 110 may be configured to provide a single pulse or a pulse train. When configured to provide a pulse train, magnetic excitation source 110 may be operated in a continuous wave (CW) mode. When configured to provide a single pulse, optional capacitance $C_{tune}$ may be used to establish a resonant frequency for the current flowing through magnetic excitation source 110, transmission line 115, and working electrode 125. Transmission line 115 includes a $C1_{shunt}$ that is effectively in parallel with $C_{tune}$, as well as series inductances $L1a_{series}$ and $L1b_{series}$, and series resistances $R1a_{series}$ and $R1b_{series}$. Working electrode 125 includes series inductances $L3a_{series}$ and $L3b_{series}$ and series resistances $R3a_{series}$ and $R3b_{series}$. It is preferable that the sum of $L3a_{series}$ and $L3b_{series}$ is greater than the sum of $L1a_{series}$ and $L1b_{series}$, since the magnetic excitation is provided principally by the magnetic field associated with $L3a_{series}$ and $L3b_{series}$.

A redox power supply 105 is coupled to working electrode 125 and alternate electrode 135 by a transmission line 120. Redox power supply may be a fast pulse power supply or may be operated at a selected voltage. Working electrode 125 and alternate electrode 135 correspond to an electrode assembly, and are coupled by an electrolyte 130 characterized by a double layer capacitance $C_{DL}$ and a series resistance $R_{EL}$. Alternate electrode 135 includes a series inductance $L4a_{series}$ and a series resistance $R4a_{series}$. Transmission line 120 includes a $C2_{shunt}$, series inductances $L2a_{series}$ and $L2b_{series}$, and series resistances $R2a_{series}$ and $R2b_{series}$.

The impedance of redox power supply 105, electrolyte 130, and $C2_{shunt}$ is such that the current produced by magnetic excitation source 110 is essentially limited to a single loop through working electrode 125 without flowing through the electrolyte 130 and the alternate electrode 135. This configuration reduces the damping effect of $R_{EL}$ during resonant excitation.

In an embodiment, transmission line 115 has a capacitance in excess of 400 pF per meter and an inductance of less than 50 nH per meter. The requirement for chip capacitors may be reduced by taking advantage of the inherent capacitance of the transmission line structure in resonant applications.

Figure 2:
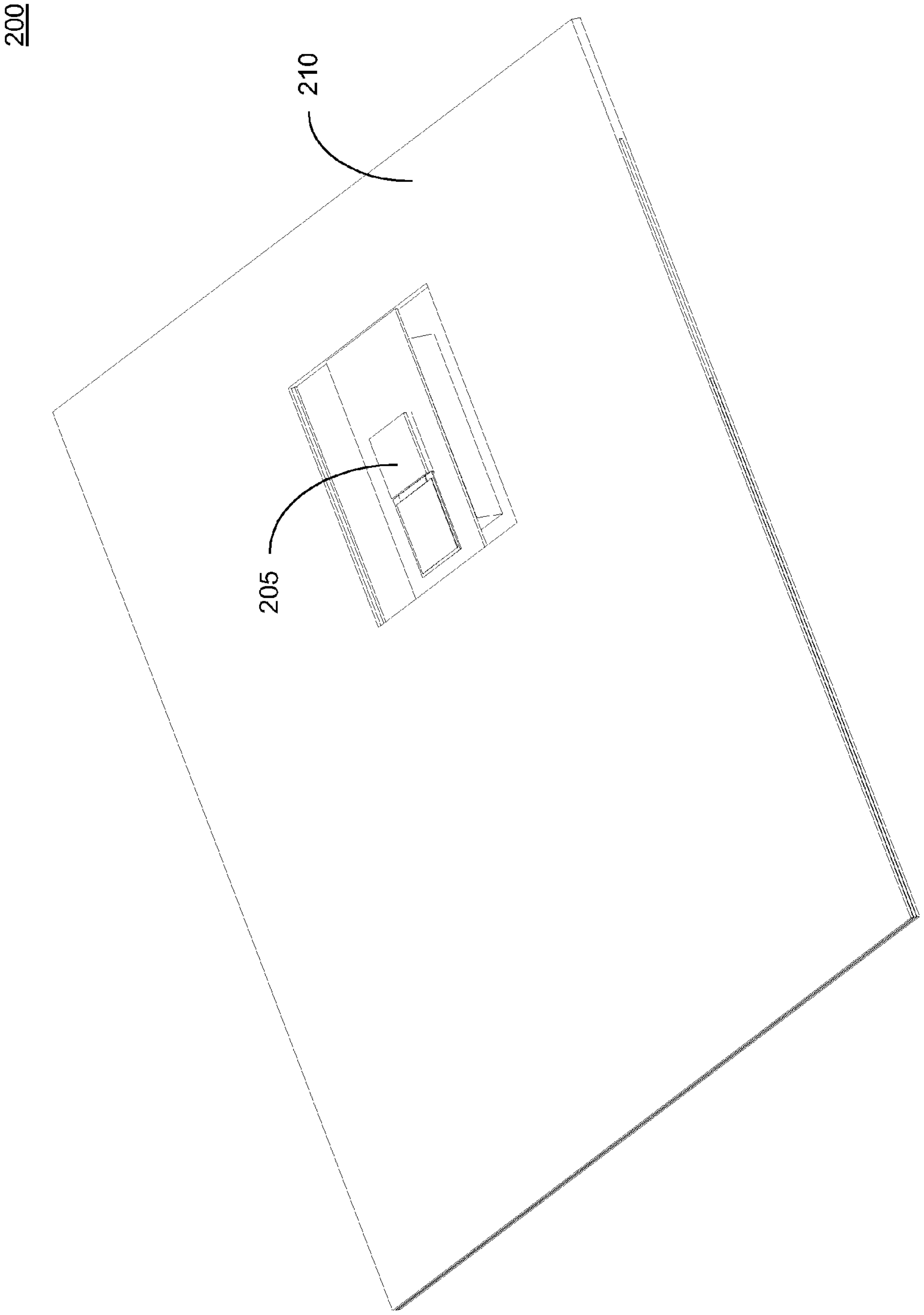
FIG. 2 shows an electrolytic cell with a magnetic excitation transmission line in accordance with an embodiment of the present invention.

FIG. 2 shows a perspective view 200 of an embodiment of an electrolytic cell 205 with a magnetic excitation transmission line 210 that corresponds with the schematic shown in FIG. 1. In this embodiment, the electrolytic cell 205 is electrically connected to the magnetic excitation transmission line 210. In other embodiments, the electrolytic cell 205 may be isolated from the magnetic excitation transmission line 210 by a thin dielectric. The use of a common working electrode that is part of both the electrolytic cell 205 and the magnetic excitation transmission line 210 generally provides for a maximum magnetic field intensity at the surface of the common working electrode. However, at high frequencies skin depth and proximity effect considerations may result in a preference for different conductive materials for the magnetic transmission line 210 and the working electrode in the electrolytic cell 205.

Figure 3:
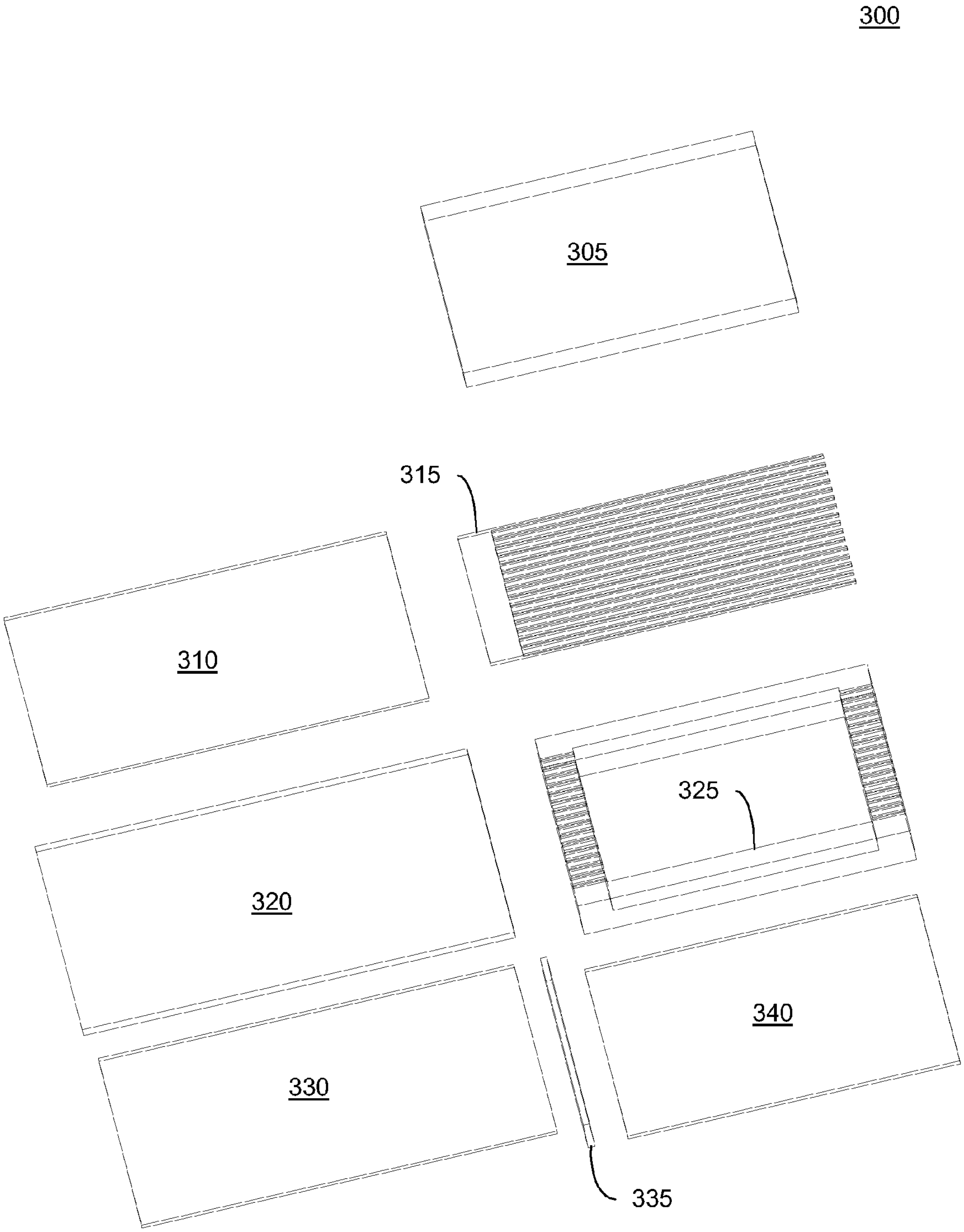
FIG. 3 shows an exploded view of the electrolytic cell of FIG. 2.

FIG. 3 shows an exploded view 300 of the electrolytic cell 205 of FIG. 2. A first plate conductor 310 and a second plate conductor are separated by a dielectric 320. The first plate conductor 310 connects to an alternate electrode 315 that is supported by a frame 325. The second plate conductor 330 is connected to a working electrode 340 by a contact 335. The working electrode 340, frame 325, and cover 305 provide an enclosure for a volume of electrolyte. Cover 305 may be transparent so that the enclosure may be illuminated. In other embodiments the discrete working electrode 340 may be omitted, with the frame 325 and contact 335 being connected to the surface of the excitation transmission line 110 in FIG. 2. Electrode 315 may be a metal conductor with apertures for light transmission, or it may be a transparent conductive coating.

Figure 4:
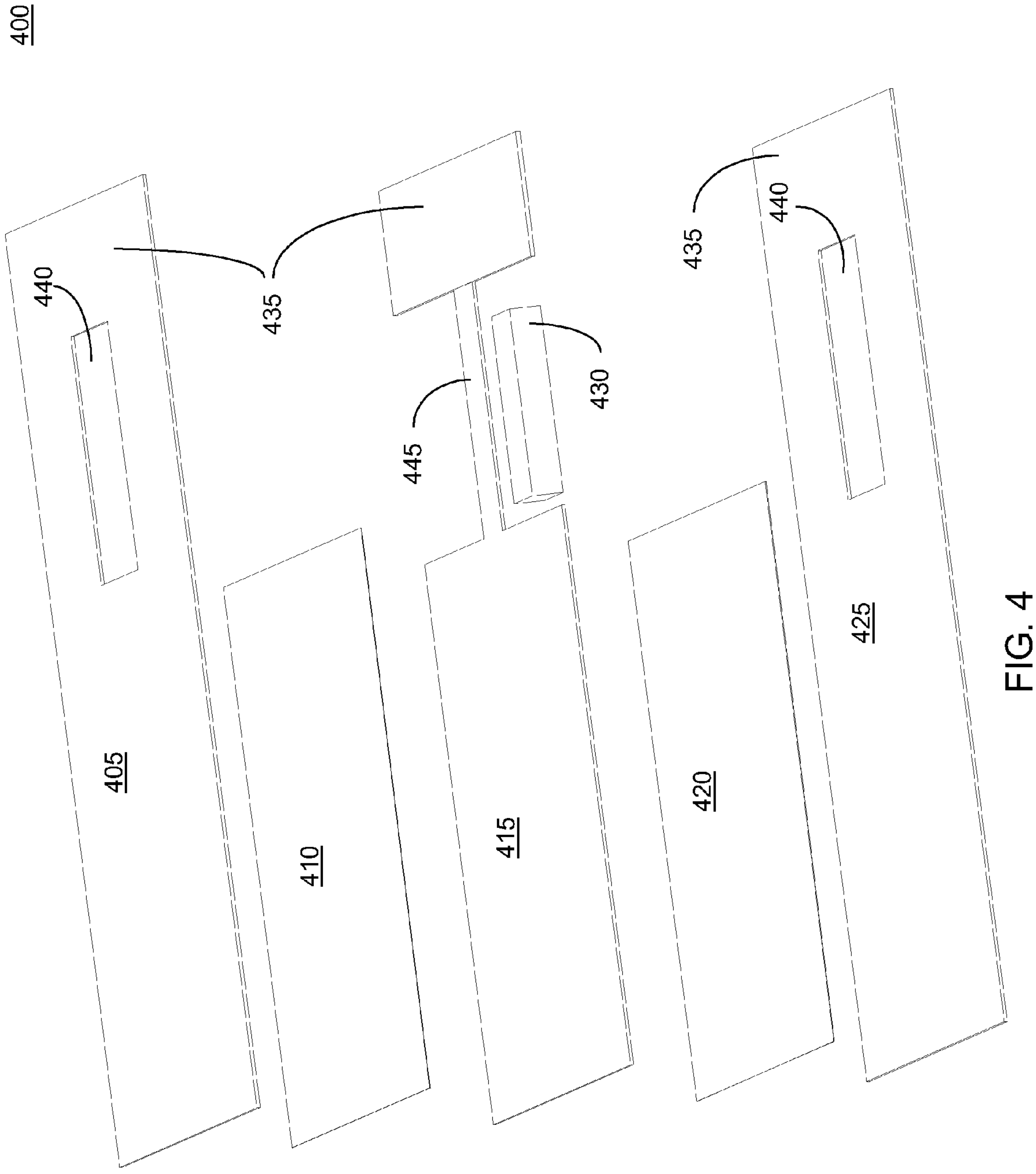
FIG. 4 shows an exploded view of the magnetic excitation transmission line of FIG. 2.

FIG. 4 shows an exploded view 400 of the magnetic excitation transmission line 110 of FIG. 2. A top conductor 405 and a bottom conductor 425 are separated from a center conductor 415 by insulators 410 and 420, respectively. When assembled, the right hand ends 435 of conductors 405, 415, and 425 are in electrical contact with each other, as shown in FIG. 2. Top conductor 405 and bottom conductor 425 each have an aperture 440 that allows for a locally more intense magnetic field near the narrowed portion 445 of center conductor 415. An optional ferrite mass 430 may be placed in close proximity to the narrowed portion 445 to enhance the magnetic field. In other embodiments, the top conductor 405 or bottom conductor 425 may be omitted.

Figure 5:
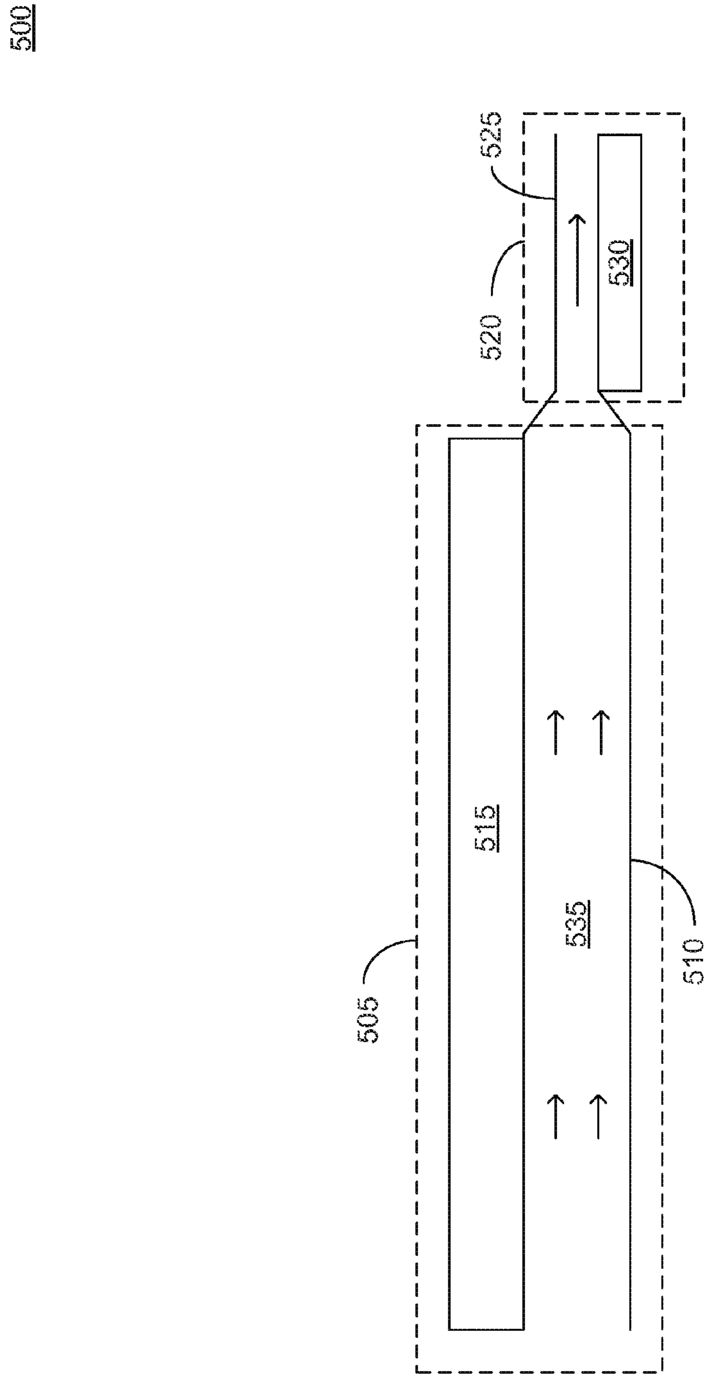
FIG. 5 shows a photolytic transmission line duct in accordance with an embodiment of the present invention.

FIG. 5 shows an embodiment of a photolytic transmission line duct 500. A photolytic duct segment 505 is coupled to a magnetic excitation duct segment 520. An electromagnetic radiation source 515 illuminates a working fluid 535 (e.g., gas or liquid) that flows from the photolytic duct segment 505 through the magnetic excitation duct segment 520. In this embodiment duct 510 has a greater cross-section than duct 525, producing a greater fluid velocity in the magnetic excitation duct segment 520. A magnetic excitation transmission line 530 provides an alternating magnetic field within duct 525. Species within the working fluid 535 may be photoexcited within the photolytic duct segment 505 and subsequently subjected to spin conversion or spin locking within the magnetic excitation duct segment 520. The photoexcitation may be isotope selective, or may be achieved with a broadband source such as a flash lamp. In other embodiments, the magnetic excitation transmission line 530 may be replaced by a single turn solenoid that wraps around the duct 525.

Figure 6:
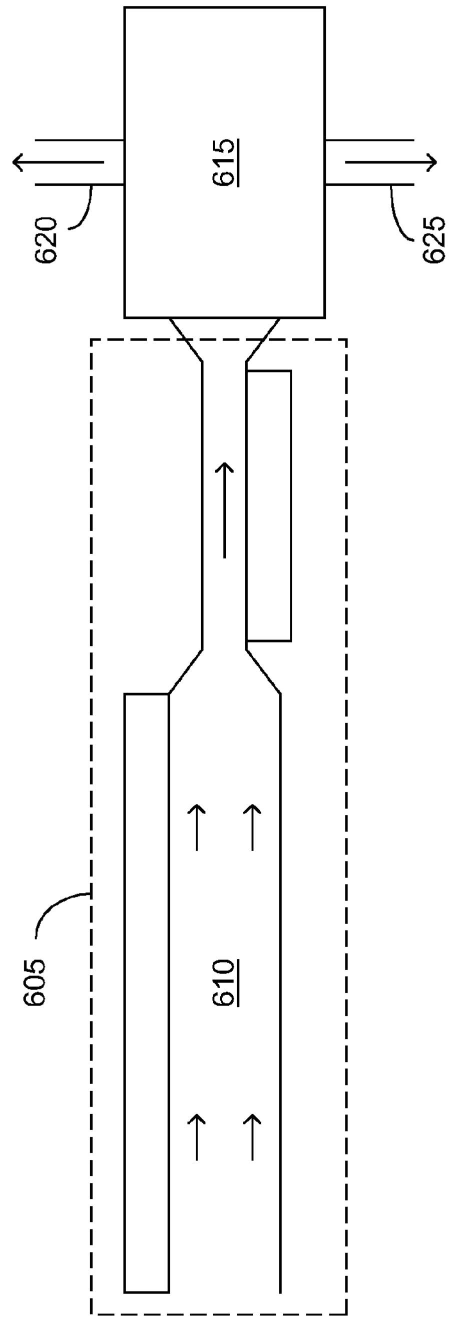
FIG. 6 shows a photolytic transmission line duct coupled to a mass effect isotope separation device in accordance with an embodiment of the present invention.

FIG. 6 shows an embodiment of a cascade isotope separation system 600. A photolytic transmission line duct 605 similar to that shown in FIG. 5 is coupled to a mass effect isotope separation device 615. Mass effect isotope separation device 615 may be an aerodynamic separation device, a vortex tube, or other device. The input stream 610 contains isotopologues that are subjected photolysis and magnetic excitation to produce product streams 620 and 625 that are mass differentiated on the basis of their isotopic composition.

Figure 7:
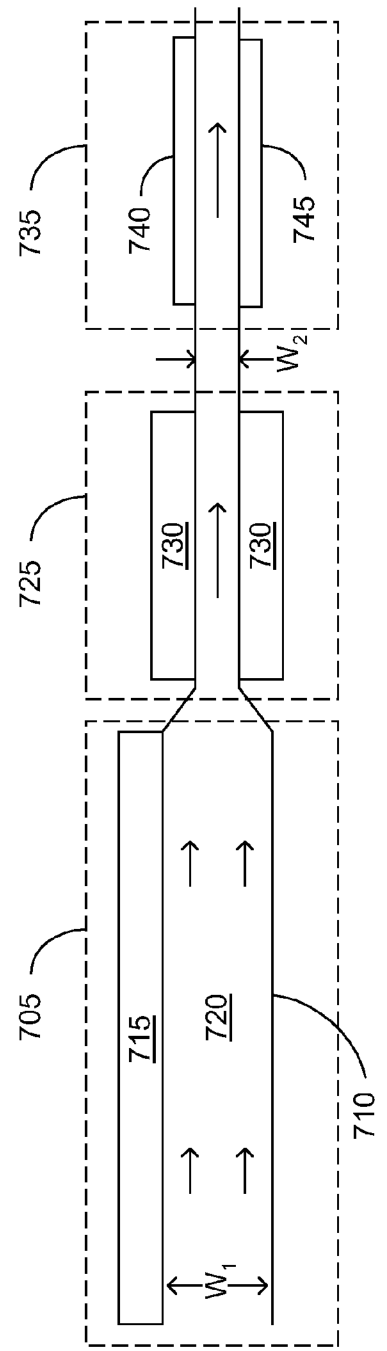
FIG. 7 shows a serial transmission line duct reactor in accordance with an embodiment of the present invention.

FIG. 7 shows an embodiment of a serial transmission line duct reactor 700. An electrolyte 720 flows from a photolytic duct segment 705, through a magnetic excitation duct segment 725, and to a redox duct segment 735. Photolysis of species within the electrolyte 720 is provided by photon source 715. Magnetic excitation is provided by magnetic excitation source 730. Duct 710 has an initial dimension of $W_1$ in the photolytic duct segment 705 that narrows to $W_2$ within the magnetic excitation 725 and redox segment 735. In the serial transmission line duct reactor 700, the redox and magnetic excitation functions are spatially separated, and thus cannot be used for magnetically excited species that have very short lifetimes. However, for metastable magnetically excited species with a lifetime greater than the transit time from the magnetic excitation duct segment 725 to the redox duct segment 735, anode 740 and cathode 745 can be used at a selected voltage without requiring pulses. Although the range of usable species is limited, there is a greater efficiency since the double-layer capacitance does not have to be continuously charged and discharged.

Figure 8:
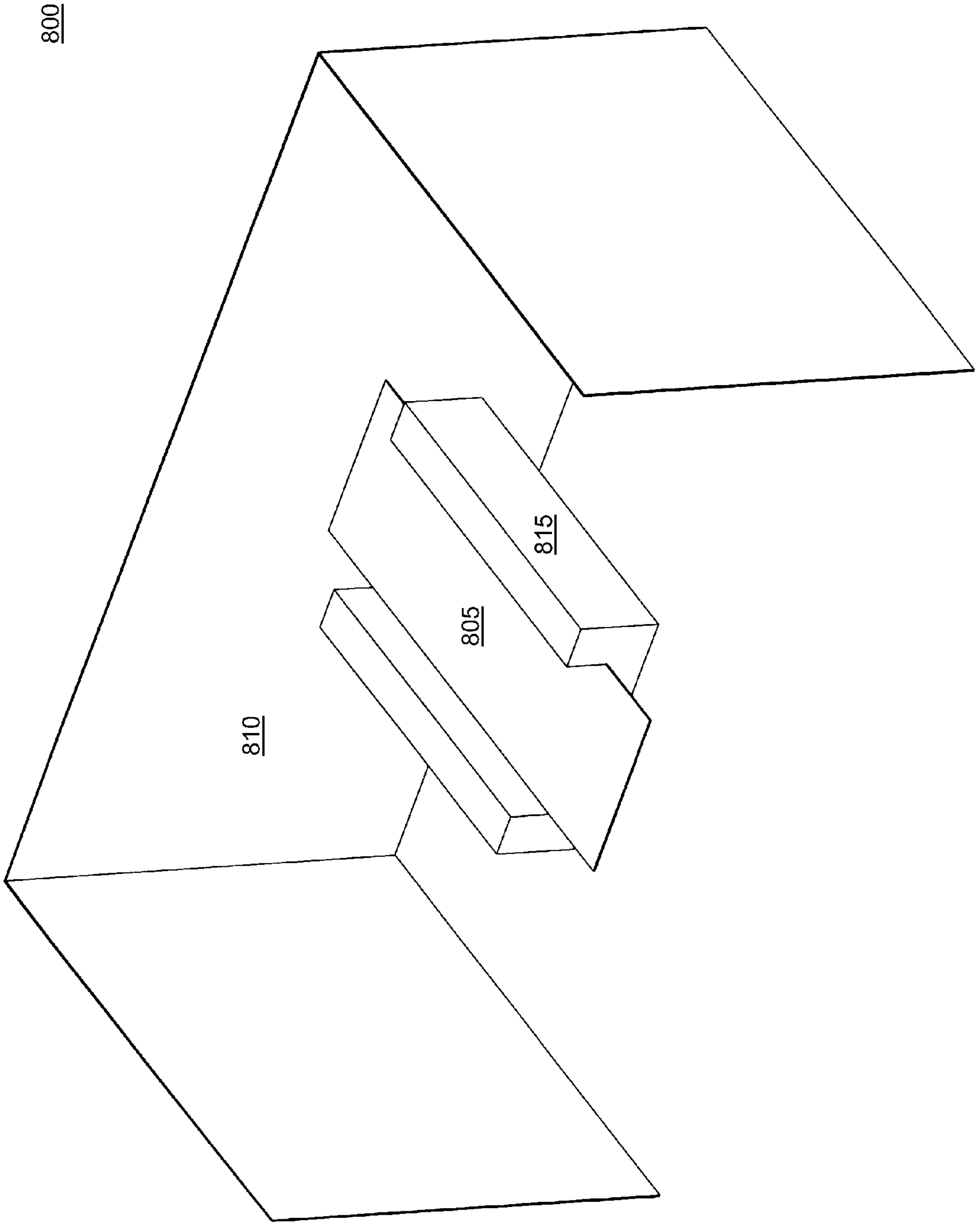
FIG. 8 shows a magnetic excitation transmission line in accordance with an embodiment of the present invention.

FIG. 8 shows an embodiment of a magnetic excitation transmission line 800. A center conductor 805 is coupled to a return conductor 810 that is orthogonal to the center conductor 805. A ferrite body 815 provides enhancement of the magnetic field at the surface of the center conductor 805. Although the structure of magnetic transmission line 800 is less compact than the magnet excitation transmission line 110 shown in FIG. 2, at high frequencies with significant skin depth and proximity effects it may provide a more desirable magnetic excitation pattern near the surface of center conductor 805.

Figure 9:
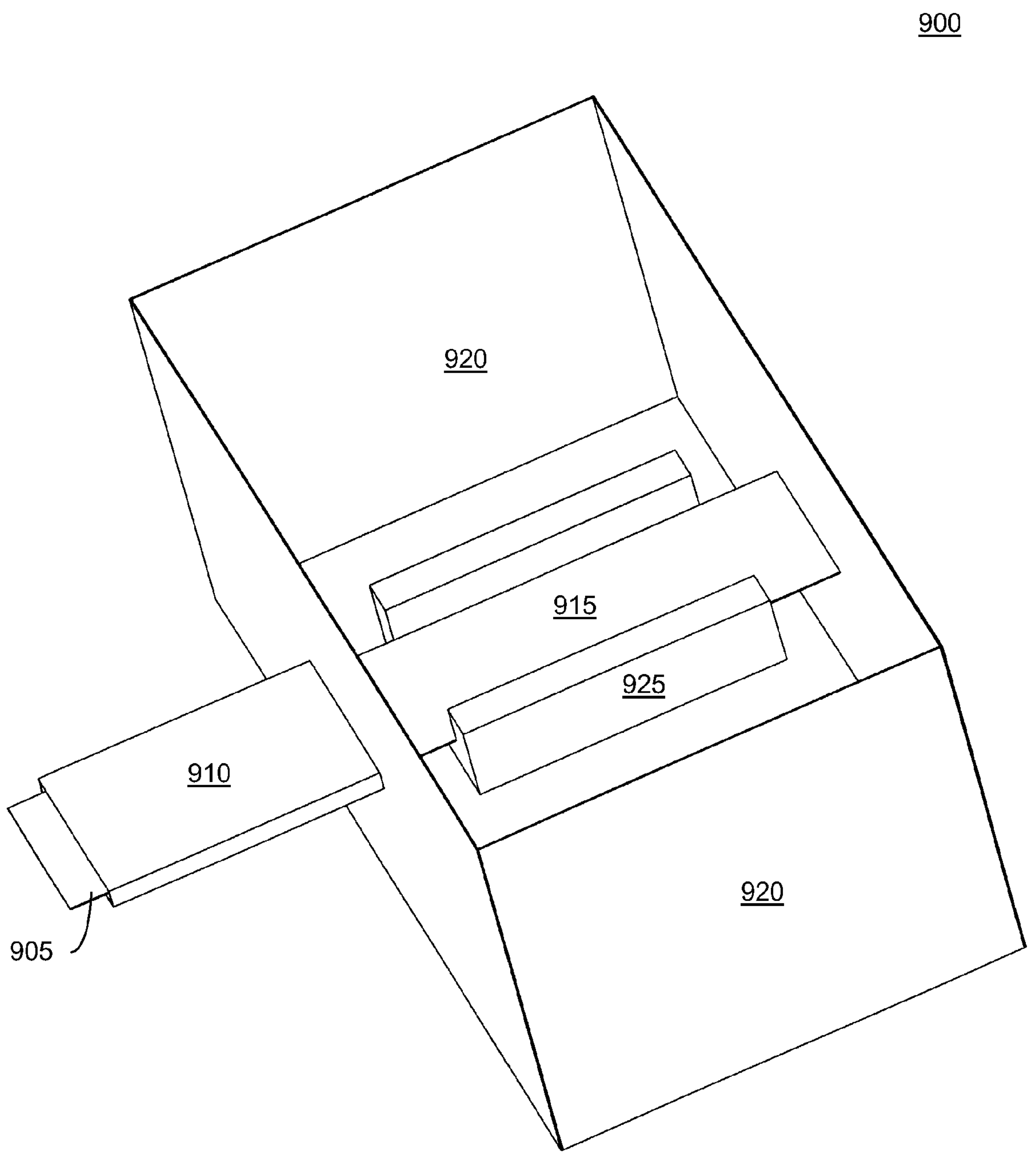
FIG. 9 shows a magnetic excitation transmission line coupled to a coaxial transmission line in accordance with an embodiment of the present invention.

FIG. 9 shows an embodiment of a coaxially coupled magnetic excitation transmission line 900. A coaxial outer conductor 910 is coupled to an orthogonal return conductor 920 and a coaxial inner conductor 905 is coupled to a center conductor 915. A ferrite body 925 provides enhancement of the magnetic field at the surface of the center conductor 915.

Figure 10:
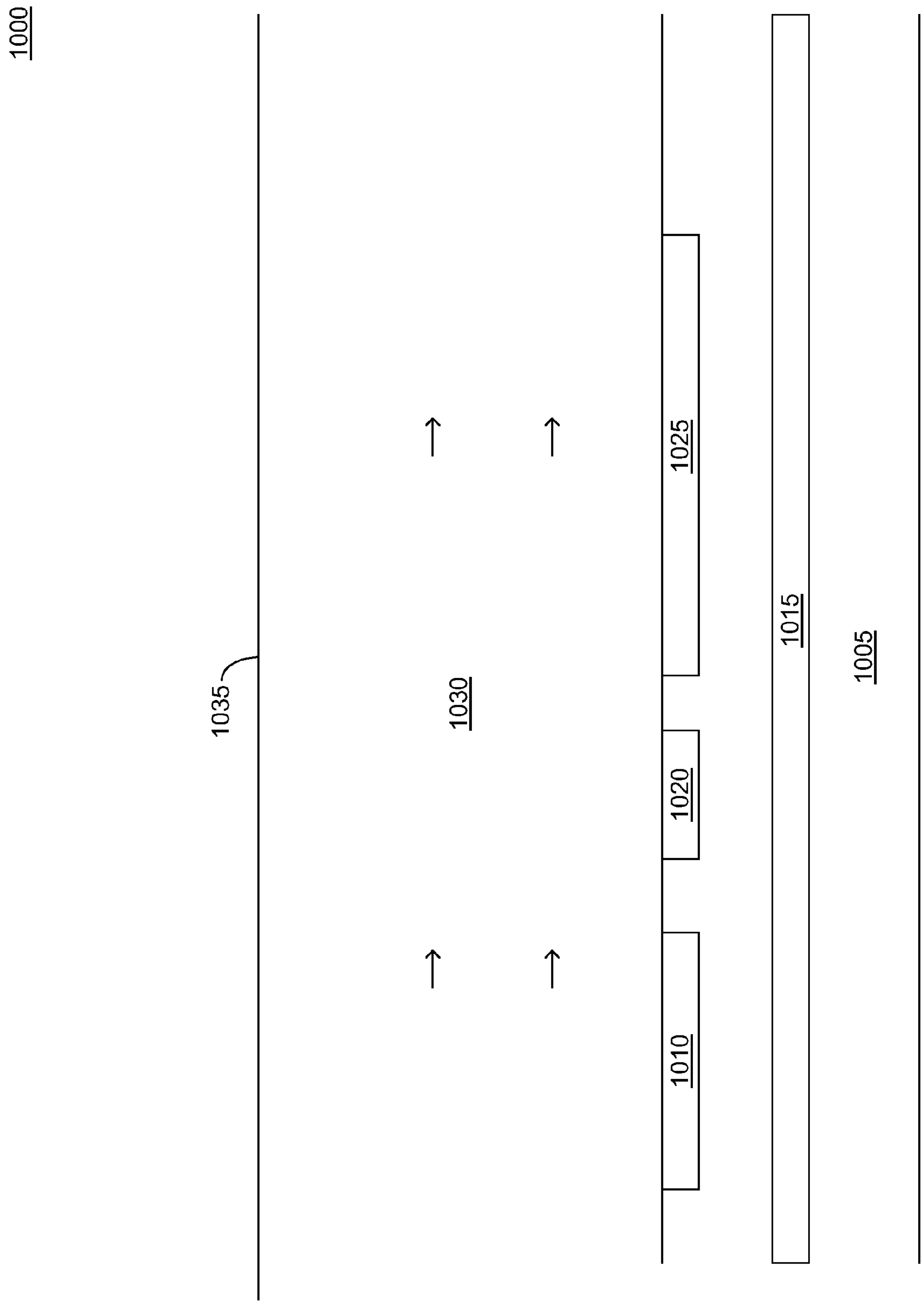
FIG. 10 shows an embedded magnetic excitation transmission line reactor in accordance with an embodiment of the present invention.

FIG. 10 shows a cross-section view of an embedded magnetic excitation transmission line reactor 1000. A substrate 1005 supports a ground plane 1015 and electrodes 1010, 1020, and 1025 that are in contact with a liquid electrolyte 1030. Liquid electrolyte may be essentially static, or it may be flowing parallel to the surface of the substrate 1005. A transparent cover 1035 may be used to permit photoexcitation and limit the thickness of the electrolyte 1030.

For configurations in which the electrolyte 1030 is flowing, a magnetic excitation current is established between electrode 1010 and ground plane 1015 and a redox potential is established between electrode 1020 and electrode 1025. For configurations in which the electrolyte 1030 is essentially static, electrode 1010 is omitted and the magnetic excitation current is applied between the ground plane 1015 and either electrode 1020 or electrode 1025. Substrate 1005 may be a dielectric (e.g., sapphire) or a semiconductor (e.g., silicon). For semiconductor substrates, the electrodes 1010, 1020, 1025, and ground plane 1005 are isolated from the substrate 1005 by thin dielectric films.

Figure 11A:
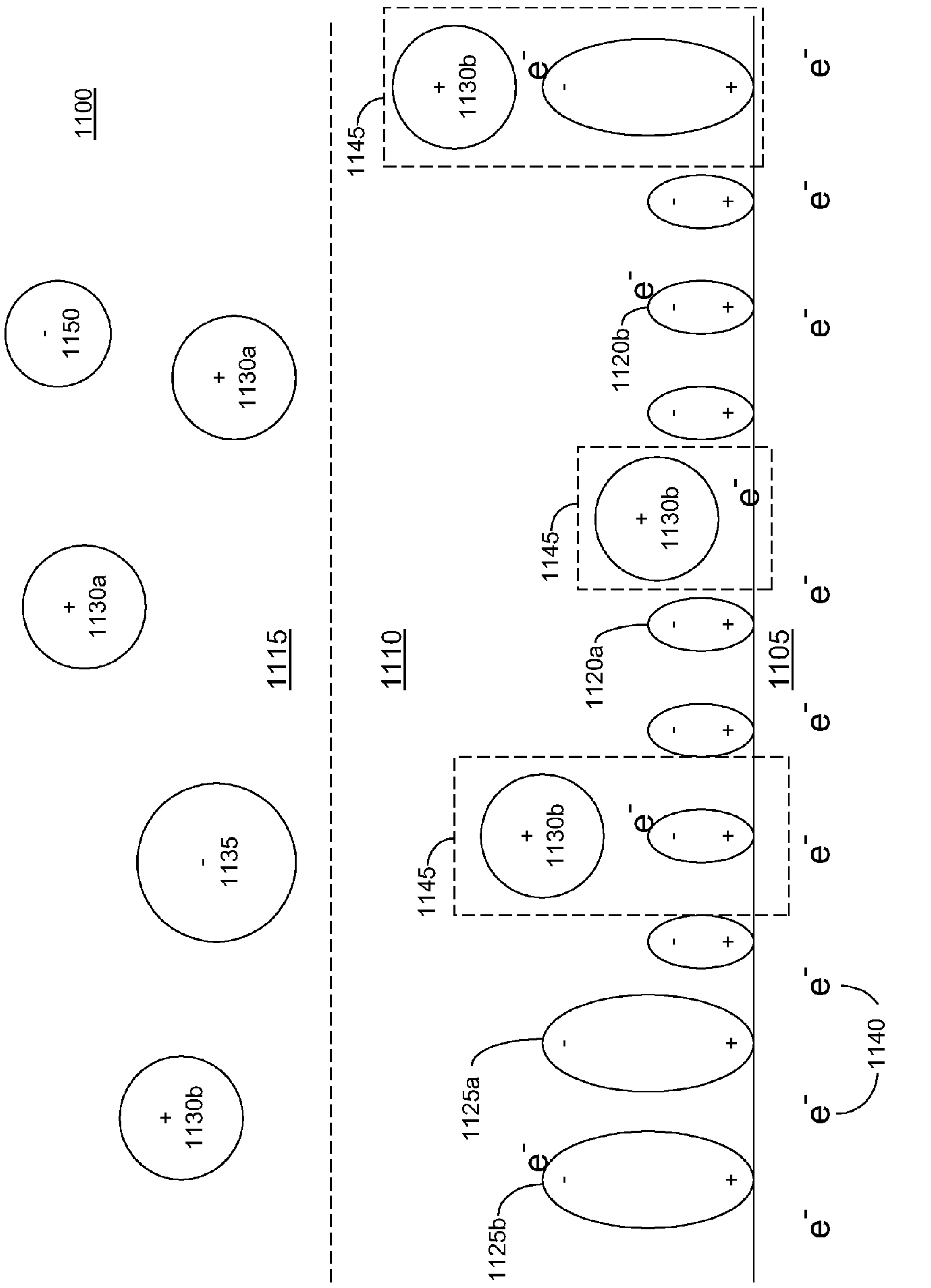
FIG. 11A shows a schematic diagram of a magnetically pumped interphase in accordance with an embodiment of the present invention.

FIG. 11A shows a schematic diagram 1100 of an embodiment of a magnetically pumped region 1110 that is bounded by a bulk electrolyte 1115 and a conductor 1105. Conductor 1105 may serve as the cathode of an electrolytic cell (anode not shown). An electric potential applied to conductor 1105 produces an excess population of electrons 1140 that are available for reduction of cationic species 1130*a* and 1130*b*. Cationic species 1130*a* and 1130*b* may be solvated or complexed cations. In general, the population of anionic species 1135 will be less than that of the cationic species 1130*a* and 1130*b*.

In a reduction reaction at conductor 1105, the cationic species (1130*a*, 1130*b*) and an electron contributed by the conductor 1105 can be considered as a quasi-radical pair 1145 since there are at least two unpaired electrons that ultimately share an orbital after reduction of the cation. Within the region 1110 at the surface of conductor 1105, there is a minimum period of time during which the unpaired electrons associated with the cationic species (1130*a*, 1130*b*) may be subjected to spin modification. This period is roughly the transit time of the cationic species (1130*a*, 1130*b*) across the magnetically pumped region 1110. A quasi-radical pair 1145 will thus have ample time for spin modification prior to a reduction reaction when pumped at high frequencies. For all except very small electrodes, the width of the magnetically pumped region is typically greater than the Debye length.

The surface of conductor 1105 is populated by oriented solvent molecules 1120*a* and may also be populated by other adsorbed species 1125*a* (e.g., alkane thiols). In some embodiments, the solvent molecules may be largely replaced by a monolayer of adsorbed species (e.g., self-assembled monolayer). Surplus electrons 1140 from the conductor 1105 may associate with solvent molecules 1120*a* and other adsorbed species 1125*a* to produce quasi-radicals 1120*b* and 1125*b*. Quasi-radicals 1120*b* and 1125*b* may be viewed as the product of overlapping electronic wave functions of the electron 1140 and the adsorbed solvent molecules 1120*a* and adsorbed species 1125*a*.

Cation species 1130*a* and 1130*b* differ in their total nuclear spins due to a difference in isotopic composition with respect to magnetic and nonmagnetic isotopes (e.g., $^{235}U$ and $^{238}U$, or $^{13}C$ and $^{12}C$). Thus, the spin Hamiltonian of an unpaired electron in cation species 1130*a* will differ from that of cationic species 1130*b*. Specifically, the difference in spin-nuclear hyperfine coupling provides a basis for selective magnetic pumping of either species. In order to optimize the selective pumping of a cationic species 1130*a* or 1130*b*, the effect of a number of other magnetic coupling mechanisms should be considered. Among these are the electron spin-orbit coupling, electron spin-lattice couplings, and electron spin-electron (electron exchange) coupling.

Electron spin-orbit coupling is due to the coupling of the intrinsic electron spin to the magnetic moment produced by its orbital motion. In a polyatomic molecule or complex, the degree of coupling is dependent upon the structural symmetry and the nuclei of the molecule or complex. Complex ligands and other chemical components may be selected to reduce spin-orbit coupling. The electrolyte 1115 may contain complexing agents 1150 for complexing a species formed by the reduction of species 1130*b*. For example, fluoride anions may be used to precipitate $U^{4+}$ produced by reduction of hexavalent uranium containing species, as $UF_4$, which may be subsequently separated from the electrolyte.

Electron spin-lattice coupling arises from interactions with surrounding molecules in the electrolyte. Within the electrolyte oscillating magnetic fields may be generated from the thermal motion of charged species and/or species with magnetic moments. Spin-lattice coupling may be reduced by using a solvent with an inherently small effective magnetic moment (e.g., liquid or supercritical carbon dioxide, or carbon disulfide) or by using solvents with isotopic substitutions. The substitution of heavy water (deuterium oxide) for natural water provides a significant reduction in the magnetic moment of water molecules. Deuteration may also be applied to organic ligands and cathode surface adsorbed species. Components with large molecular weights and solvents with high viscosity may be used to slow relaxation processes associated with the translational and rotational motion of electrolyte components.

Although a spin-nuclear hyperfine coupling may serve as the basis for selective magnetic pumping, the presence of other hyperfine couplings may be undesirable. The general substitution of $^2H$ for $^1H$ in water and in organic compounds may be an economical approach to enhancing an overall yield in an isotope selective reaction by reducing extraneous hyperfine coupling. For purposes of this disclosure, a deuterated compound is a compound in which at least 10 percent of $^1H$ has been substituted with $^2H$. Preferably, a deuterated compound has greater than 90 percent substitution of $^2H$ for $^1H$. Marginal improvements may also be made by substituting for other isotopes (e.g., $^{13}C$ or $^{33}S$). The substitution of $^2H$ for $^1H$ and/or $^{13}C$ for $^{12}C$ in reactants may be used to provide selectivity in electrolytic reactions involving organic compounds.

Electrical losses in the signal sources and signal paths generally increase with increasing frequency, thus it is desirable to minimize the sources of relaxation effects so that the required DC field and RF frequency can be minimized. In the absence of strong relaxation effects, the Zeeman splitting can be kept relatively small in nonmagnetic species. In many embodiments, the DC field will be greater than one millitesla.

The solvent, ionic compounds, complexing agents, and adsorbed species in the system may be selected to minimize the adverse relaxation effects of the coupling mechanisms described above so that the externally applied magnetic fields can produce efficient pumping of a quasi-radical pair 1145. The quasi-radical pair 1145 may be formed by a cationic species 1130*b* at the cathode surface or in proximity to a quasi-radical 1120*b* or 1125*b*. The ability of the quasi-radical 1145 to participate in a reduction reaction depends upon the nature of the magnetic pumping that is applied to the region 1110. It is desirable that spin-locked species not be strongly sorbed on the electrode surface since their presence will inhibit the reduction of other species. In the absence of a reduction potential quasi-radical pair formation and separation is typically a continuous process that allows spin-locked quasi-radical pairs to be replaced by quasi-radical pairs that are not spin-locked, and thus can be electrolyzed.

A DC magnetic field is applied to the bulk electrolyte 1115, region 1110, and conductor 1105 by an external magnet. An alternating magnetic field is produce by an alternating current in the conductor 1105. The DC magnetic field may have an orientation from 0° to 90° with respect to the surface of conductor 1105. The alternating magnetic field is essentially parallel to the surface of the conductor 1105 within the region 1110. The DC magnetic field produces splitting of magnetic energy levels (e.g., triplet levels) for both magnetic and nonmagnetic quasi-radical pairs. However, in magnetic radical pairs there is further level splitting provided by the spin-nuclear hyperfine interaction. The different energy gaps between levels in the magnetic and nonmagnetic quasi-radical pairs provide an opportunity for selective magnetic pumping of each at a particular frequency.

At a resonant microwave frequency and at sufficient intensity, the alternating magnetic field applied to the region 1110 can effectively depopulate the $T_0$ sublevel by increasing the population of the $T_+$ and $T_-$ sublevels for a quasi-radical pair 1145. In combination with S-$T_0$ mixing, magnetic pumping locks the quasi-radical pair and inhibits reduction of the cationic species 1130*b*. It should be noted that the cationic species 1130*a* and 1130*b* are continually diffusing into and out of the region 1110 and that the electrolytic reduction of the cationic species 1130*a* or 1130*b* only occurs within the magnetically pumped region 1110. Thus, the alternating magnetic field is only required within a short distance from the cathode surface.

Depending upon the applied amplitudes and frequency, the magnetic pumping of the region 1110 may be used to alter the spin behavior of cationic species 1130*a* and 1130*b*, as well as the electrons 1140. On a microscopic scale, the magnetic pumping can be viewed as a modification of the probability of the reduction of a quasi-radical pair. The degree of probability modification is dependent on the ability of the pumping to overcome various relaxation processes, and is typically greatest under resonant conditions.

On a macroscopic scale, the efficacy of the magnetic pumping on an electrolytic process can be assessed by measuring the current in the electrolytic cell at a fixed applied reduction potential. For example, a constant DC field may be applied to the electrolytic cell in combination with a swept microwave frequency current in the conductor 1105. The microwave current may be swept over frequency and amplitude. Resonance is detected by a change in the electrolytic current. For a given electrolyte system, there may be many resonant frequencies associated with different cation oxidation states and different isotopologues and complexes. Although a fixed current frequency could be used in conjunction with a variable DC magnetic field as is done in conventional ESR studies, a swept current source is preferred since it allows for the application of more than one frequency simultaneously. In a manufacturing isotope separation process, pumping at two or more frequencies associated with different reductions steps may enhance the single pass separation factor.

For example, an observed current drop in the reduction of a multivalent cation such as $Sn^{2+}$ may be due to spin locking at the $Sn^{2+}/Sn^{+}$ reduction step, the $Sn^{+}/Sn$ reduction step, or both, and may involve one or more of ten different isotopes. Once a resonance has been detected through a change in electrolytic current through a frequency sweep, a static cell can be used at the predetermined resonant conditions to determine the degree of isotope selectivity among the various Sn isotopes. The electrolytic potential can also be adjusted to identify the particular reduction step associated with a resonance. By reducing the $Sn^{2+}$ into a liquid metal electrode (e.g., mercury), the metal can be extracted and subjected to isotope ratio analysis to correlate the isotopologue, pumping frequency, and reduction step.

In general, once each of the distinct resonances of a reduction step has been characterized, a waveform composed of two or more resonant frequencies may be used to provide a particular enhancement or suppression of electrolysis of one or more isotopes. With respect to uranium, it would be desirable to suppress the reduction of $^{238}U$ and enhance the reduction of $^{235}U$. Due to the high percentage (>99%) of $^{238}U$ in natural and depleted uranium, inhibition of a reduction step of a quasi-radical pair containing $^{238}U$ would be relatively easy to detect, since a complete inhibition would result in a current drop of about two orders of magnitude. In addition to isotope separation, magnetic pumping may be used to enhance selective reduction of different elements (e.g., actinides) that are chemically similar. Thus, magnetically pumped electrolysis may be used for nuclear fuel reprocessing.

Figure 11B:
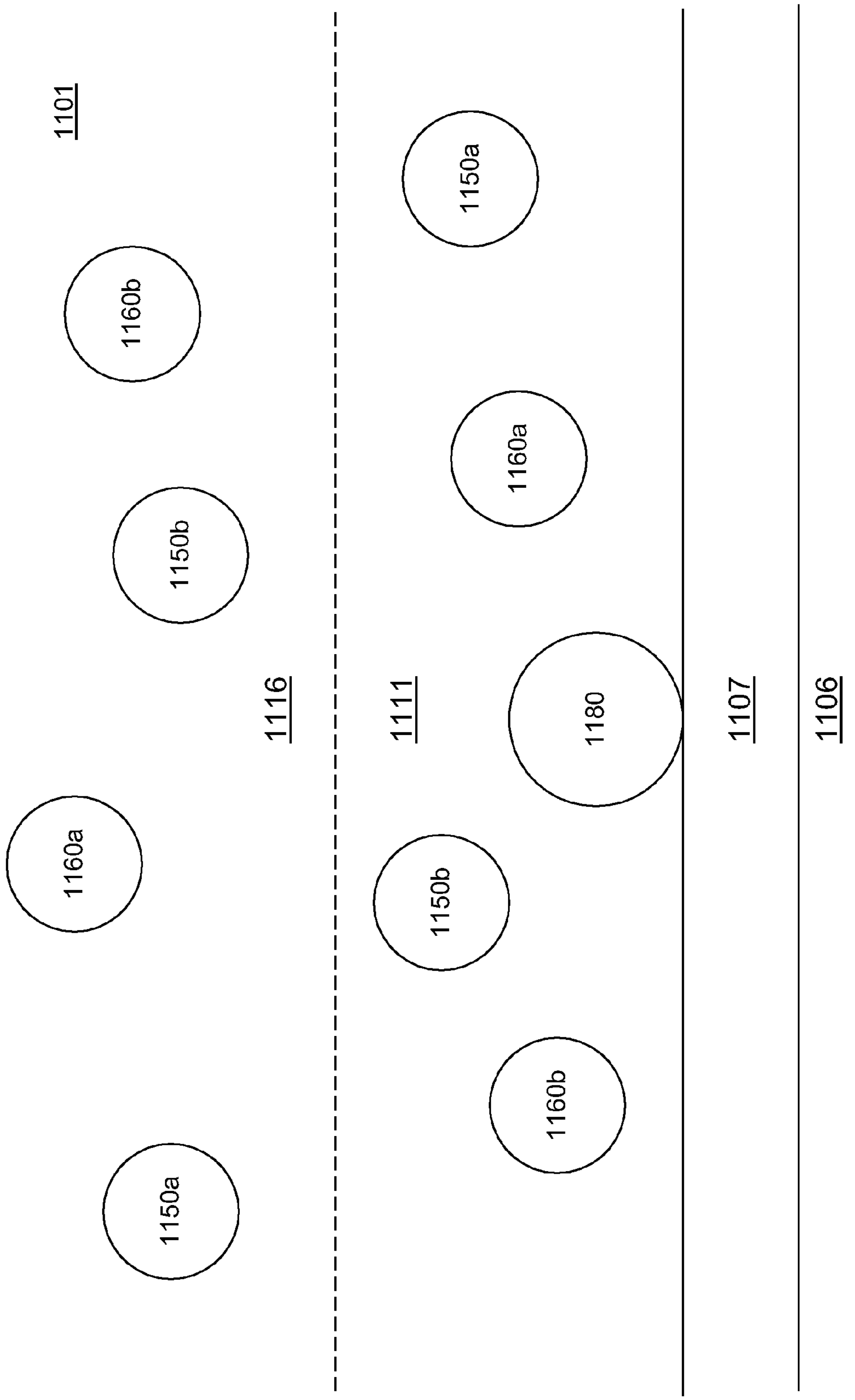
FIG. 11B shows a schematic diagram of a magnetically pumped interphase at a catalytic surface in accordance with an embodiment of the present invention.

Magnetic pumping of a surface region can also be used in non-electrolytic processes. FIG. 11B shows a schematic diagram 1101 of an embodiment of a magnetically pumped interphase 1111 at the surface of a catalyst 1107. An optional substrate 1106 may support the catalyst 1107. For example, if the catalyst is a semiconductor or dielectric material, substrate 1106 may include a low resistivity material such as copper. Thin film metal catalysts (e.g., platinum) may be supported on a conductive substrate or a dielectric substrate. Species 1150*a* and 1150*b* are isotopologues as are species 1160*a* and 1160*b*. In the absence of spin modification through magnetic pumping, 1150*a* or 1150*b* may react with 1160*a* or 1160*b* to produce product 1180 at the surface of catalyst 1107. Solution 1116 is not necessarily an electrolyte and may be an organic solvent. Photolysis may be used to create species that whose subsequent reaction may be modified by magnetic pumping at the surface of catalyst 1107.

Figure 12A:
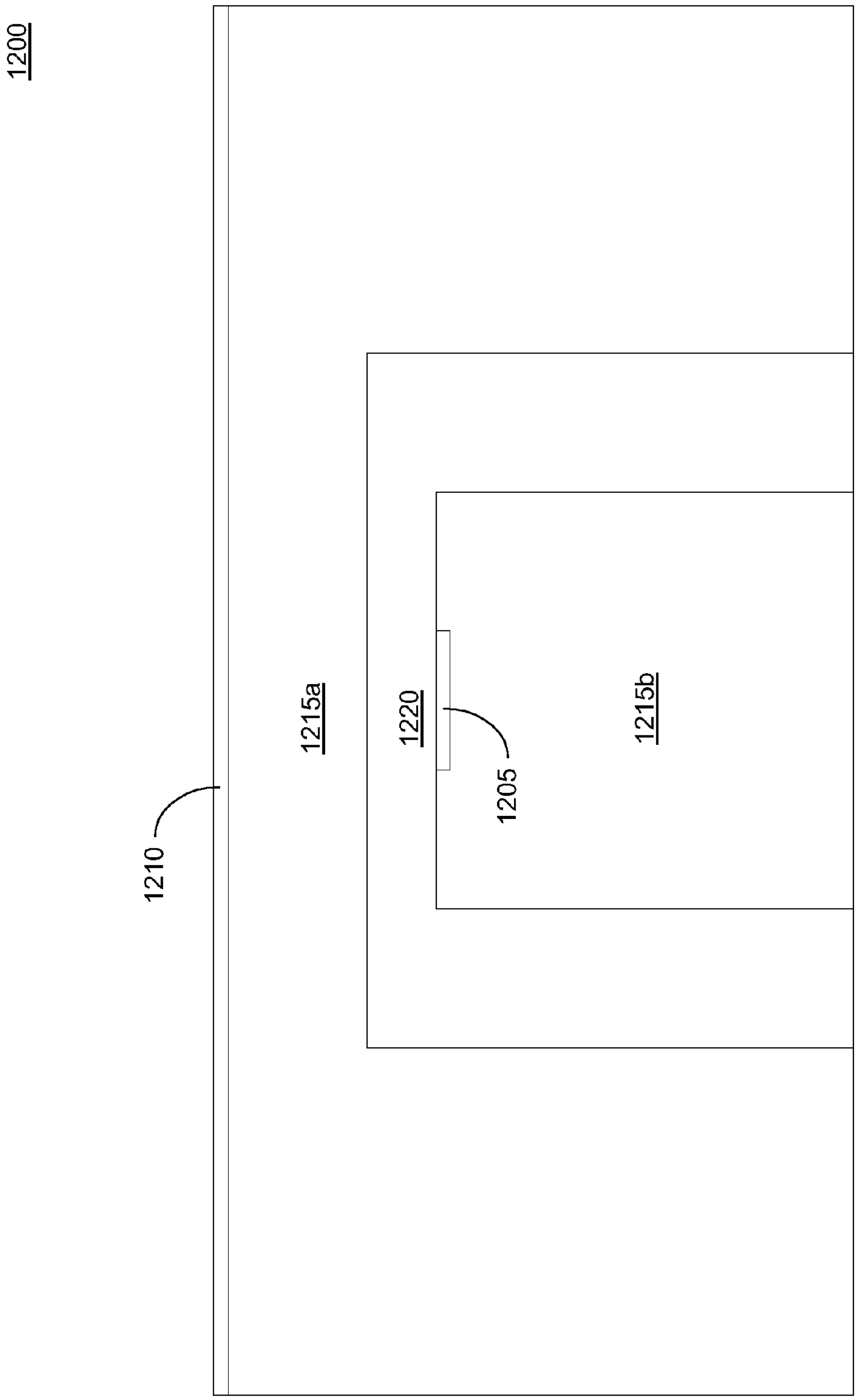
FIG. 12A shows an asymmetric transmission line duct in accordance with an embodiment of the present invention.

FIG. 12A shows a cross section view 1200 of an embodiment of a transmission line duct having a working electrode 1205 and a return electrode 1210. Supporting dielectric elements 1215*a* and 1215*b* form a channel for an electrolyte 1220. The surface of electrode 1205 corresponds to the electrode surface shown in FIG. 11A. Since the magnetic pumping is only required in a thin region at the surface of electrode 1205, return electrode 1210 has a greater width to reduce its inductance and resistance, thereby reducing its contribution to the circuit impedance. Since return electrode 1210 is isolated from the electrolyte 1220, it may be fabricated of a low resistivity material without concern. for potential chemical reactions with the electrolyte 1220. In contrast, Electrode 1205 is fabricated from a conductive material that is compatible with the electrolyte 1220. Electrode 1205 may be a composite structure with a high conductivity substrate (e.g., copper or silver) with a thin coating of an inert conductive material (e.g., gold. or platinun).

The electrolyte 1220 will typically make a significant contribution to the capacitive reactance of the transmission line duct. For example, water has a relative dielectric constant of about 80 at microwave frequencies. Room temperature ionic liquids may have relative dielectric constants greater than 10 at high frequencies. The electric field that exists in the space between working electrode 1205 and return electrode 1210 depends in part upon the length of the transmission line duct. In addition, the potential may vary with position along the length of the transmission line duct, depending upon how the current is applied (e.g., single ended or push-pull).

The shape and separation of the working electrode 1205 and the return electrode 1210 can be varied to adjust the inductive and capacitive reactances of the transmission line duct. The net impedance and loss characteristics of the transmission line duct are thus a function of geometry and material properties. For a transmission line duct that is operated at a specific frequency, the geometry and material selection may be selected to provide a resonant structure that maximizes the alternating magnet field with the lowest applied potential. The resonant frequency for magnetic energy level transitions is independent of the resonant frequency of the transmission line duct, but they may be made to coincide. For a general-purpose transmission line duct, the spacing between working electrode 1205 and return electrode 1210 may be increased to reduce the impact of electrolyte substitution of the capacitive reactance.

Figure 12B:
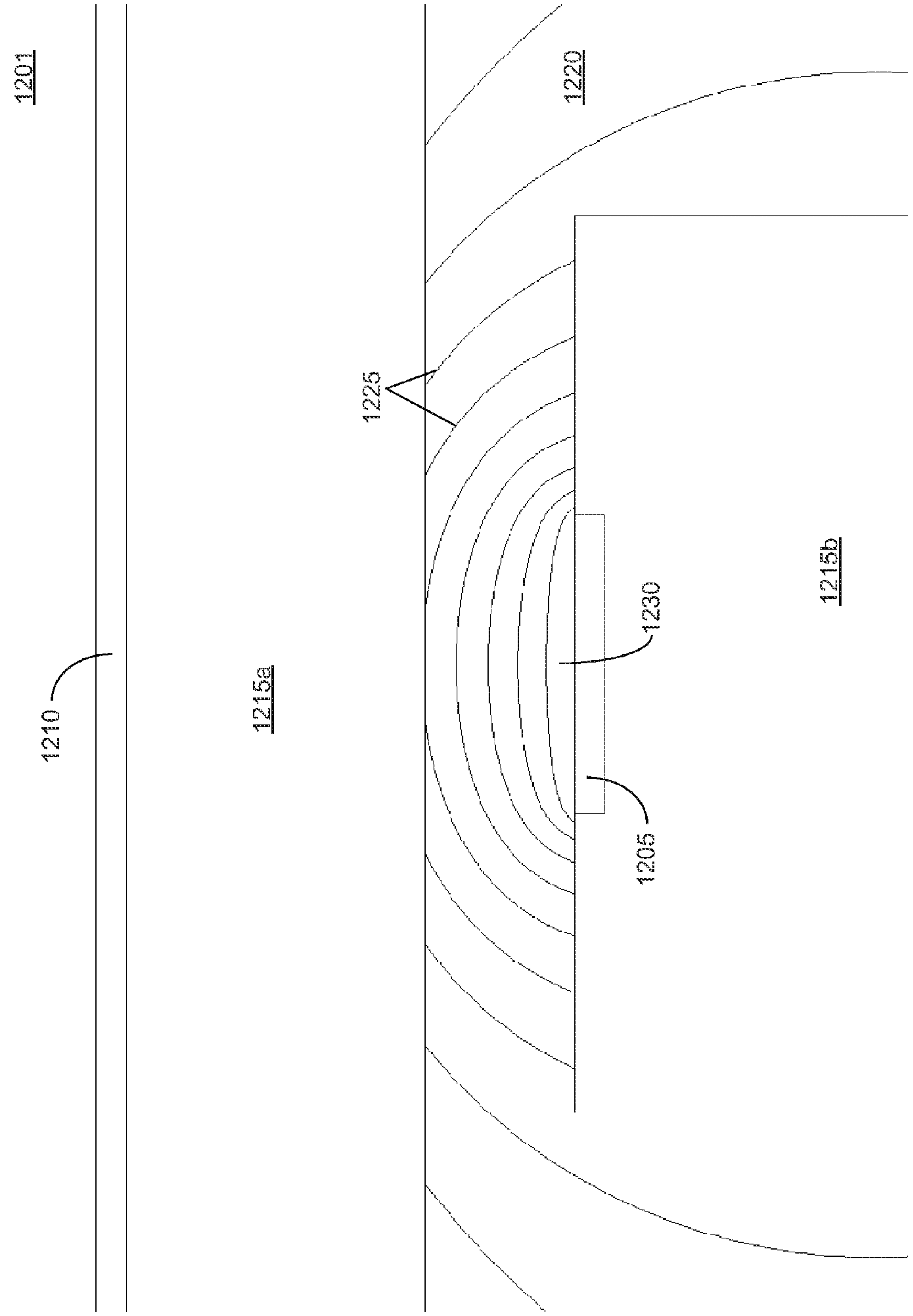
FIG. 12B shows a model of the magnetic flux orientation associated with the asymmetric transmission line duct of FIG. 12A.

FIG. 12B shows a diagram 1201 of the magnetic flux orientation associated with the asymmetric transmission line duct of FIG. 12A. A pumping current flowing through working electrode 1205 and return electrode 1210 establishes a magnetic field depicted by flux lines 1225 within the electrolyte 1220. The magnetic flux is essentially parallel to the surface of electrode 1205 in the region adjacent to the surface of electrode 1205.

Figure 12C:
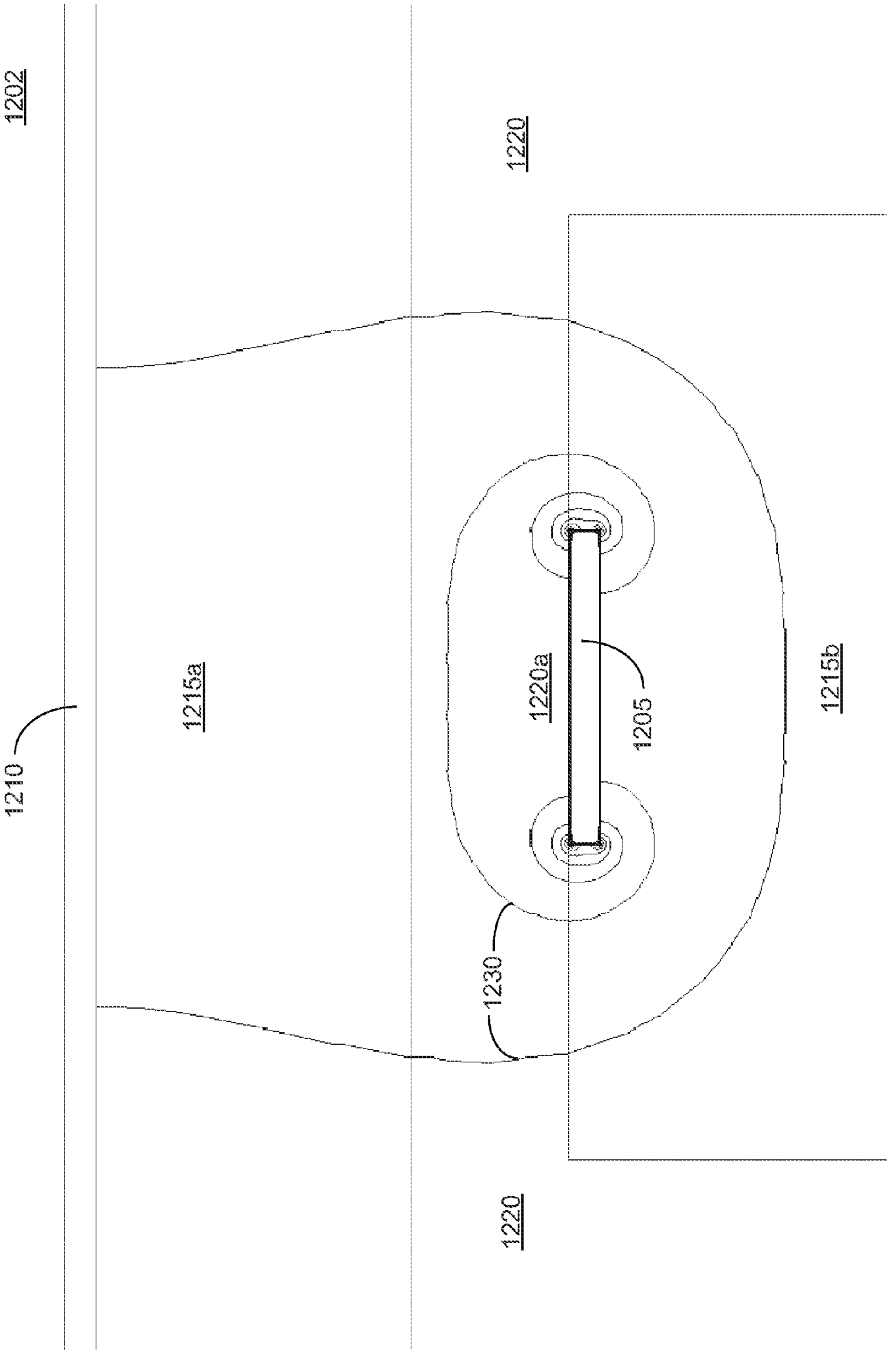
FIG. 12C shows a model of the flux density distribution associated with the asymmetric transmission line duct of FIG. 12A.

FIG. 12C shows a diagram 1202 of the flux density distribution associated with the asymmetric transmission line duct of FIG. 12A. Iso-intensity lines 1230 separate regions of differing flux density. The greatest flux density and flux density gradient occurs at the sharp corners of electrode 1205, with a more homogeneous region 1220*a* in the middle of the electrode surface. In practice, the sharp corners may be rounded to reduce the local current density and flux concentration at high frequencies.

In an embodiment, working electrode 1205 and return electrode 1210 are both about 0.04 millimeters thick with a separation of about 0.6 millimeters. Working electrode 1205 is about 0.04 millimeters wide and return electrode 1210 is about 0.4 millimeters wide. With a current of about 2 amperes, a magnetic field on the order of 2-4 millitesla may be achieved within region 1220*a*. The voltage required to achieve 2 amperes of current will depend upon the length of the transmission line duct; however, for transmission line ducts with a length of less than about 1 centimeter, the voltage required is within the operating range of solid state semiconductors.

Figure 12D:
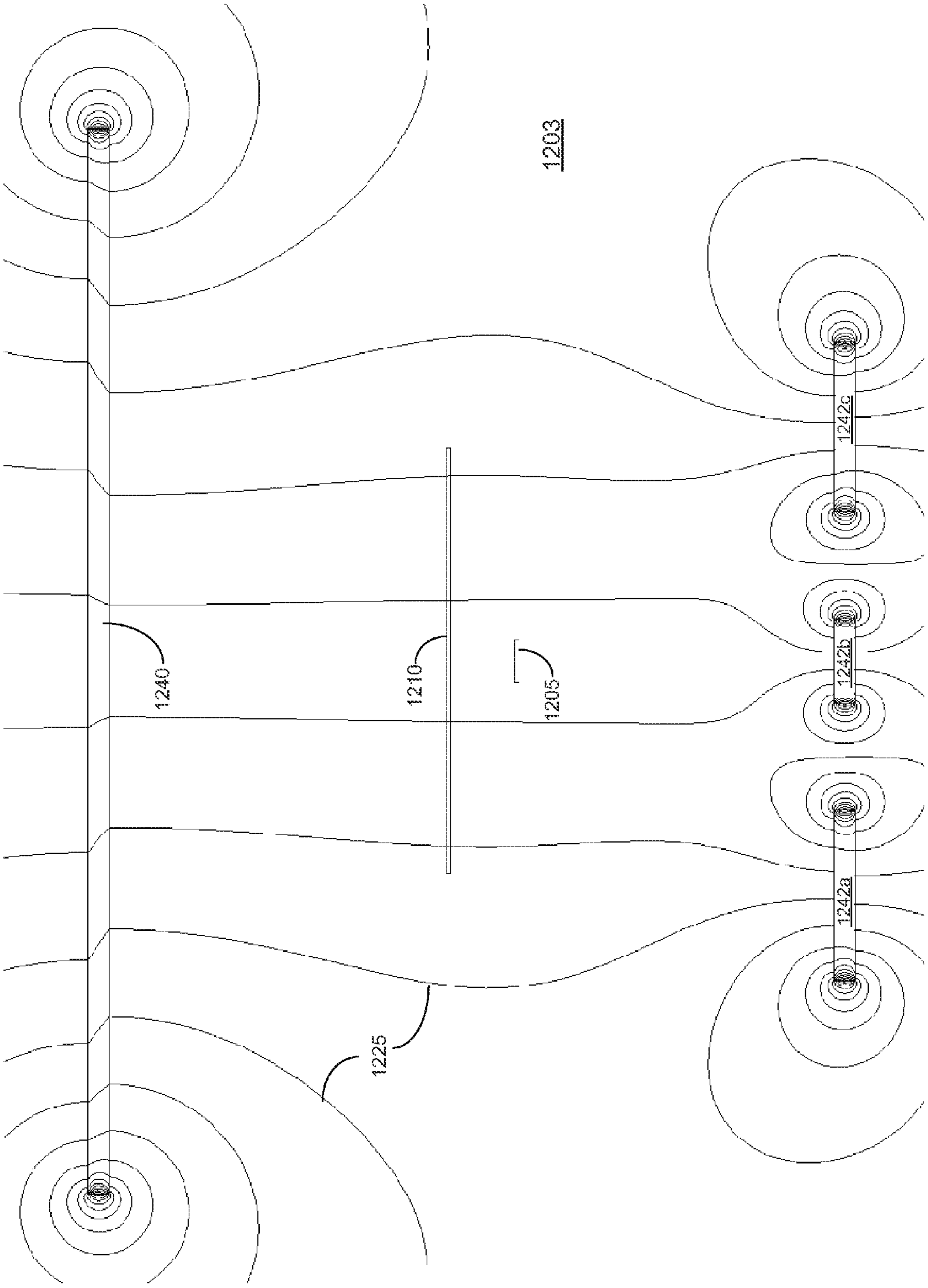
FIG. 12D shows a model of a DC magnetic flux orientation associated with a magnet assembly in accordance with an embodiment of the present invention.

FIG. 12D shows a model 1203 of a DC magnetic flux orientation associated with an embodiment of a magnet assembly having a first pole piece 1240 and a pole array including poles 1242*a*, 1242*b*, and 1242*c*. The magnetic flux in the gap between working electrode 1205 and return electrode 1210 is essentially perpendicular to the surface of working electrode 1205, and thus is perpendicular to the high frequency magnetic flux at the surface of working electrode 1205. In addition to multiple pole pieces, high permeability materials may also be used to shape the magnetic flux.

Figure 12E:
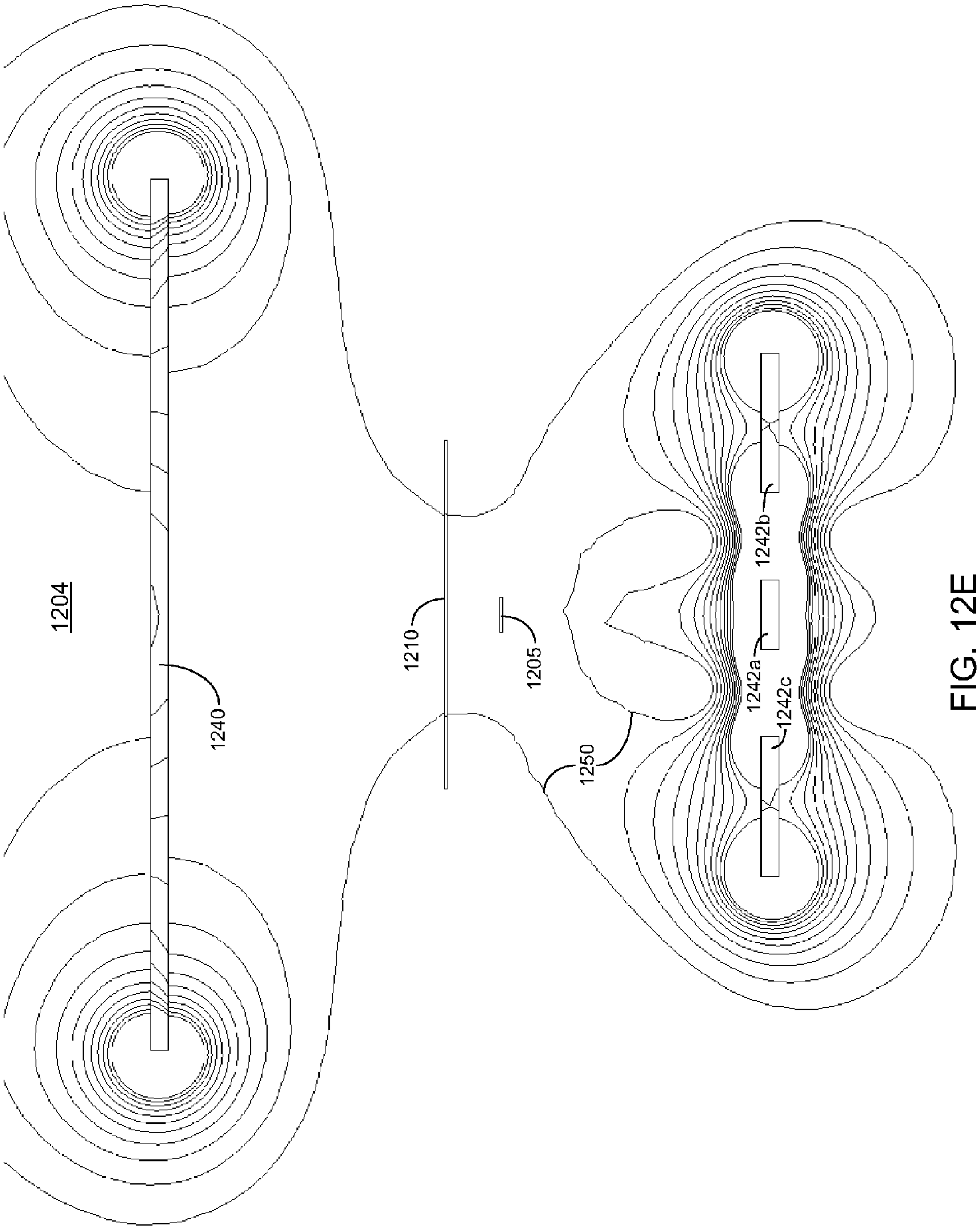
FIG. 12E shows a model of the flux density distribution associated with the magnet assembly of FIG. 12D.

FIG. 12E shows a model 1204 of the flux density distribution associated with the magnet assembly of FIG. 12D. Iso-intensity lines 1250 separate regions of differing flux density. Although a magnet assembly may have large gradients associated with the regions near individual pole pieces, a more uniform flux is obtained in the regions that are some distance from the pole pieces. For pole pieces or field shaping elements that may be exposed to the high frequency magnetic field associated with the working conductor 1205, it is preferable to use high resistivity materials such as ferrites to minimize eddy current losses.

Depending upon the electrolyte system and the degree of selectivity desired, pumping may be done over a range of frequencies, from about 100 MHz to several GHz. In general, lower pumping frequencies will allow for larger working electrode wetted areas. In an embodiment, one or two transistors are used to provide current to a transmission line duct with a working electrode wetted area of less than 1 square centimeter.

Figure 13A:
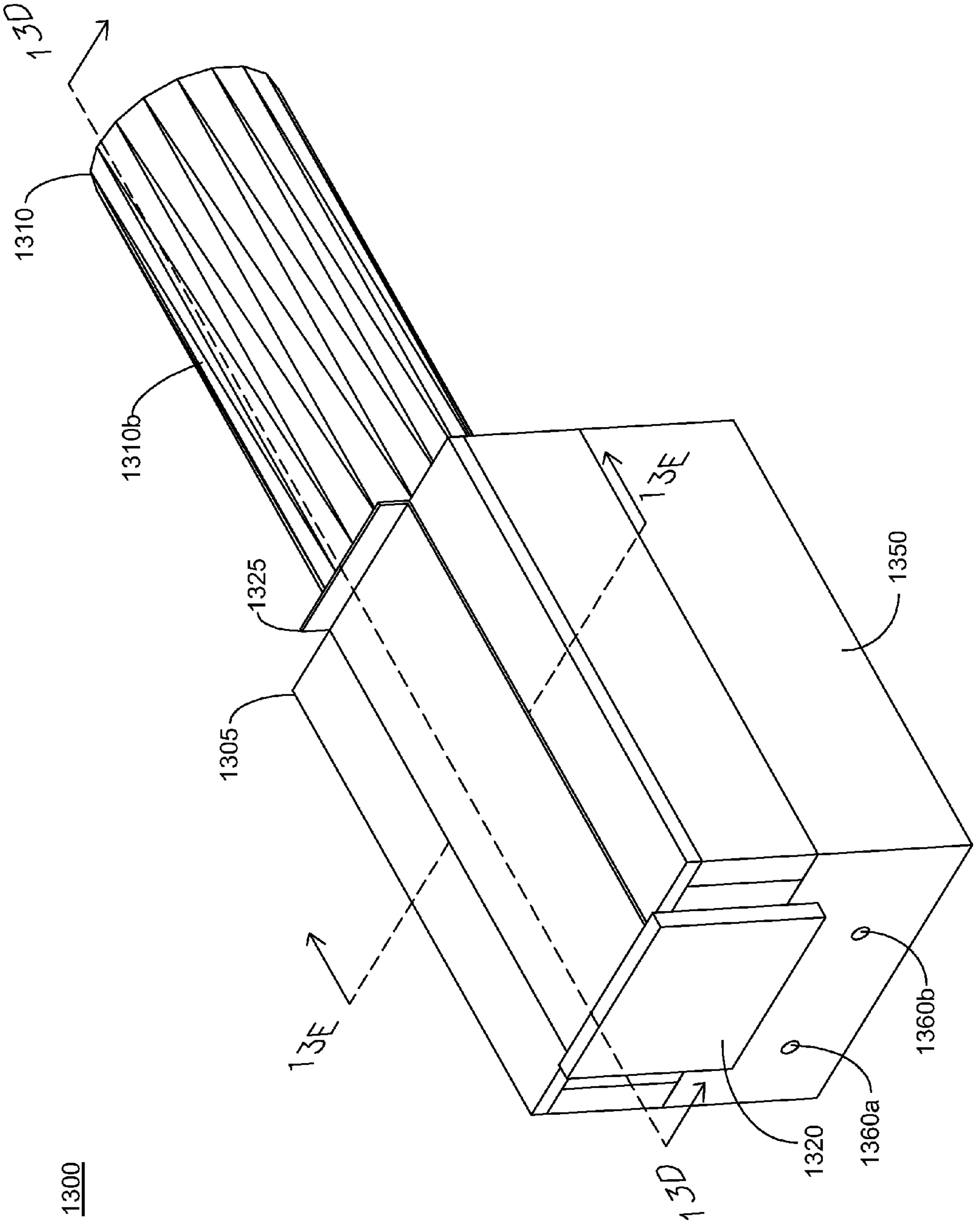
FIG. 13A shows a front perspective view of a parallel plate transmission line duct in accordance with an embodiment of the present invention.

FIG. 13A shows a front perspective view 1300 of an embodiment of a parallel plate transmission line duct 1305 with a coaxial current feed 1310. Electrolyte manifold 1350 supports anodes 1360*a* and 1360*b*. Anode 1360*a* is disposed in the intake port 1350*a* (see FIG. 13C) of the electrolyte manifold 1350 and anode 1360*b* is disposed in the exhaust port 1350*b* (see FIG. 13C) of the electrolyte manifold 1350. A shunt 1320 couples the transmission line working electrode 1315 (shown in FIGS. 13C, 13D, and 13E) to the transmission line return electrode 1325. The transmission line return electrode 1325 is connected to the outer conductor 1310*b* of the coaxial current feed 1310. An electrolytic power supply (pulsed or DC) similar to redox power supply 105 shown in FIG. 1 may be connected to anodes 1360*a* and 1360*b* with the shunt 1320 serving as the cathode connection.

Figure 13B:
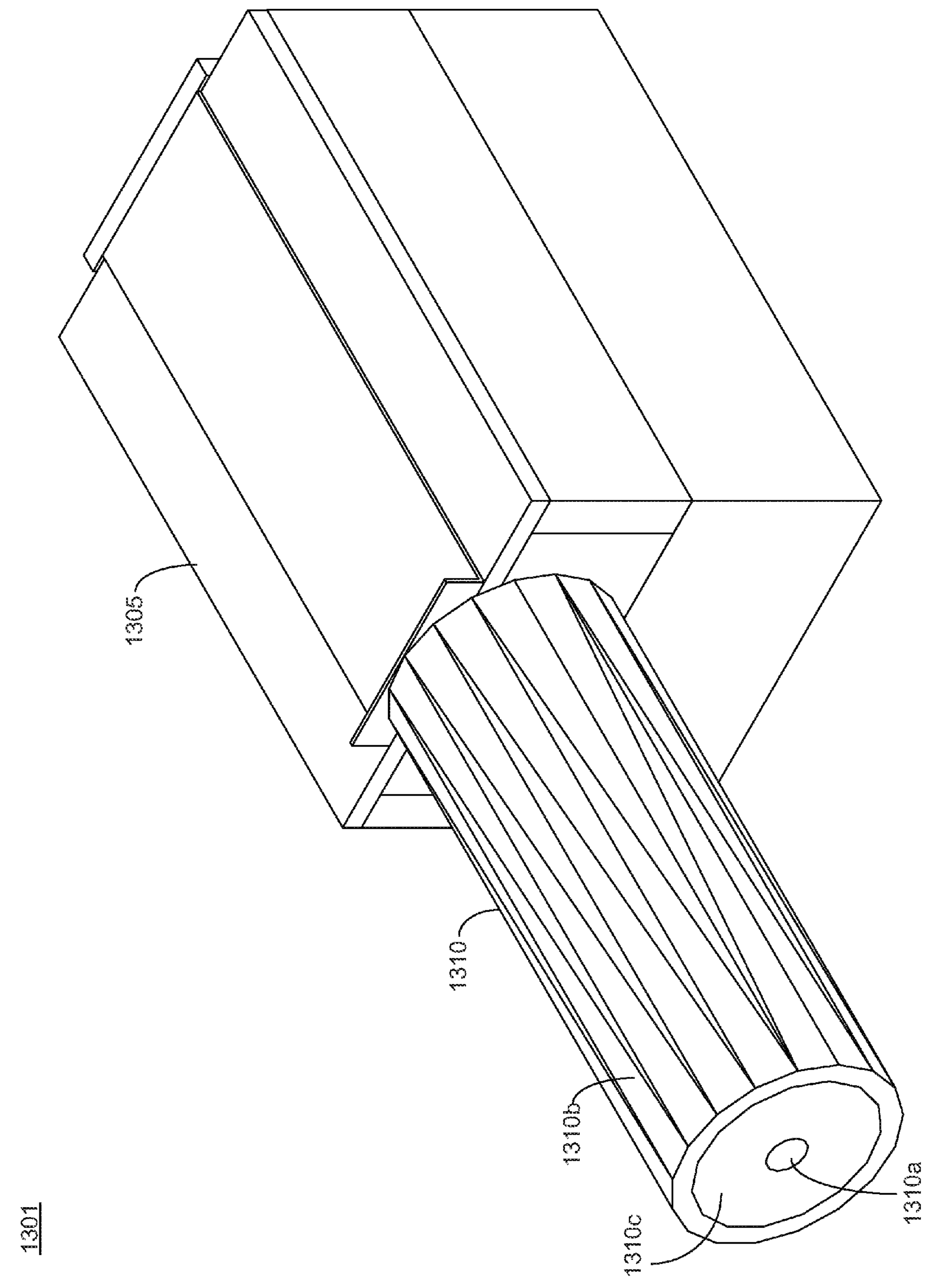
FIG. 13B shows a rear perspective view of the parallel plate transmission line duct of FIG. 13A.

FIG. 13B shows a rear perspective view 1301 of the parallel plate transmission line duct 1305 and coaxial current feed 1310 of FIG. 13A. Coaxial current feed 1310 includes a center conductor 1310*a* separated from outer conductor 1310*b* by a dielectric 1310*c*. In other embodiments, stripline or parallel plates may be used as current feeds.

Figure 13C:
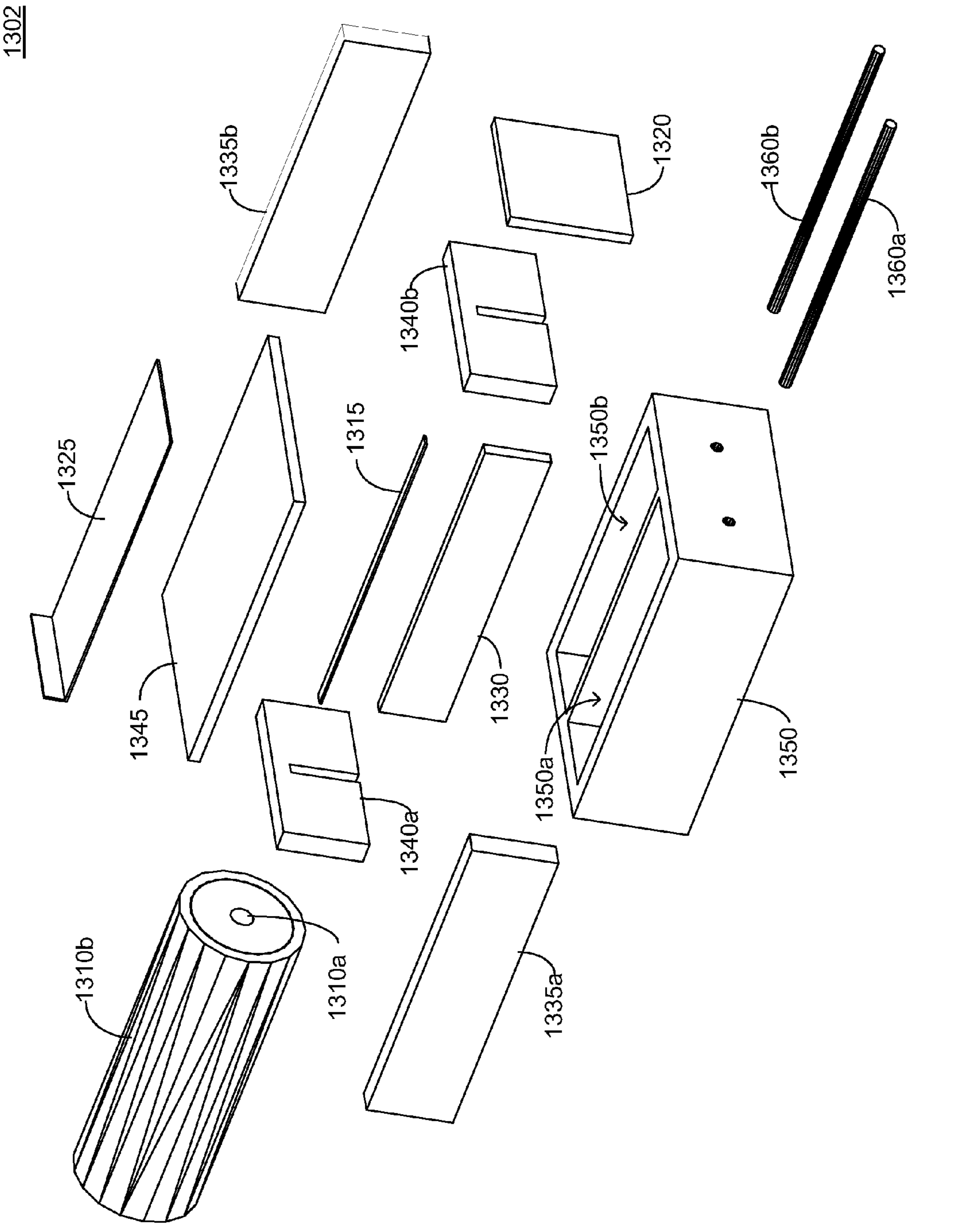
FIG. 13C shows an exploded view of the parallel plate transmission line duct of FIG. 13A.

FIG. 13C shows an exploded view 1302 of the parallel plate transmission line duct 1305 and coaxial current feed 1310 of FIG. 13A. The coaxial center conductor 1310*a*, transmission line working electrode 1315, shunt 1320, transmission line return electrode 1325, and coaxial outer conductor 1310*b* make up the magnetic pumping current path. An electrolyte (not shown) flowing through electrolyte manifold 1350 couples anodes 1360*a* and 1360*b to* the transmission line working electrode 1315 to provide an electrolytic current path. Transmission line dielectric 1345, transmission line working electrode 1315, electrode support 1330, sidewalls 1335*a* and 1335*b*, and end seals 1340*a* and 1340*b* provide a duct that carries electrolyte between intake port 1350*a* and exhaust port 1350*b*.

Figure 13D:
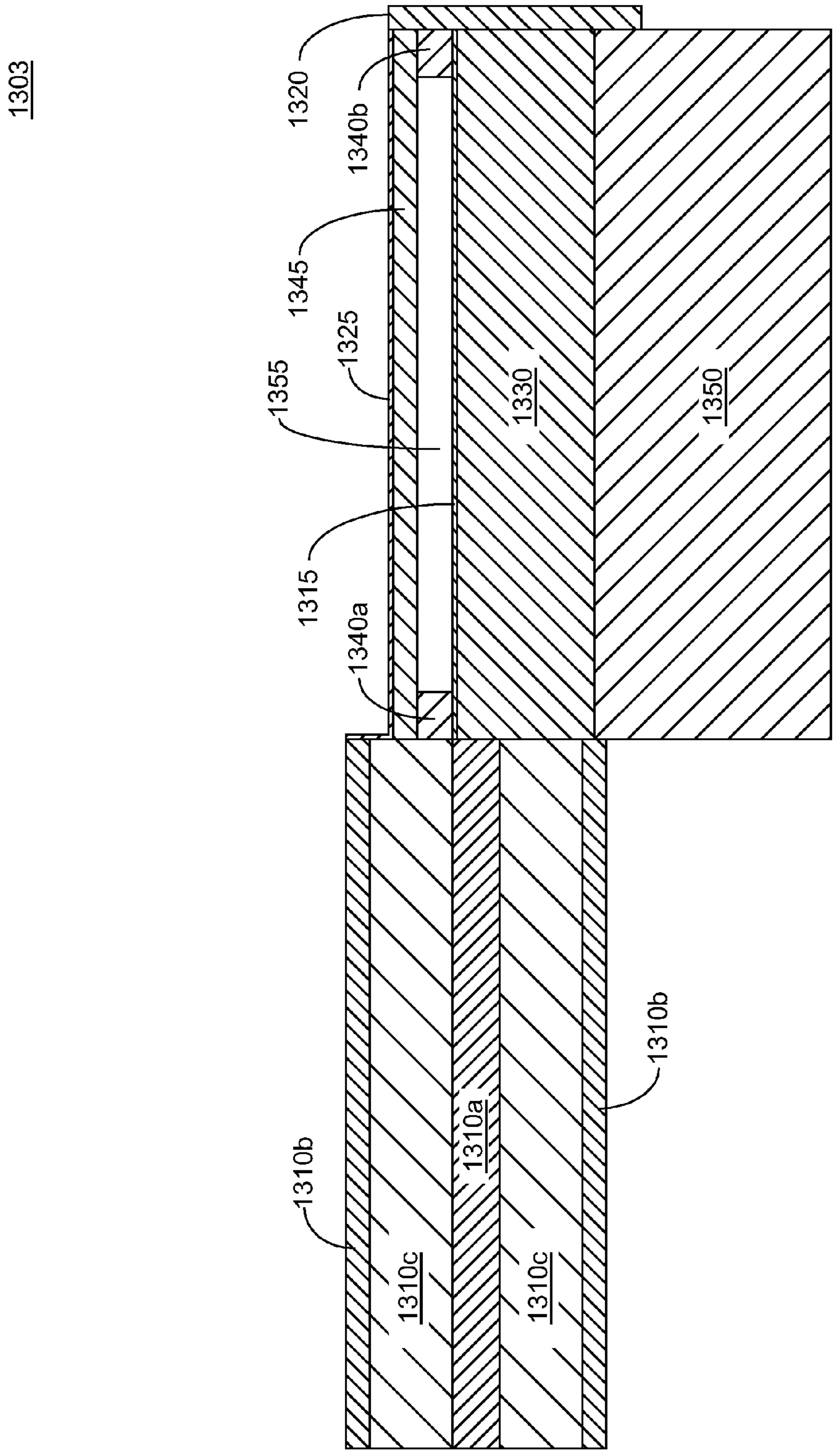
FIG. 13D shows a long section view of the parallel plate transmission line duct of FIG. 13A.

FIG. 13D shows a long section view 1303 of the parallel plate transmission line duct1305 and coaxial current feed 1310 of FIG. 13A. The endseals 1340*a*. and 1340*b* mask a portion of the transmission line working electrode 1315 and define the axial extent of the electrolyte volume 1355 adjacent to the transmission line working electrode 1315. The endseals 1340*a* and 1340*b*, electrolyte volume 1355, and transmission line dielectric 1345 contribute to the capacitance between transmission line working electrode 1315 and transmission line return electrode 1325; thus, it is desirable to fabricate these parts out of materials with a low dielectric constant and low loss characteristics. Since the current in transmission line working electrode 1315 decreases with increasing distance from the coaxial center conductor 1310*a*, the magnitude of the capacitive shunt current places a limit on the practical length of the transmission line working electrode 1315 with respect to maintaining a magnetic field with a minimum required field strength adjacent to the transmission line working electrode 1315.

Figure 13E:
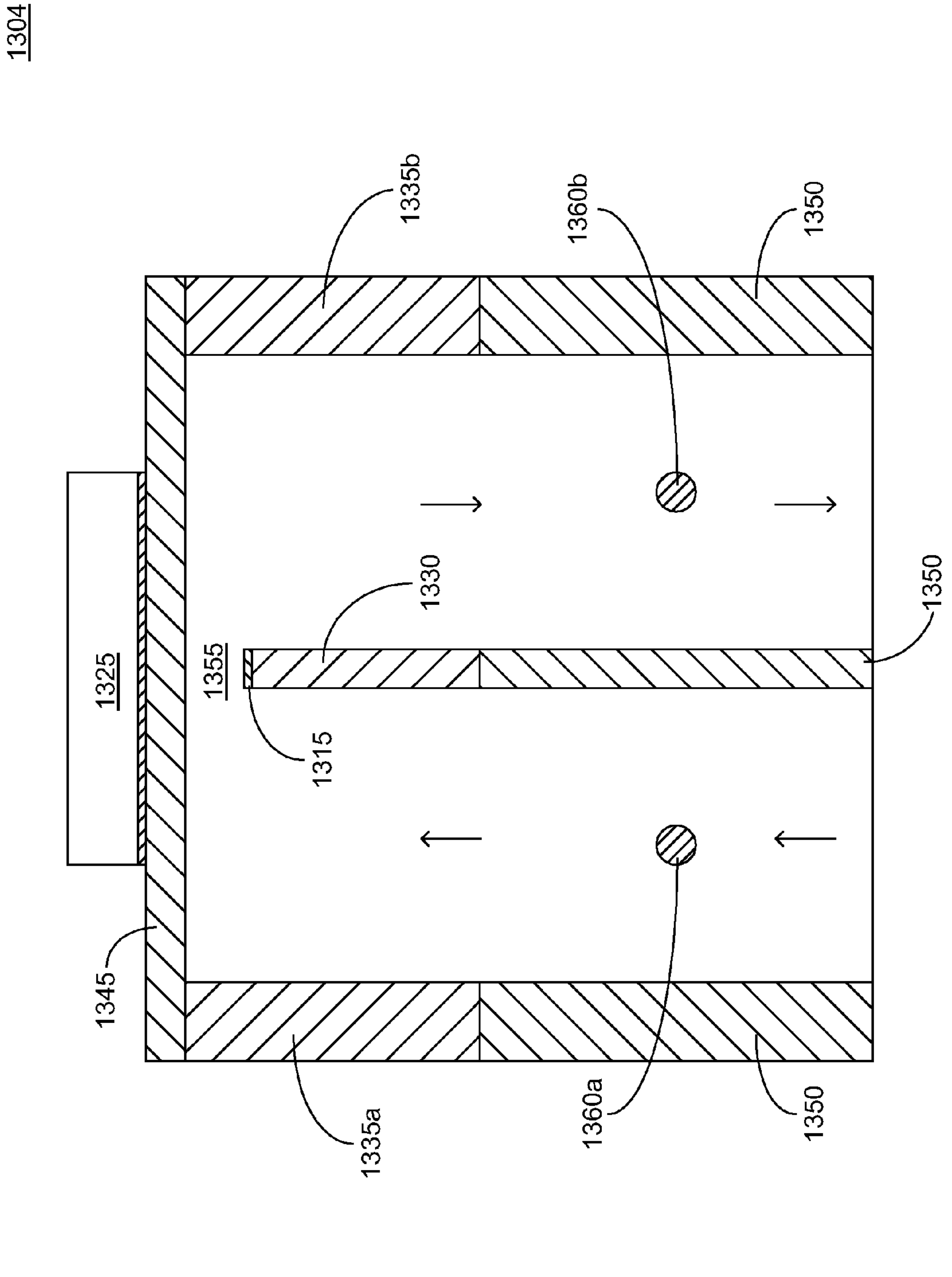
FIG. 13E shows a cross section view of the parallel plate transmission line duct of FIG. 13A.

FIG. 13E shows a cross section view 1304 of the parallel plate transmission line duct 1305 of Flu. 13A. With respect to the electrolyte flow in transmission line duct 1305, anode 1360*a* is upstream of transmission line working electrode 1315 and anode 1360*b* is downstream of transmission line working electrode 1315. This arrangement allows for an effective bidirectional transport of species between anodes and cathode while maintaining a unidirectional mass flow in the transmission line duct 1305. In general, advection is the dominant mode of mass transfer between anode (s) and cathode. In other embodiments, multiple anodes may be used in the electrolyte manifold 1350. The surfaces of the electrolyte manifold 1350 may also be coated with a suitable conductive material to provide an extended anode area. The separation between the transmission line working electrode 1315 and anodes 1360*a* and 1360*b* is largely dictated by need to minimize high frequency coupling between the transmission line working electrode 1315 and anodes 1360*a* and 1360*b*.

Figure 13F:
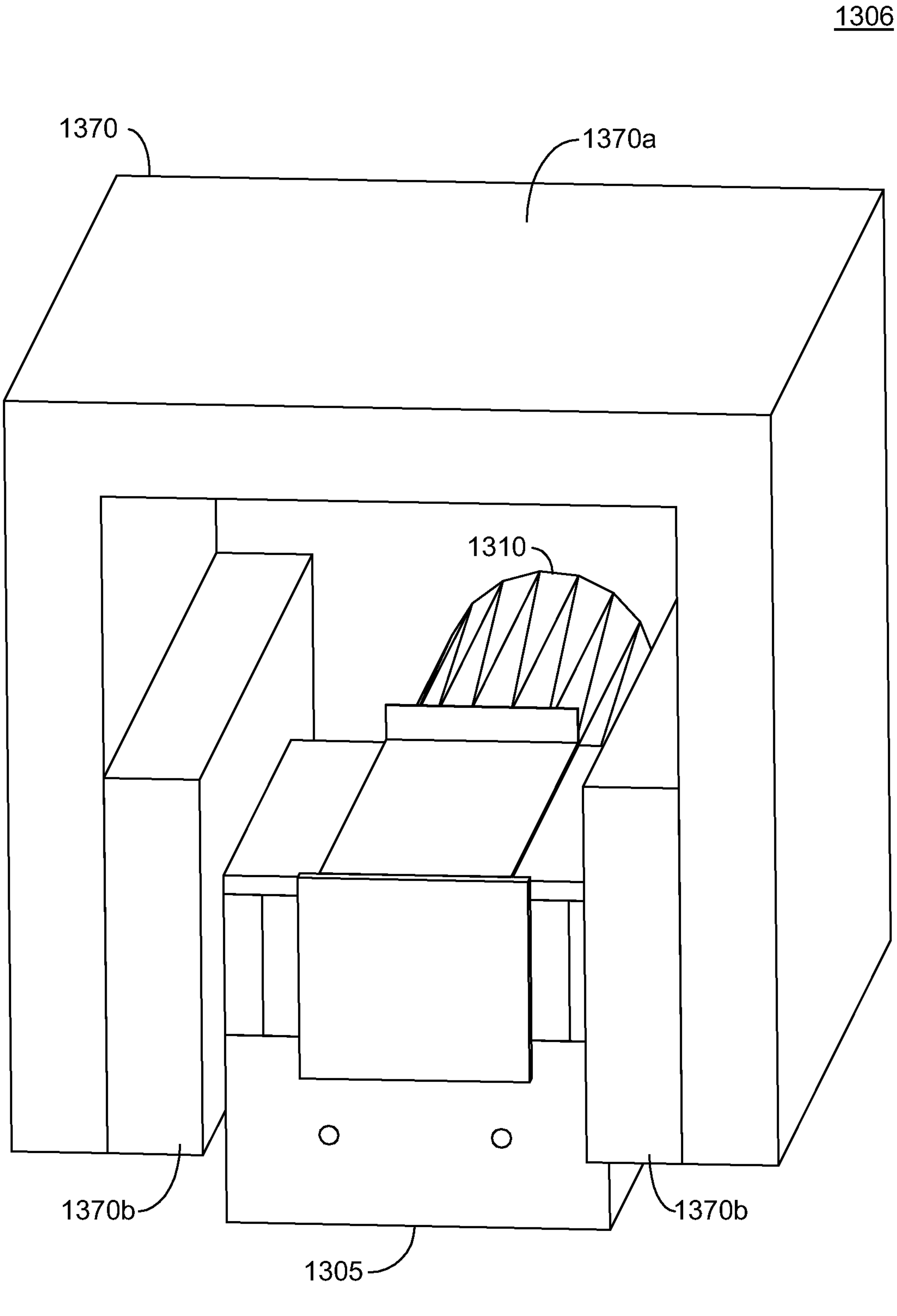
FIG. 13F shows a front perspective view of the parallel plate transmission line duct of FIG. 13A with a level splitting magnet in accordance with an embodiment of the present invention.

FIG. 13F shows a front perspective view 1306 of the parallel plate transmission line duct 1305 and coaxial current feed 1310 of FIG. 13A with an embodiment of a coupled level-splitting magnet 1370. The level splitting magnet 1370 includes a high permeability yoke 1370*a* that serves as a low reluctance flux path and keeper for pole pieces 1370*b*. The level-splitting magnet 1370 is oriented so that the DC flux is essentially parallel with the surface of transmission line working electrode 1315. In other embodiments the level-splitting magnet 1370 may be rotated about the working electrode 1315 so that the angle between the DC flux and the surface of the transmission line working electrode 1315 is 90 degrees, or less.

Pole pieces 1370*b* have faces that are essentially flat and parallel and are well suited to maintaining a uniform flux density through a rotation about the transmission line duct 1305. However, for magnets that are to be used in a fixed angular orientation the faces may be curved or beveled. This is particularly true when the DC magnetic flux is parallel (0 degree orientation) to the surface of the transmission line working electrode 1315.

In other embodiments, the level-splitting magnet 1370 may be an electromagnet, or may be a monolithic structure fabricated from a hard magnetic alloy or ferrite material. Although it is desirable to minimize the size of the level-splitting magnet 1370, it may also desirable to minimize coupling of the magnet structure with the magnetic field produced by the pumping current. In some embodiments a level-splitting magnet may be integrated with the duct, thus serving to aid in enclosing the electrolyte. A level splitting magnetic field may also be produced by a direct current flowing in transmission line working electrode 1315; however, such a field will be essentially parallel to the high frequency pumping field at the surface of the working electrode.

Although a single transmission line duct 1305 may serve as a basis for an analytic instrument, it is difficult to construct an individual transmission line duct with a large wetted electrode area (e.g., 0.1 square meter) that can be used in a manufacturing process. In order to obtain a large overall working electrode area, it is preferable to assemble an array of transmission line ducts that may share a common electrolyte; and in some embodiments, a common electrode. In a large array, it is also desirable to have the capability to monitor the function of each transmission line duct in the array.

Figure 14A:
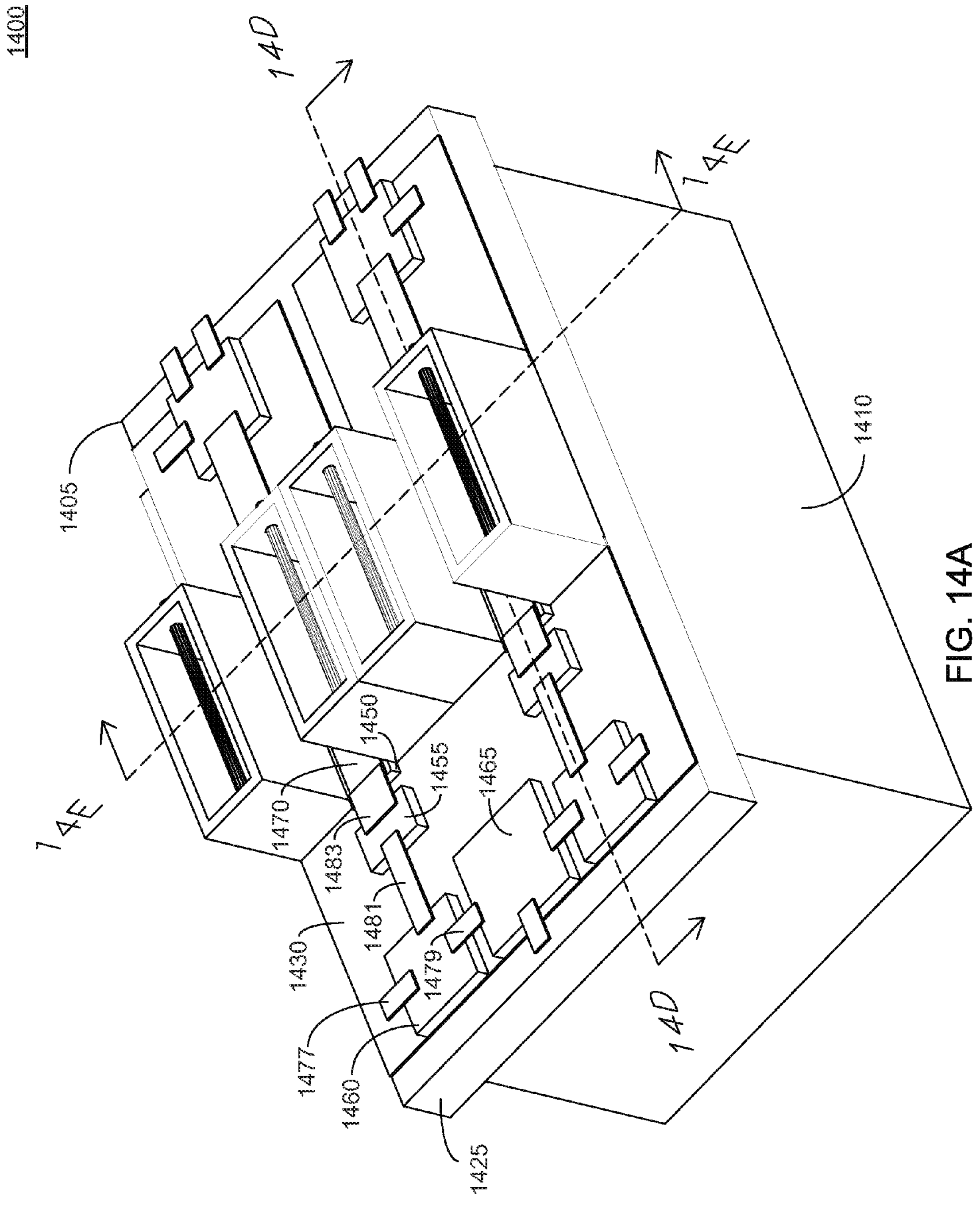
FIG. 14A shows a front perspective view of a transmission line duct array in accordance with an embodiment of the present invention.

FIG. 14A shows a front perspective view 1400 of an embodiment of an electrolytic transmission line duct array 1405 having two transmission line ducts sharing a common substrate 1425 and a common liquid metal electrode reservoir 1410. In the electrolytic transmission line duct array 1405, the two transmission line ducts are mirrored and share a common communication/control interface 1465. In other embodiments, each transmission line duct may have a dedicated communication/control interface.

A driver module 1460 is coupled to a current amplifier 1455 by a conductor 1481. The driver module 1460 provides a signal waveform that contains one or more pumping frequencies. The driver module 1460 may condition a signal received over an optional port 1477 or it may have an intrinsic signal generation capability. For example, driver module 1460 may provide frequency synthesis based on a voltage controlled oscillator (VCO) and/or provide gain. Feedback and control signals between driver module 1460 and communication control interface 1465 are exchanged over signal bus 1479. driver module 1479 may provide mixing and/or combining of an external signal with one or more internally generated signals.

The communication/control interface 1465 monitors the signal received at port 1477 and/or the signal provided to the current amplifier 1455. The communication/control interface 1465 may also provide adjustment of the monitored signal. The communication/control interface 1465 communicates with an external controller (e.g., 1810 of FIG. 18A) to provide status information and/or receive commands (e.g., enable/disable). In large arrays containing many thousands of transmission line ducts, the communication/control interface 1465 may be part of a hierarchical system for monitoring and control, and may utilize interrupts, polling, and/or a unique network address. The communication/control interface 1465 may include a test circuit that can be switched into the signal chain for test purposes.

In general, the current amplifier 1455 may be configured as a linear amplifier or may be configured as a switching amplifier. The current amplifier 1455 is coupled to a ground plane 1430 (e.g., common source). The current amplifier 1455 may be a single transistor or may provide more than one stage of gain. The current amplifier 1455 is coupled to a return electrode 1470 by a conductor 1483. Conductor 1483 may be configured to provide a particular value of inductance and/or capacitance for tuning. Return electrode 1470 is supported by a dielectric 1450.

Figure 14B:
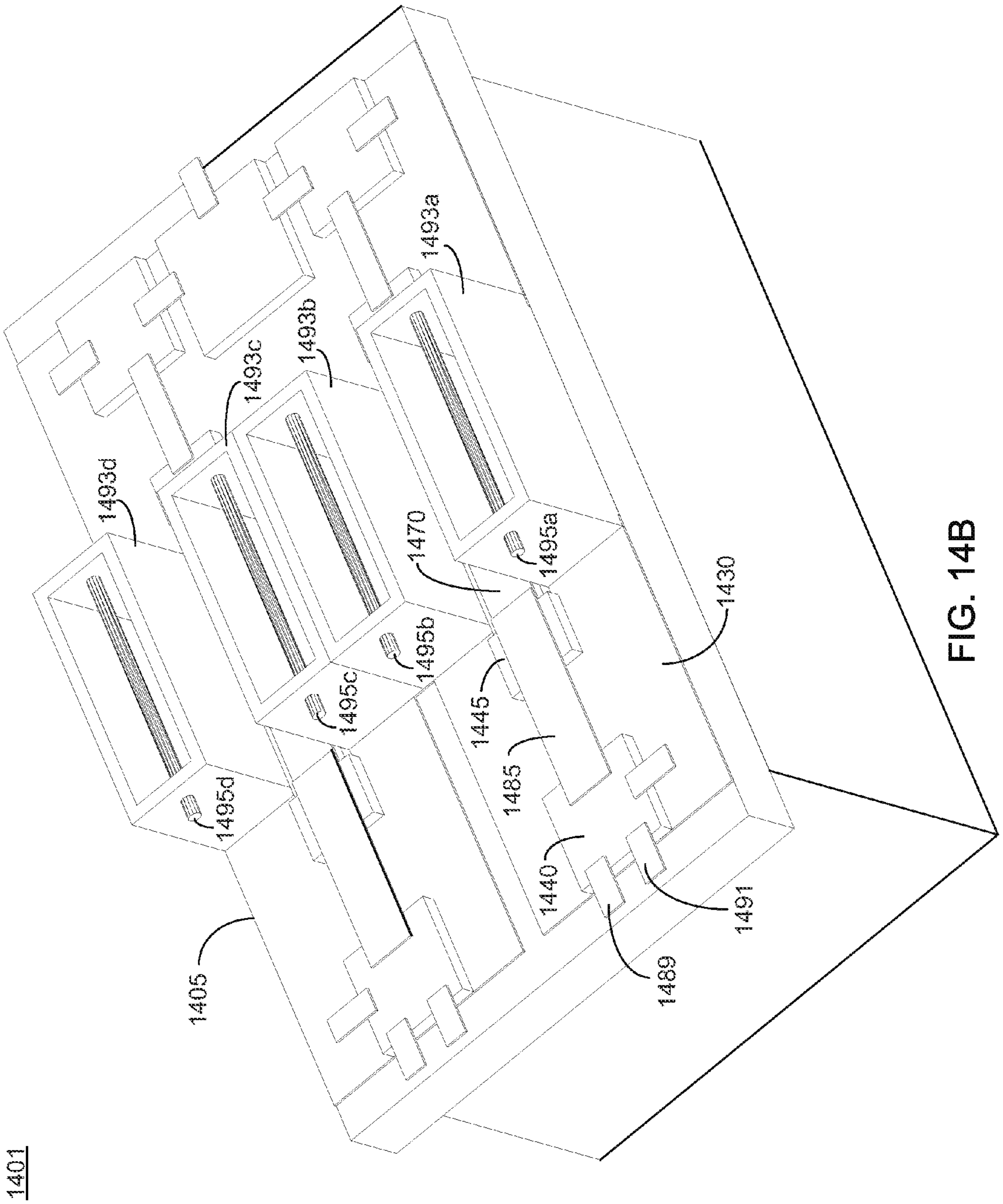
FIG. 14B shows a rear perspective view of the transmission line duct array of FIG. 14A.

FIG. 14B shows a rear perspective view 1401 of the transmission line duct array 1405 of FIG. 14A. Return electrode 1470 is coupled to a shunt capacitor 1445 that is coupled to ground plane 1430. Shunt capacitor 1445 provides filtering for the DC supply. Return electrode 1470 is also coupled to communication/control interface 1440 by conductor 1485. Conductor 1485 may be configured to provide a particular value of inductance and/or capacitance for tuning.

Communication/control interface 1440 monitors the DC voltage and/or current provided at DC supply port 1489. The current provided at DC supply port 1489 is modulated by current amplifier 1455 to produce an alternating magnetic field for pumping. Communication/control interface 1440 may also monitor the electrolytic current provided by an electrolytic power supply (e.g., 1865 of FIG. 18A) coupled to cathode port 1491 and anodes 1495*a* and 1495*b*. Communication/control interface 1440 may be part of a hierarchical system for monitoring and control, and may utilize interrupts, polling, and/or a unique network address. The communication/control interface 1440 may include a test circuit that can be switched into the circuit for test purposes. In other embodiments, communication/control interface 1440 may be integrated with or coupled to communication/control interface 1465.

During selective magnetic pumping of an electrolytic process, the current level is typically different from the current level in an unpumped process. Thus, a change in the electrolytic current observed during pumping may be used to detect a potential problem with the pumping process. For example, a pumping process that inhibits the reduction of $^{238}$U cationic species in natural or depleted uranium would manifest a current increase if the pumping action were lost. Electrolytic current level monitoring may also be used to tune the pumping circuit. For example, the pumping circuit frequency or DC magnetic field may be tuned to produce a minimum electrolytic current at a particular applied electrolytic voltage.

Input ports 1493*a* and 1493*b* provide for electrolyte flow to one of the transmission line ducts in array 1405 and inputs ports 1493*c* and 1493*d* serve the other transmission line duct. Similarly, anodes 1495*a* and 1495*b* provide for electrolytic current flow to one of the transmission line ducts in array 1405 and anodes 1495*c* and 1495*d* serve the other transmission line duct. Within an array 1405, the electrolyte ports may be connected to provide serial or parallel electrolyte flow.

Figure 14C:
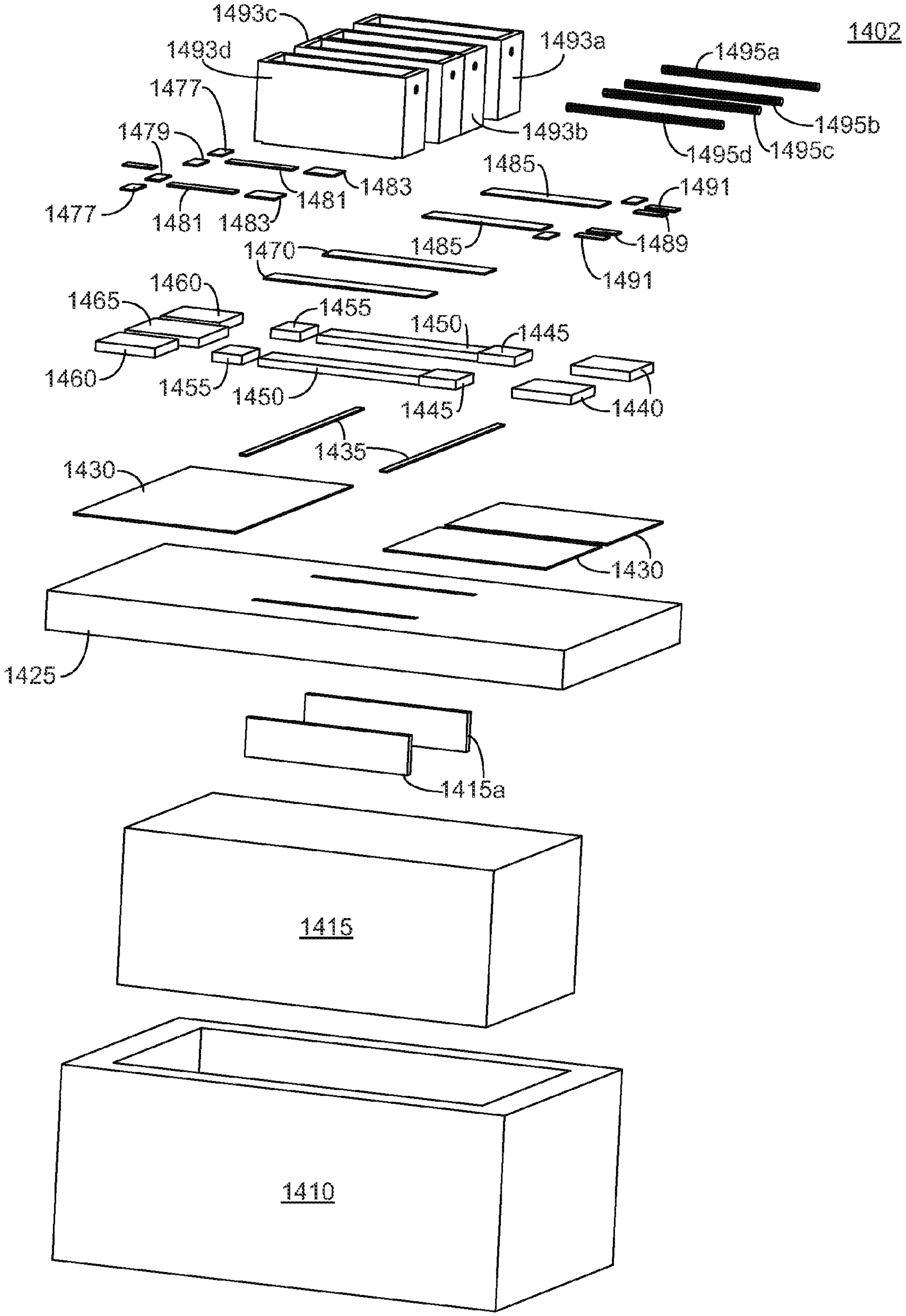
FIG. 14C shows an exploded view of the transmission line duct array of FIG. 14A.
Figure 14D:
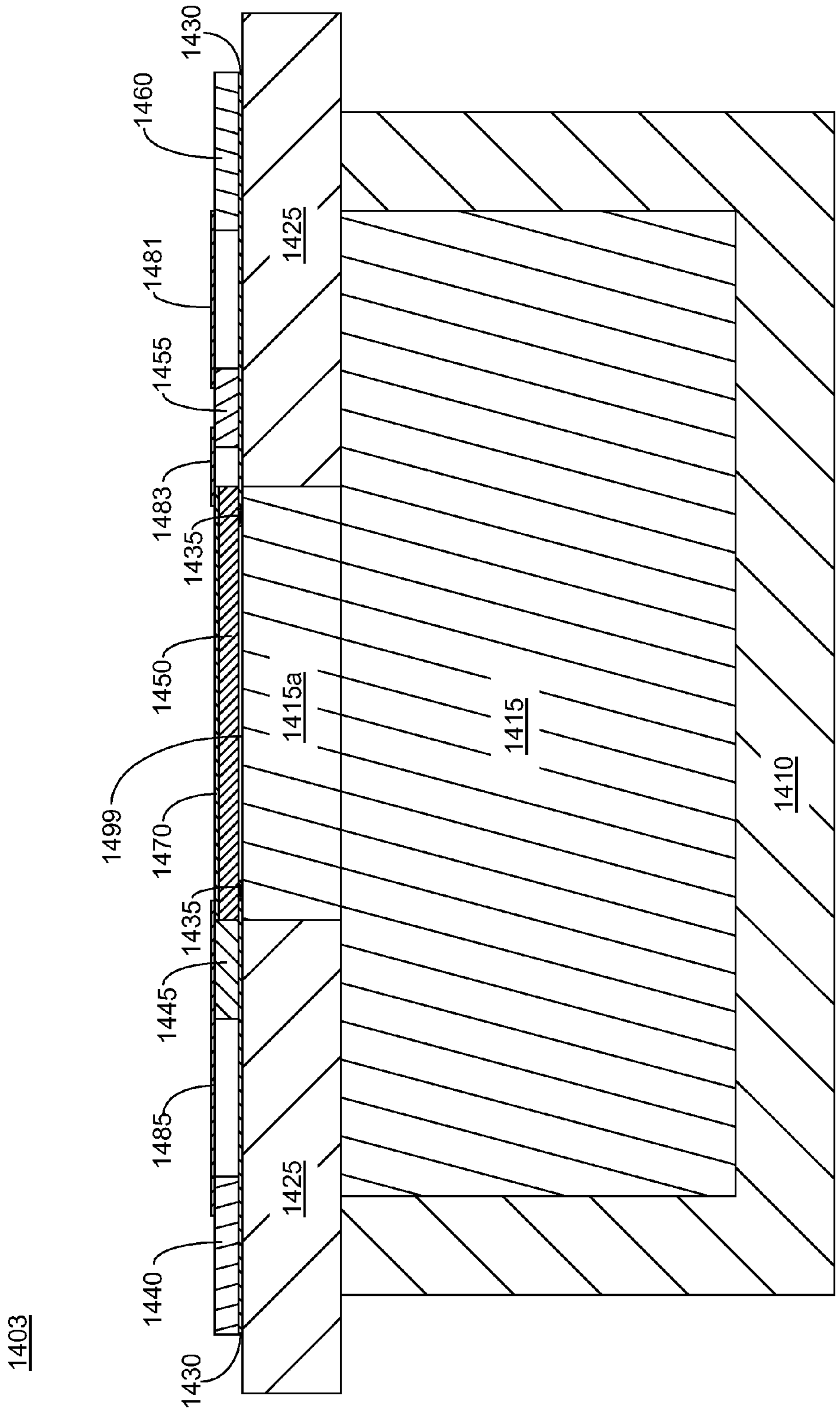
FIG. 14D shows a long section view of the transmission line duct array of FIG. 14A.

FIG. 14C shows an exploded view 1402 of the transmission line duct array 1405 of FIG. 14A. FIG. 14D shows a long section view 1403 of the transmission line duct array 1405 of FIG. 14A. The liquid metal reservoir 1410 contains a volume of liquid metal 1415 (e.g., mercury). that is in contact with riser 1415*a*. Riser 1415*a* may be a simple extension of the liquid metal volume 1415 or it may be porous structure that is infiltrated with liquid metal. For example, risers 1415*a* may be fabricated from vertically aligned parallel wires, or sheets, that allow for a straight diffusion path from the top surface of the riser 1415*a* to the liquid metal volume. The use of a porous copper riser improves thermal transport in the system and also reduces the electrical resistance. It is desirable that surface porosity be fine enough to avoid significant variations in the surface current density that might disturb the uniformity of the pumping magnetic field. In general, it is desirable that the porous structure of the riser 1415*a* be sufficiently wetted by the liquid metal so that a liquid metal surface is in contact with the electrolyte, allowing reduced species to be absorbed into the liquid metal instead of depositing on a solid conductor.

The gap 1499 between dielectric 1450 and riser 1415*a* allows for the flow of electrolyte over the upper surface of riser 1415*a*, which constitutes the working electrode surface. Spacers 1435 establish the height of gap 1499 and define the length of the working electrode surface. The ends of riser 1415*a* are in contact with ground planes 1430. Since return electrode 1470 is isolated from the electrolyte gap 1499, it can be fabricated from a high conductivity material (e.g., copper or silver) without concern for reactions with the electrolyte. In some cases, the working electrode may incur high current densities in specific regions as result of being shaped to improve the uniformity of the pumping magnetic field in the region 1110 of FIG. 11A. The use of high conductivity materials helps to offset the increased loss due to higher current density.

Figure 14E:
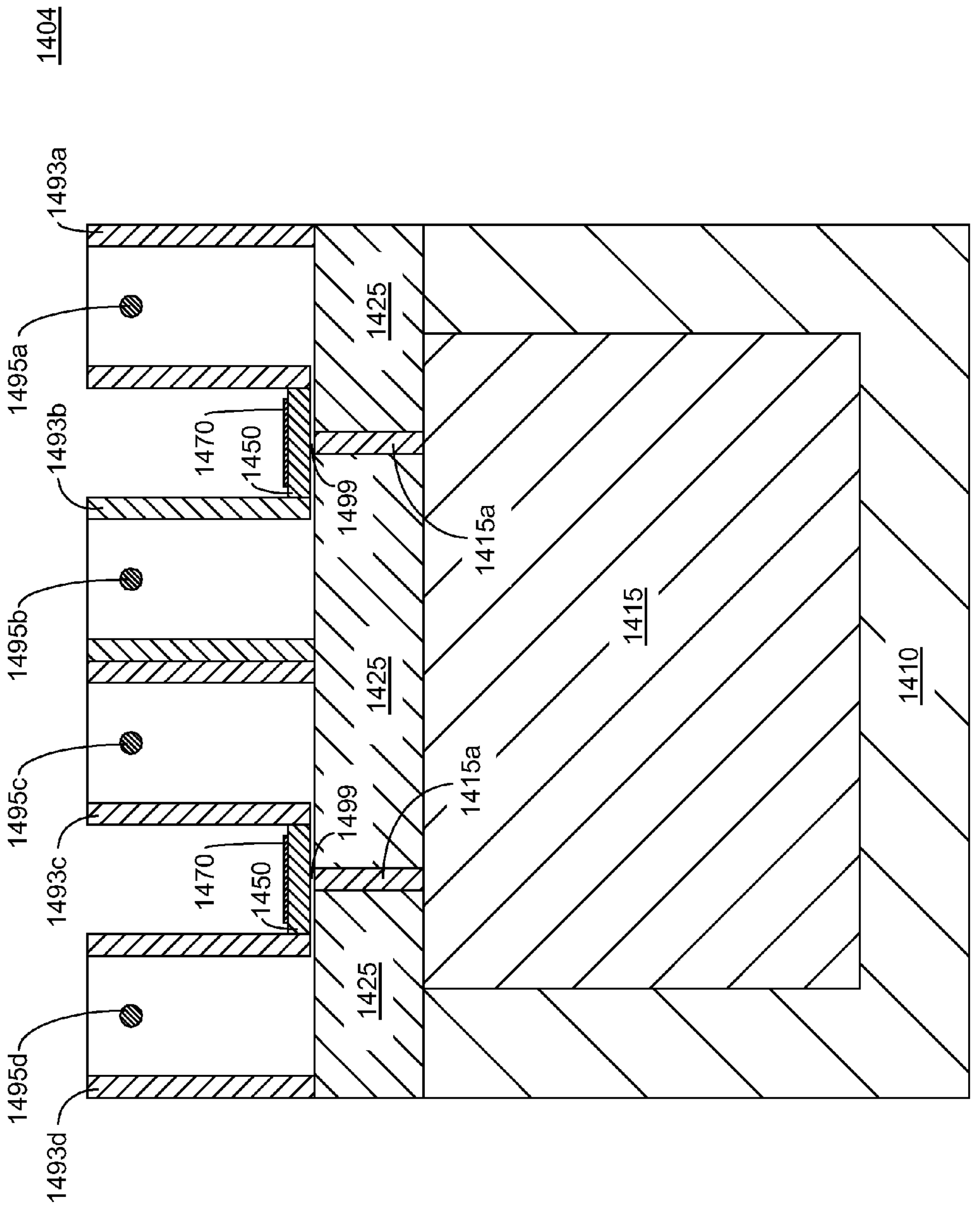
FIG. 14E shows a cross section view of the transmission line duct array of FIG. 14A.

FIG. 14E shows a cross section view 1404 of the transmission line duct array 1405 of FIG. 14A. The electrolyte flowing in gap 1499 and the materials used in the construction of the substrate 1425, dielectric 1450, return electrode 1470 and riser 1415*a* will have the greatest influence on the electrical characteristics of the transmission line duct. Materials selection and geometry provide considerable freedom in optimizing pumping frequency and amplitude while minimizing losses. Two-dimensional or three dimensional finite element modeling may be used to provide a first cut design, followed by hard models. However, due to the potential complexity of the electrolytes and the effects of dimensional tolerances, it may desirable to incorporate a degree of tunability in the final structure design. For example, conductor dimensions may be trimmable.

Figure 14F:
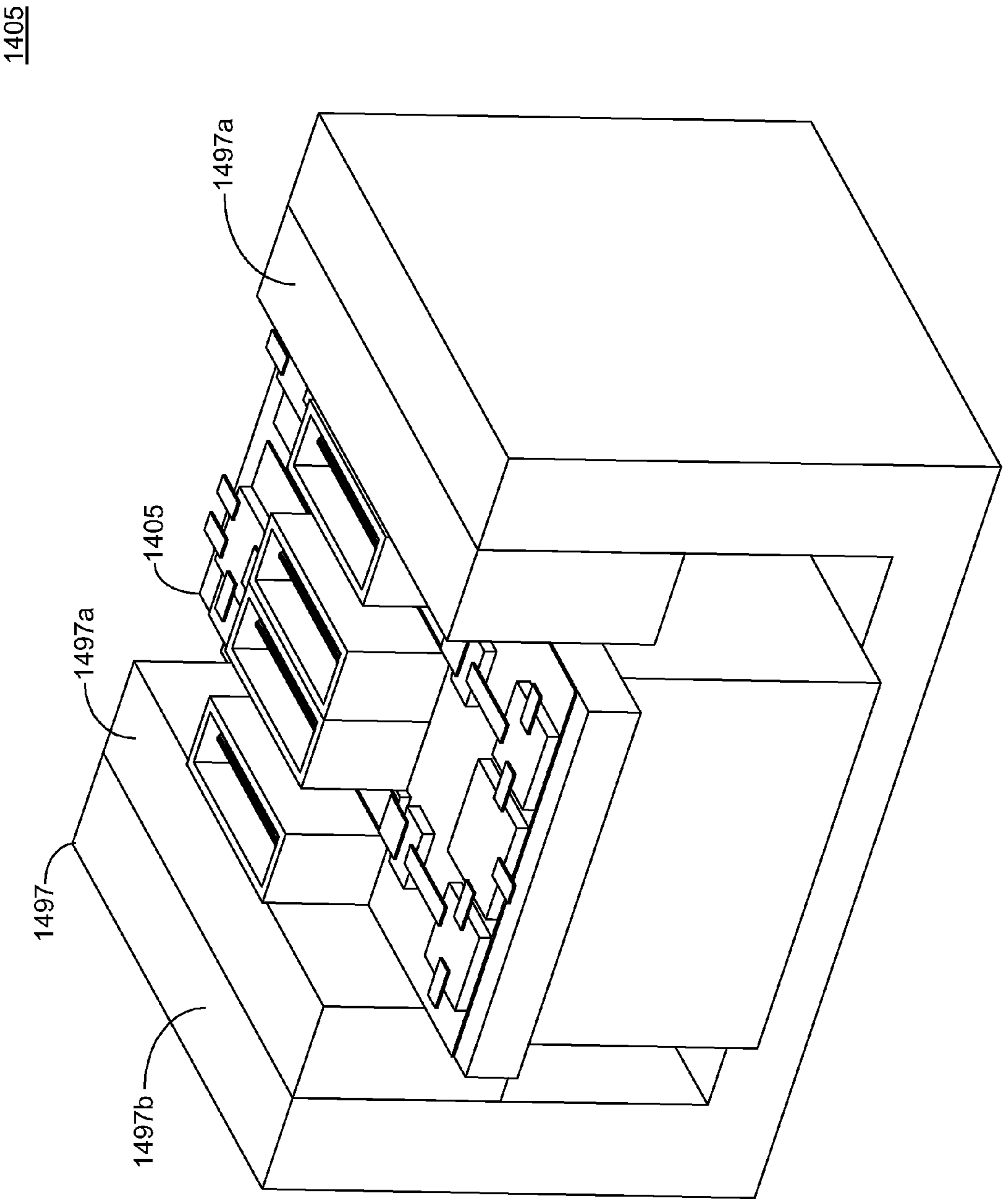
FIG. 14F shows a front perspective view of the parallel plate transmission line duct of FIG. 14A with a shared level splitting magnet in accordance with an embodiment of the present invention.

FIG. 14F shows a perspective view 1406 of the parallel plate transmission line duct 1405 of FIG. 14A with a shared level splitting magnet assembly 1497. The magnet assembly

1497 includes pole pieces 1497*a* and a yoke 1497*b*. The pole pieces 1497*a* are preferably fabricated from a hard magnetic material while the yoke 1497*b* is preferably fabricated from a soft magnetic material. In other embodiments, electromagnets or monolithic permanent magnets may be used. A stable DC magnetic field is desired in order to minimize tuning requirements and drift.

Figure 15A:
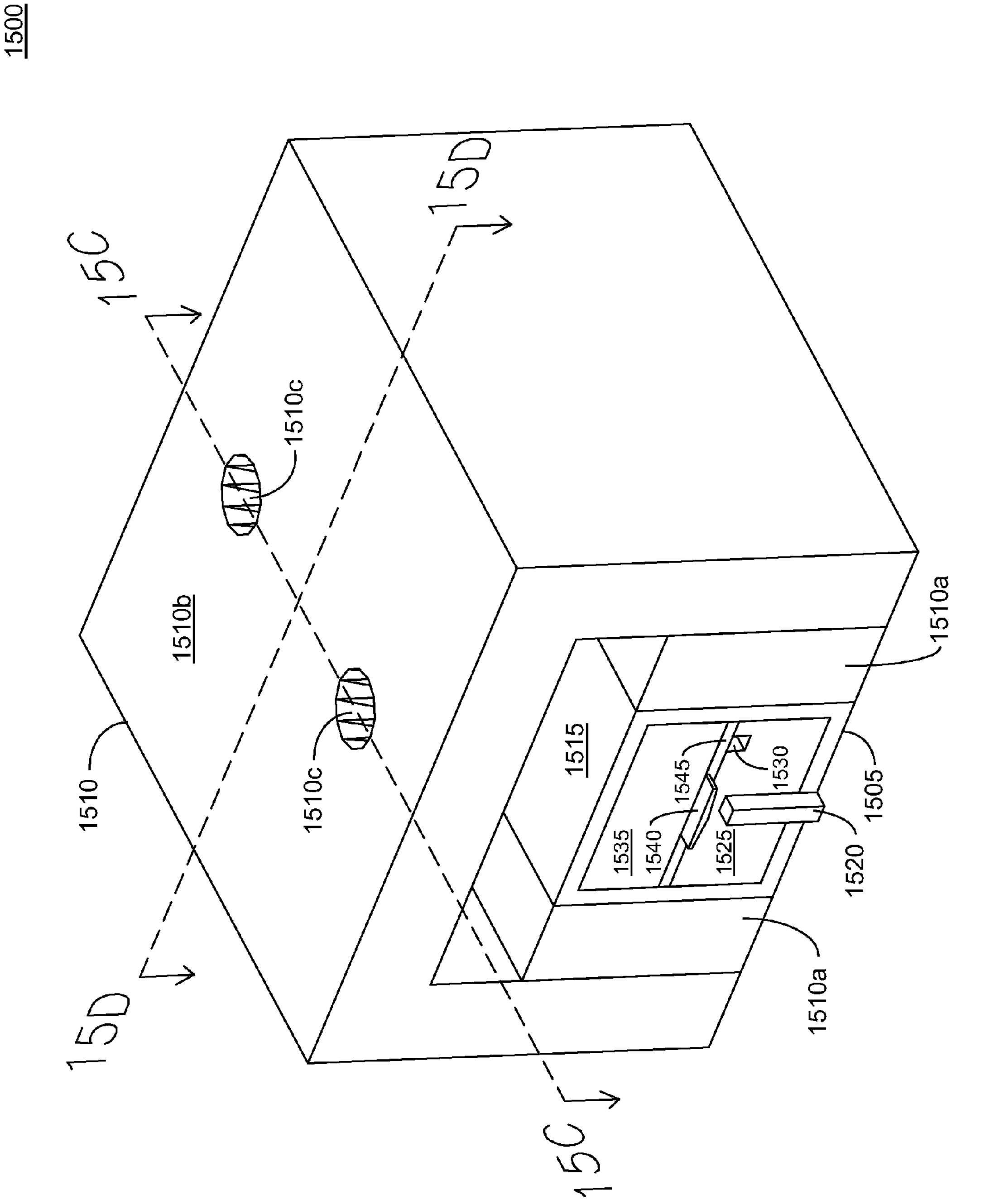
FIG. 15A shows a perspective view of an asymmetric closed transmission line duct in accordance with an embodiment of the present invention.

FIG. 15A shows a perspective view 1500 of an embodiment of an asymmetric closed transmission line duct 1505 with a level splitting magnet assembly 1510. The asymmetric closed transmission line duct 1505 has an outer conductor 1515 that is connected to a working electrode 1520. The magnet assembly 1510 includes a high permeability yoke 1510*b* and pole pieces 1510*a*. The gap between the yoke 1510*b* and the outer conductor 1515 allows for the addition of a winding that may be used to provide limiting tuning of the DC magnetic field (i.e., hybrid magnet). Holes 1510*c* and other cutouts may be used to accommodate conduits for electrolyte and/or liquid metal. Yokes fabricated with a high permeability material can accommodate many shapes without appreciable disturbance of the flux density distribution within the gap. The combination of a closed transmission line duct 1505 allows for arrays to be assembled with greater density since the outer conductor 1515 provides shielding for the magnet assembly 1510.

Figure 15B:
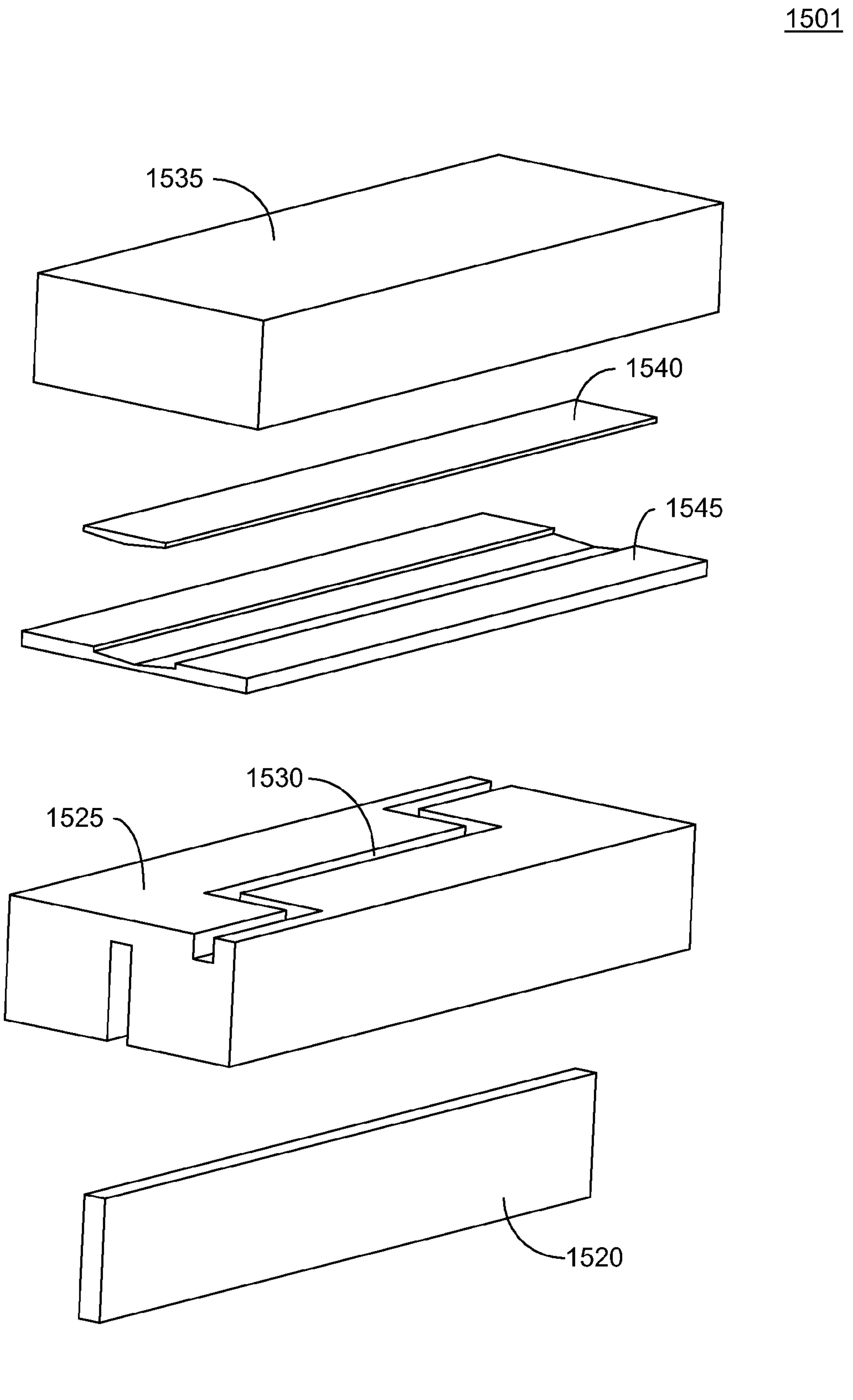
FIG. 15B shows an exploded view of a portion of the asymmetric closed transmission line duct of FIG. 15A.

FIG. 15B shows an exploded view 1501 of the inner portion of the asymmetric closed transmission line duct 1505 of FIG. 15A. A working electrode dielectric 1525 includes an axial flow channel 1530 that is aligned. with the axis of the working electrode 1520. The working electrode dielectric 1525 is preferably inert with respect the electrolyte that it is to be used. Fluorocarbon or organic polymers and composites are examples of materials of that may be used for the working electrode dielectric 1525. Foamed. polymers may also be used. A return electrode supporting dielectric 1545 separates a. return electrode 1540. The return electrode supporting dielectric 1545 is preferably fabricated from a material (e.g., fused silica) that is sufficiently rigid to maintain dimensional stability during operation. The return electrode supporting dielectric 1545 in combination with a cover dielectric 1535 provides an enclosure for the return electrode 1540. The cover dielectric 1535 may be constructed of materials similar to those used for the working electrode dielectric. In general, dielectric materials with a low dielectric loss are preferred, although ferrites used to modify the magnetic fields may have higher dielectric loss.

Figure 15C:
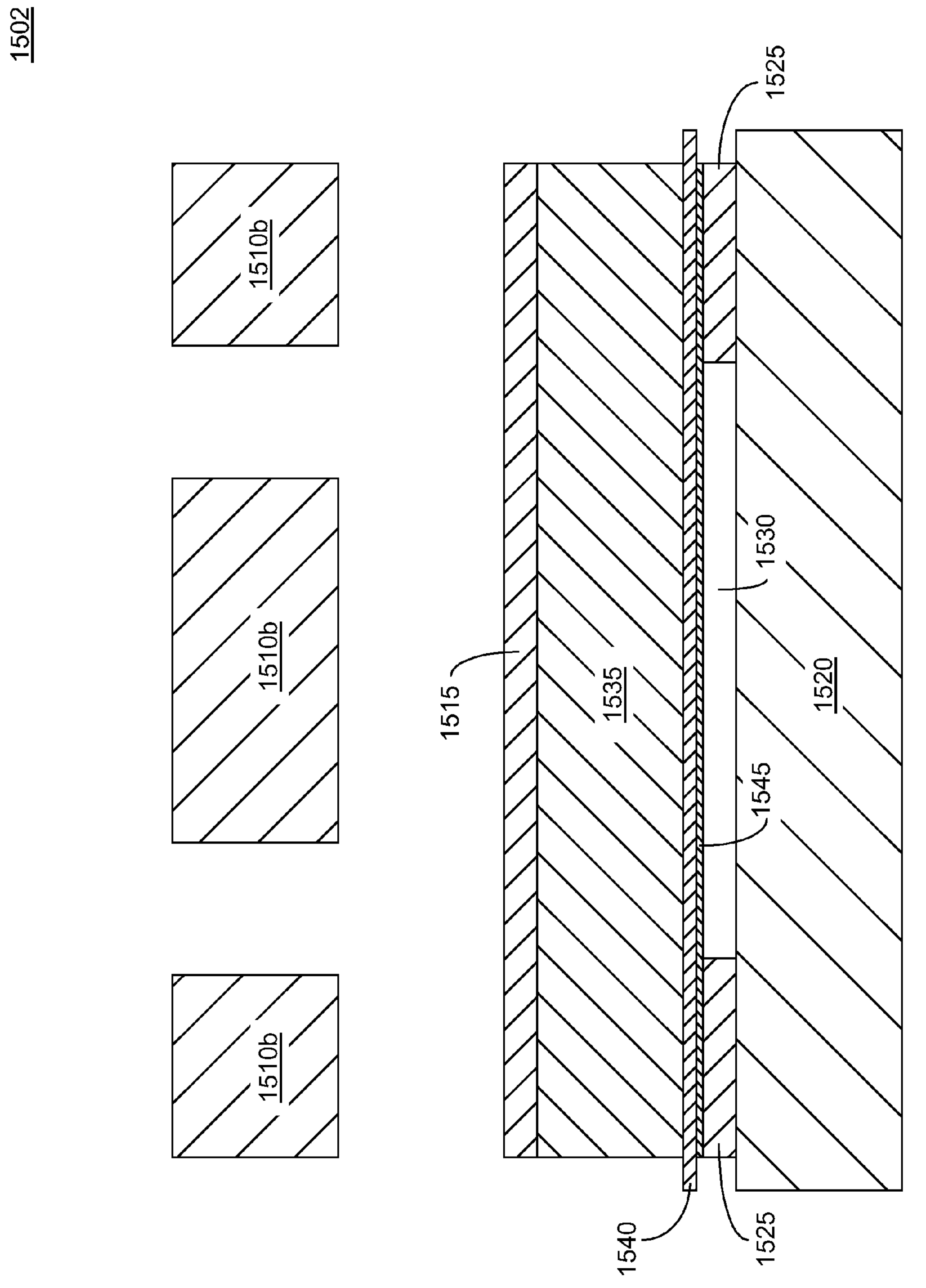
FIG. 15C shows a long section view of the asymmetric closed transmission line duct of FIG. 15A.

FIG. 15C shows a long section view 1502 of the asymmetric closed transmission line duct 1505 of FIG. 15A. The length of the axially aligned portion of the axial flow channel 1530 is defined by the working electrode dielectric 1525. In comparing FIG. 15C to FIG. 14E, it can be seen that the configuration of working electrode 1520 and return electrode 1540 is similar to the configuration of riser 1415*a* and return electrode 1470. Thus, the asymmetric closed transmission line duct 1505 may be adapted for use in the electrolytic transmission line duct array 1405, as may other transmission line configurations described elsewhere in this disclosure.

Figure 15D:
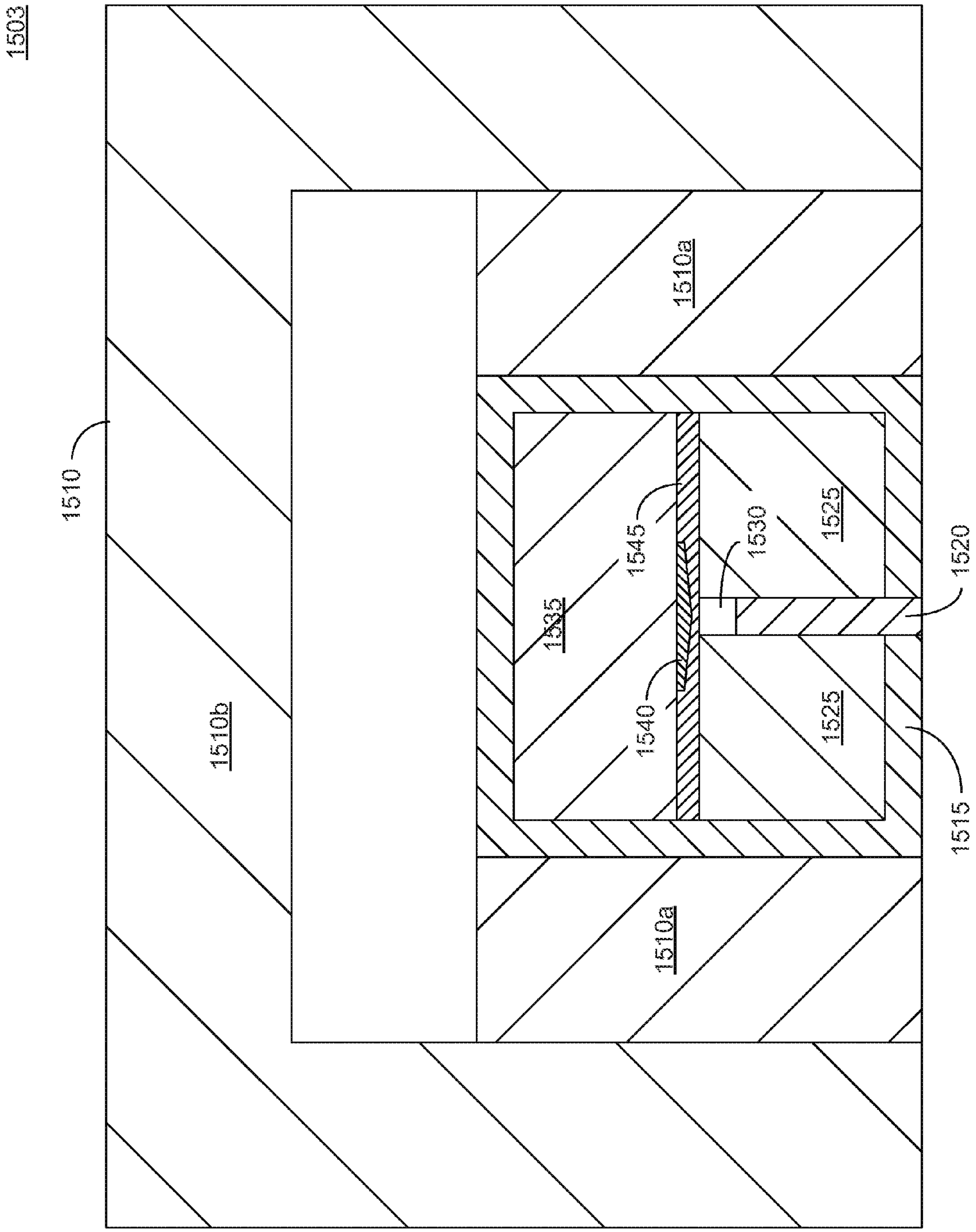
FIG. 15D shows a cross section view of the asymmetric closed transmission line duct of FIG. 15A.

FIG. 15D shows a cross section view 1503 of the asymmetric closed transmission line duct 1505 of FIG. 15A. In this embodiment, the working electrode 1520 and outer conductor 1515 completely surround the working electrode. In other embodiments, the outer conductor may have one or more apertures for electrolyte conduits or liquid metal conduits. The return electrode 1540 has a tapered lower surface that results in a smaller interelectrode spacing at the middle of the return electrode 1540. The taper provides a redistribution of current density that in turn is manifested in the magnetic field density in the axial flow channel 1530. It is generally desirable that the working electrode wetted surface be substantially flat so that the orientation of the externally applied DC magnetic field and the locally generated high frequency magnetic field is uniform over the wetted surface. A curved working electrode surface may be employed to alter the magnet flux density distribution; however, masking may be required to limit the wetted surface area. In practice, it is desirable to avoid sharp edges or corners on high frequency conductors.

Figure 15E:
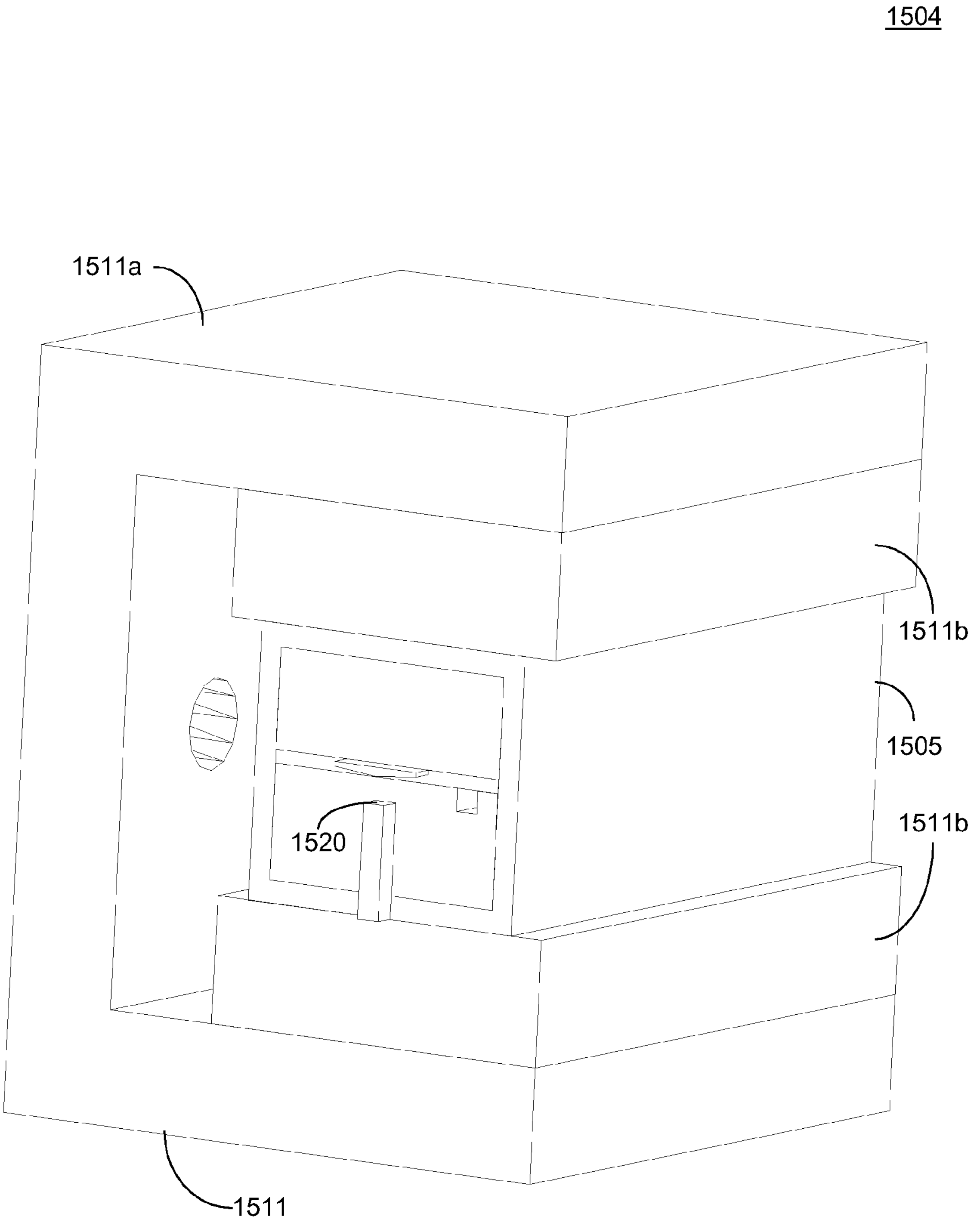
FIG. 15E shows a perspective view of an asymmetric closed transmission line duct with a perpendicular magnet in accordance with an embodiment of the present invention.

FIG. 15E shows a perspective view 1504 of an asymmetric closed transmission line duct 1505 with a perpendicular magnet assembly 1511. Perpendicular magnet 1511 includes a yoke 1511*a* and pole pieces 1511*b*. Perpendicular magnet assembly 1511 provides a DC magnetic field that is normal to the high frequency field produced at the wetted surface of working electrode 1520. A ninety degree angle between the DC magnetic field vector $B_0$ and the high frequency magnetic field vector $B_1$ is a preferred field orientation for magnetic pumping.

Figure 16A:
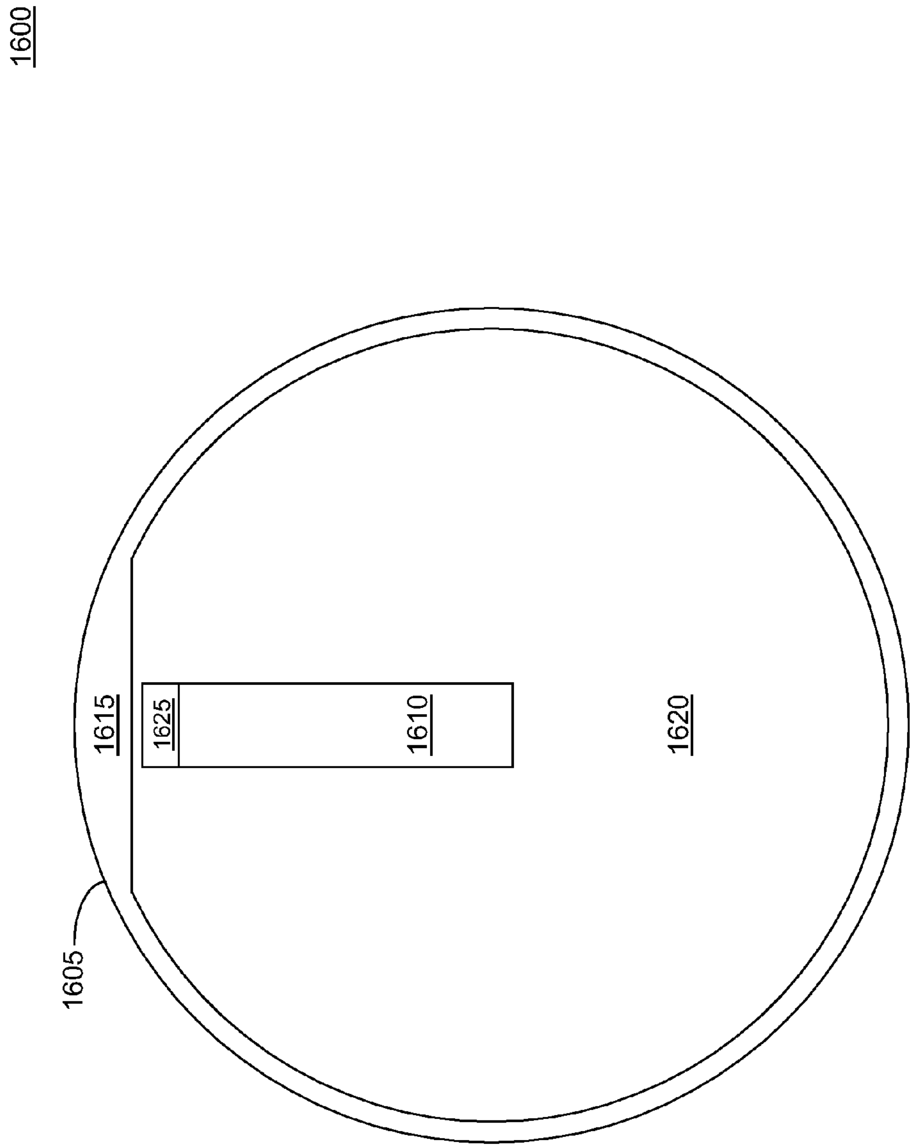
FIG. 16A shows a cross section view of a circular asymmetric closed transmission line duct with a tall inner working electrode in accordance with an embodiment of the present invention.

FIG. 16A shows a cross section view 1600 of a circular asymmetric closed transmission line duct 1605 with an inner working electrode 1610. A dielectric 1620 surrounds the inner working electrode 1610 and provides an electrolyte channel 1625 that is in contact with a portion of the inner working electrode 1610. The outer electrode 1615 is isolated from the electrolyte channel by the dielectric 1620. The circular asymmetric closed transmission line duct 1605 differs from a typical coaxial transmission line in that the inner working electrode 1610 is not strictly coaxial and may lack radial symmetry.

In a typical coaxial transmission line, the radial spacing between the inner conductor and outer conductor is uniform, whereas in the asymmetric closed transmission line duct 1605 the radial spacing varies considerably. The close spacing between the inner working electrode 1610 and the outer electrode 1615 enhances the pumping magnetic flux density within the narrowed region between the inner working electrode 1610 and the outer electrode 1615. Inner working electrode 1610 may be a liquid metal electrode, liquid metal composite electrode, or a solid electrode. A solid electrode with a large cross section may be desired for applications in which large currents and high frequencies produce significant heating.

Figure 16B:
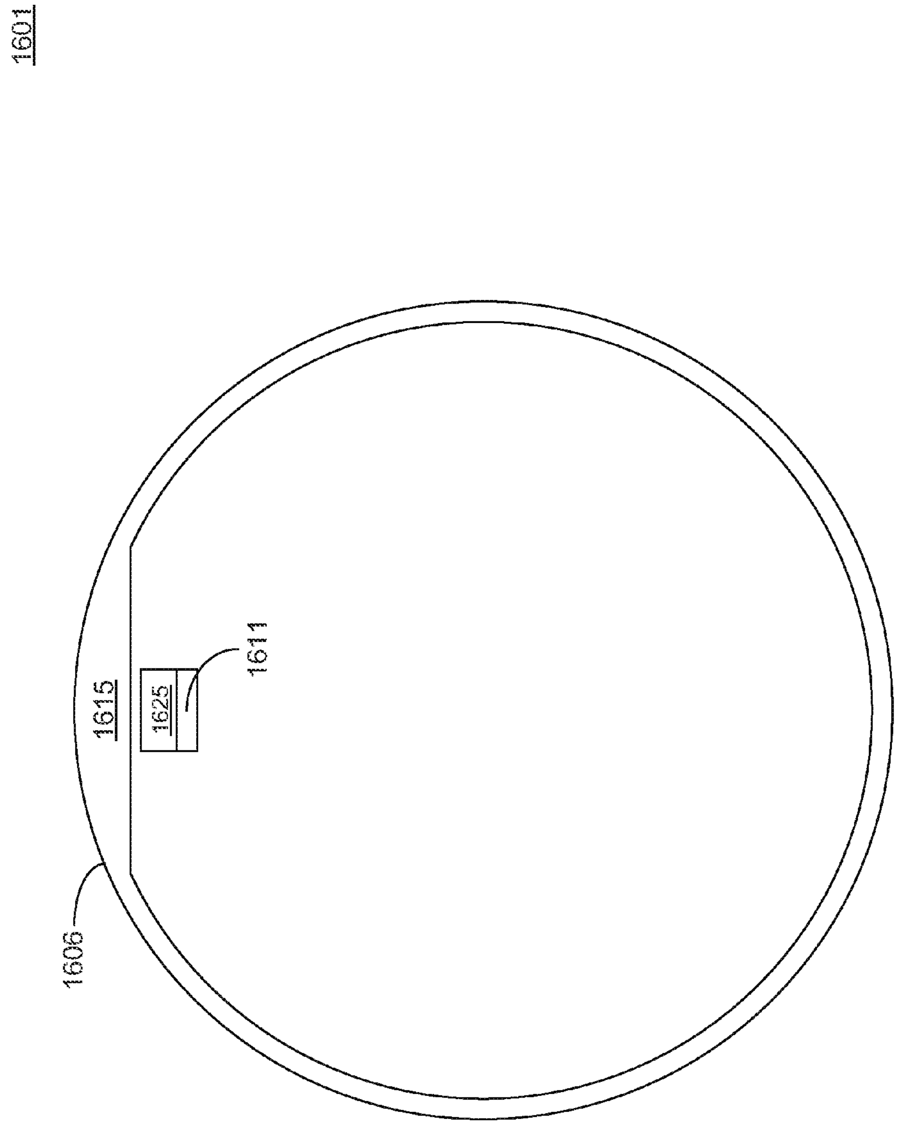
FIG. 16B shows a cross section view of a circular asymmetric closed transmission line duct with a short inner working electrode in accordance with an embodiment of the present invention.

In a preferred embodiment, the radial spacing between the inner working electrode and the outer electrode varies by at least a factor of five. In other embodiments, the outer conductor 1615 may assume other shapes (e.g., elliptical or polygonal). FIG. 16B shows a cross section view 1601 of an embodiment of a circular asymmetric closed transmission line duct 1606 similar to the circular asymmetric closed transmission line duct 1605 of FIG. 16A, except that it substitutes a shorter inner working electrode 1611 for the taller inner working electrode 1610.

Figure 16C:
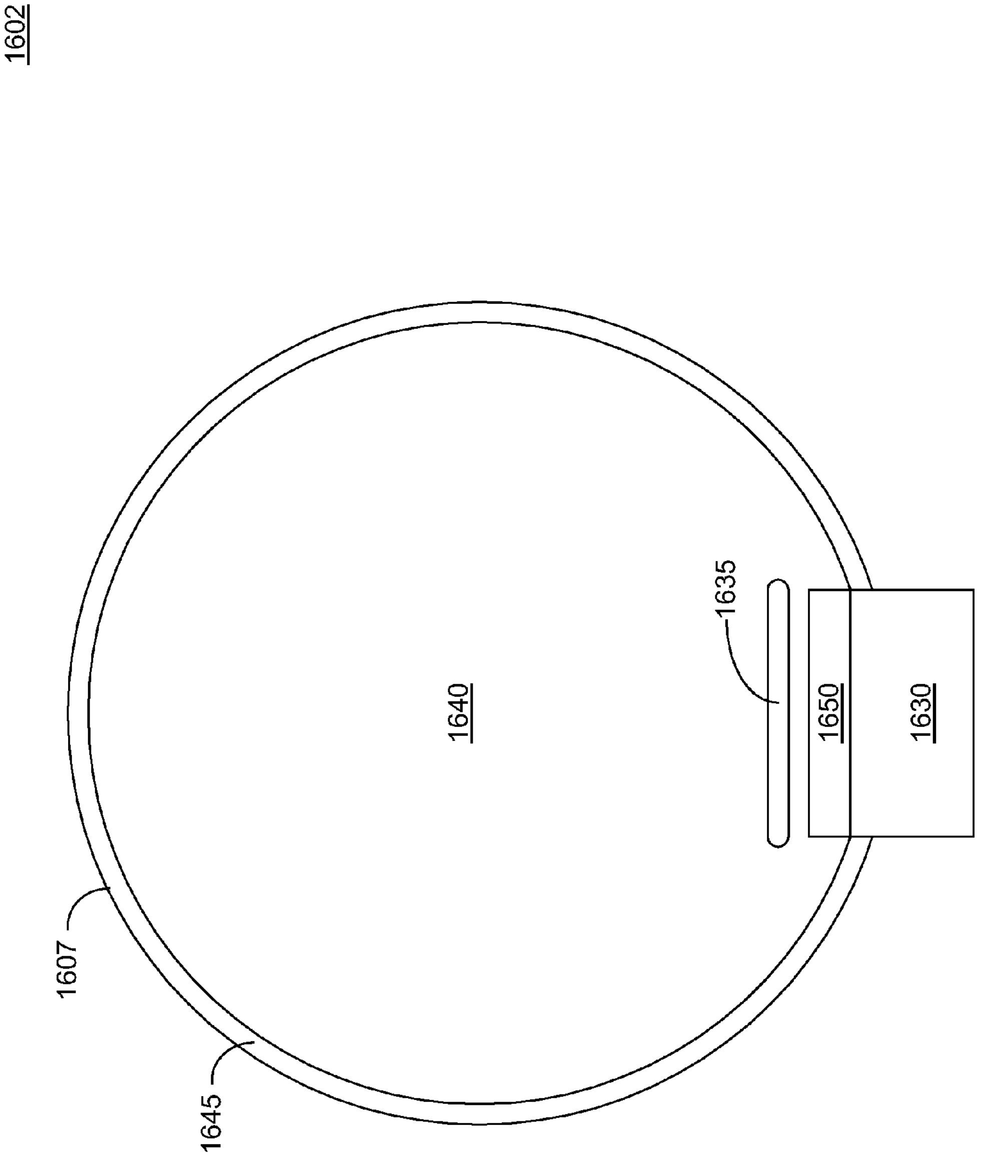
FIG. 16C shows a cross section view of a circular asymmetric closed transmission line duct with an outer working electrode in accordance with an embodiment of the present invention.

FIG. 16C shows a cross section view 1602 of a circular asymmetric closed transmission line duct 1607 with an outer working electrode 1630 that is connected to an outer conductor 1645. A dielectric 1640 surrounds an inner electrode 1635 and provides an electrolyte channel 1650. Outer working electrode 1630 may be a liquid metal electrode, liquid metal composite electrode, or a solid electrode.

Figure 16D:
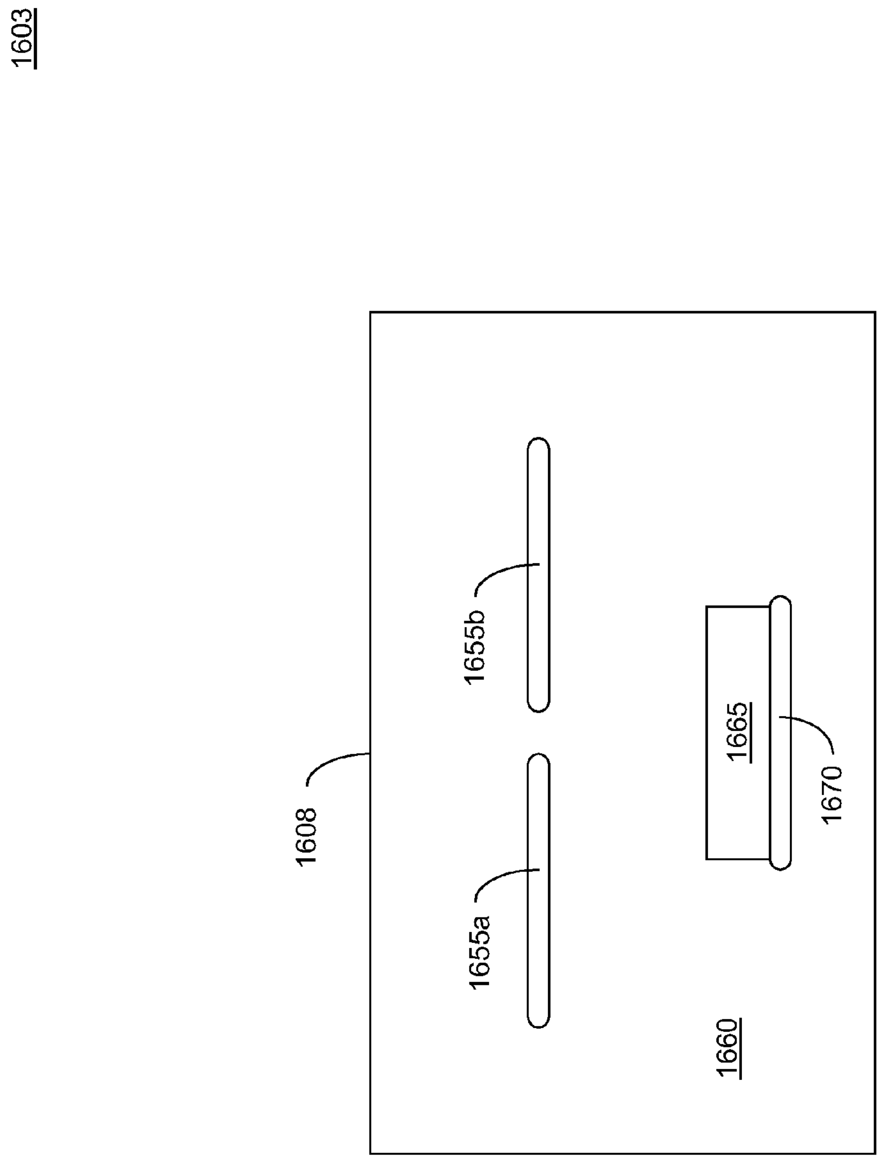
FIG. 16D shows a cross section view of a parallel plate transmission line duct with a split return conductor in accordance with an embodiment of the present invention.

FIG. 16D shows a cross section view of an embodiment of a parallel plate transmission line duct 1608 with split return conductors 1655*a* and 1655*b*, and working electrode 1670 supported by a dielectric 1660. The dielectric 1660 also provides an electrolyte channel 1665. Split return conductors 1655*a* and 1655*b* may be used to modify the shape of the magnetic field and/or the magnetic flux density distribution.

Figure 17A:
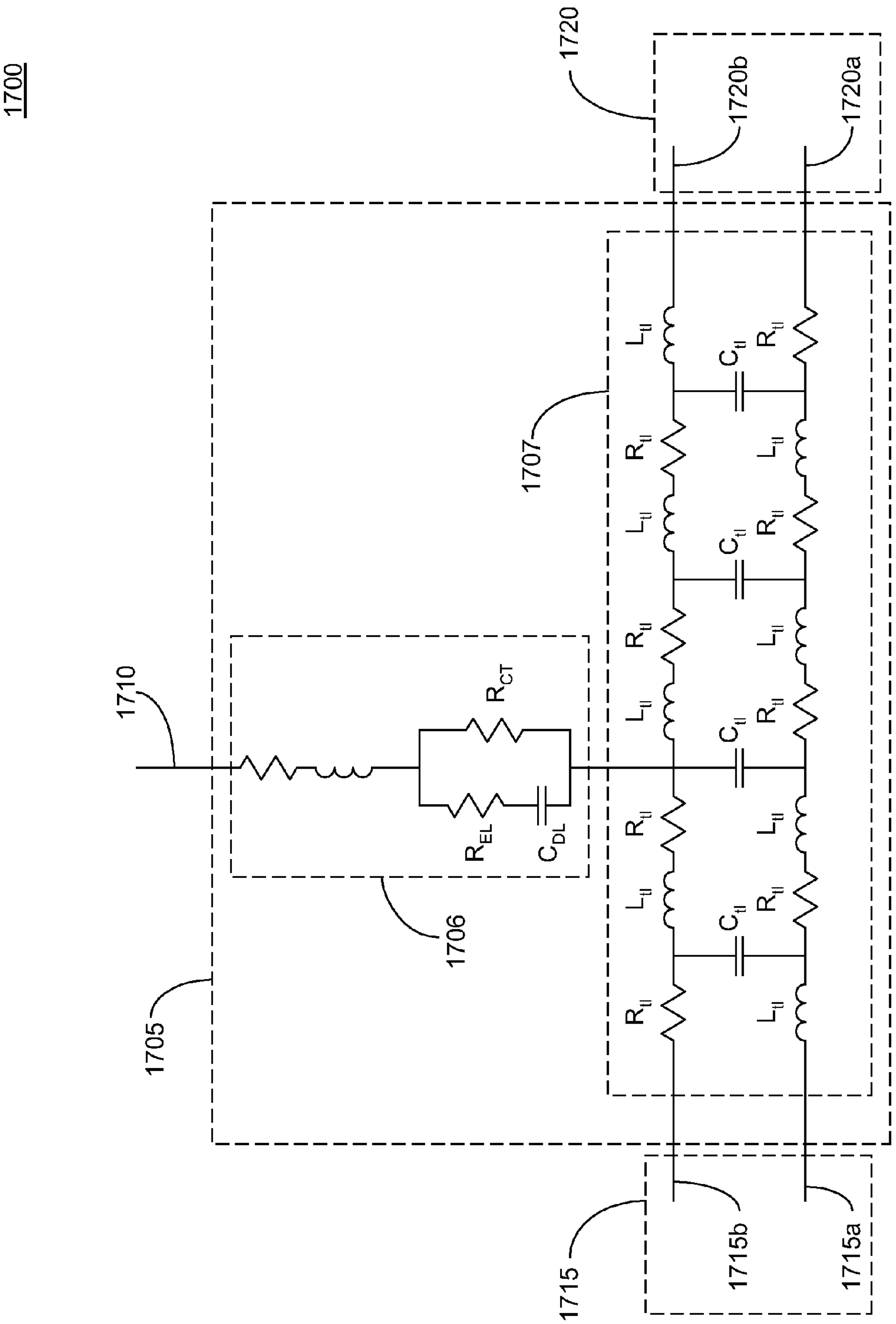
FIG. 17A shows a general electrical schematic for an electrolytic transmission line in accordance with an embodiment of the present invention.
Figure 17B:
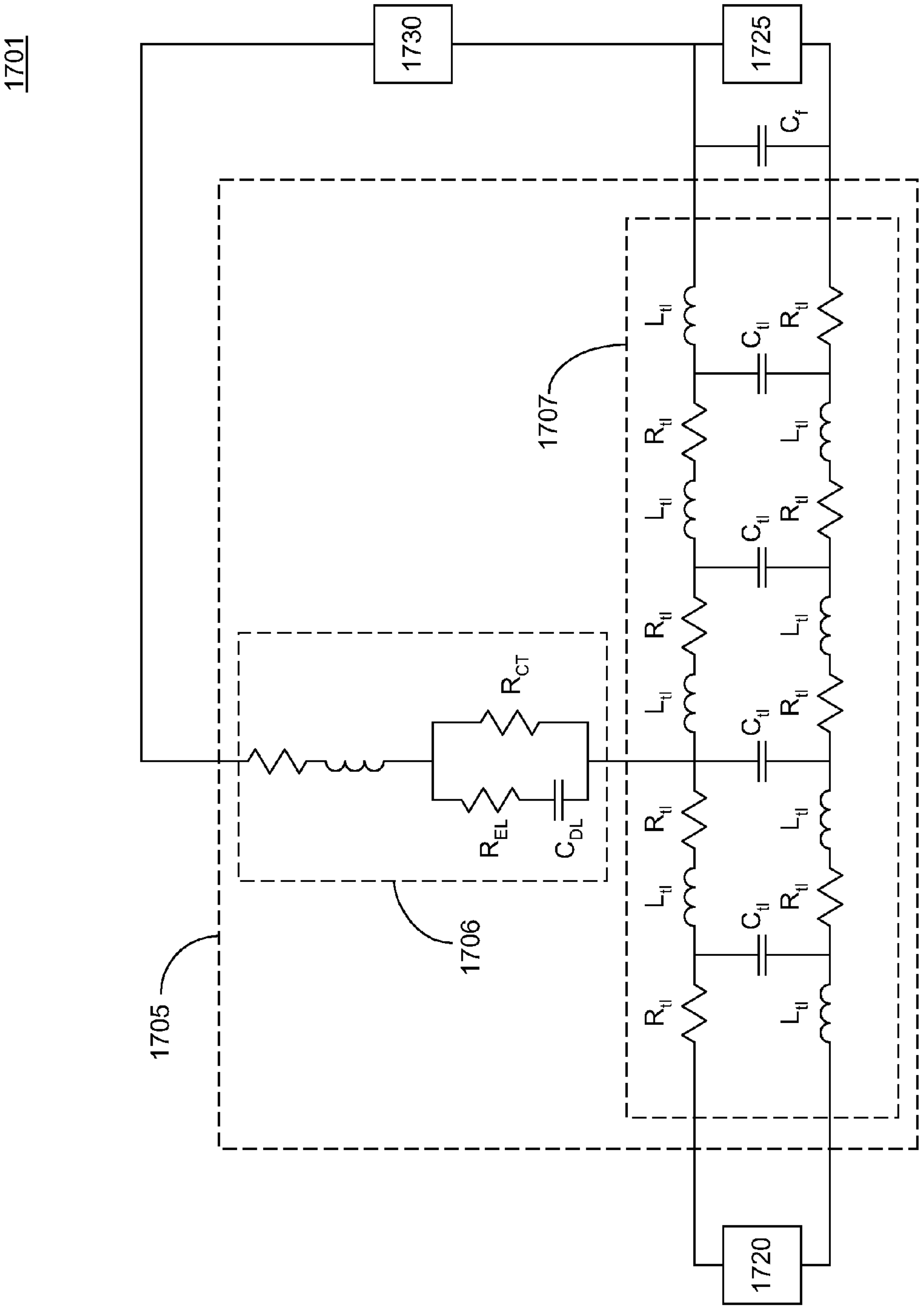
FIG. 17B shows an electrical schematic for a single-ended electrolytic transmission line in accordance with an embodiment of the present invention.
Figure 17C:
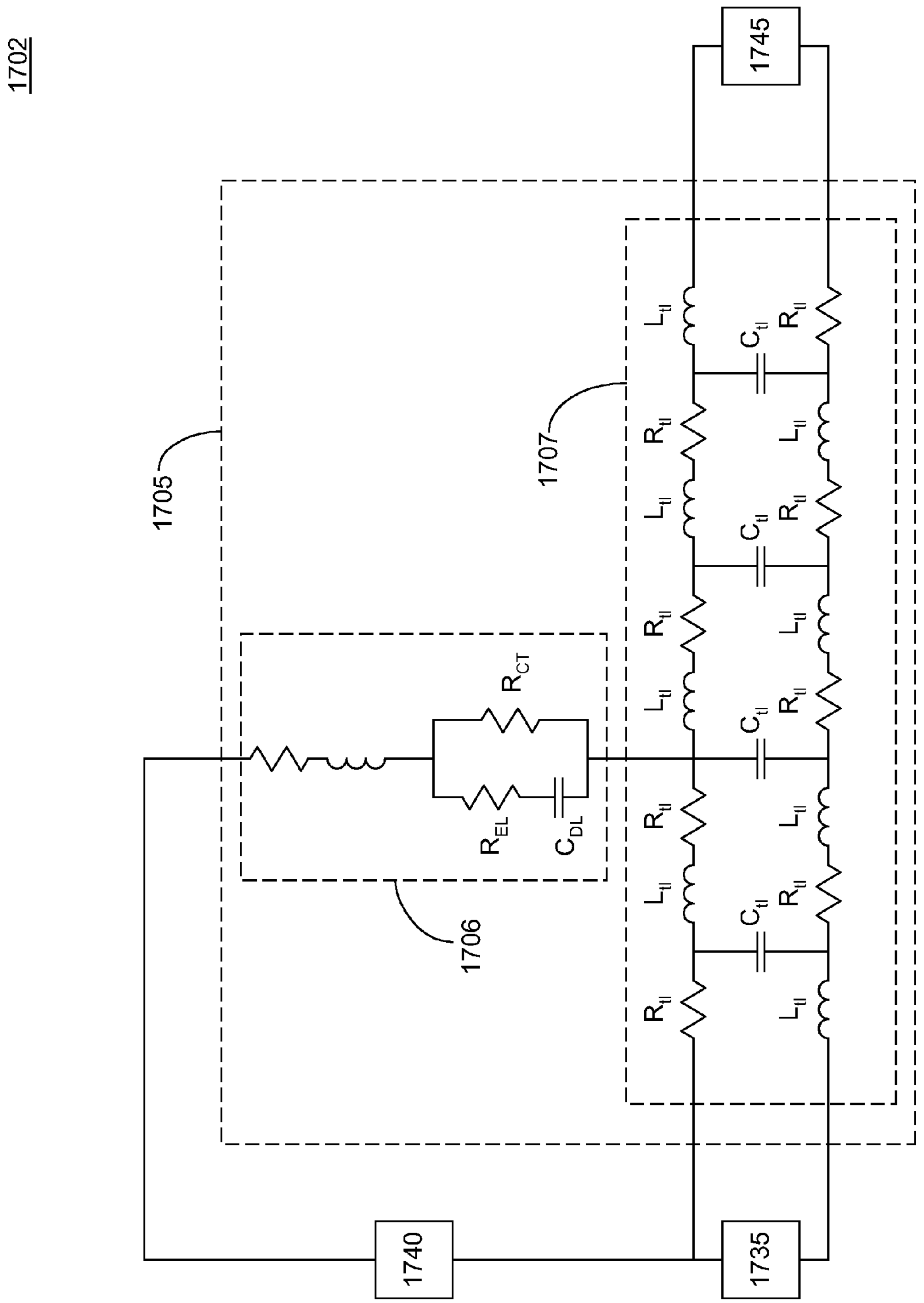
FIG. 17C shows an electrical schematic for push-pull electrolytic transmission line in accordance with an embodiment of the present invention.
Figure 17D:
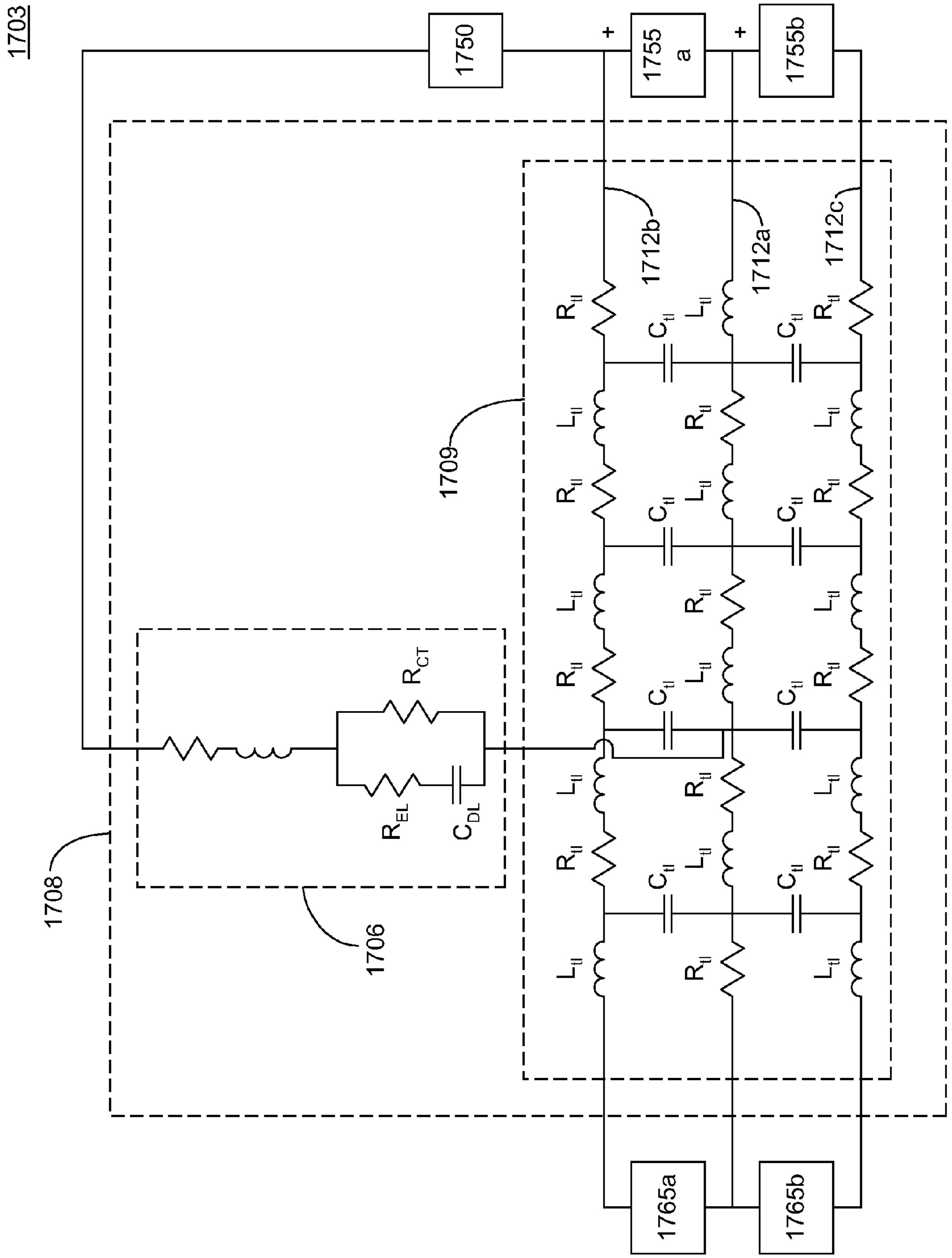
FIG. 17D shows an electrical schematic for a dual drive electrolytic transmission line in accordance with an embodiment of the present invention.

Split return conductors 1655*a* and 1655*b* may also be used in conjunction with a dual drive circuit such as that shown in FIG. 17D. More than two return conductors may be used in a split return configuration.

FIG. 17A shows a general electrical schematic 1700 for an embodiment of an electrolytic transmission line 1705. Port 1715 has two terminals 1715*a* and 1715*b*, and is connected to port 1720 by transmission line 1707. Port 1720 has two terminals 1720*a* and 1720*b*. Transmission line 1707 is characterized by series resistance $R_{t1}$, series inductance $L_{t1}$, and shunt capacitance $C_{t1}$. An electrolytic cell 1706 is directly coupled to terminals 1720*b* and 1715*b* and is also directly coupled to terminal 1710. The electrolytic cell 1706 is characterized by a series combination of electrolyte resistance $R_{EL}$ and double-layer capacitance $C_{DL}$ in parallel with a charge-transfer resistance $R_{CT}$. $R_{CT}$ may be ignored with respect to the magnetic pumping circuit (as in FIG. 1), but may be useful in characterizing the direct current response of the electrolytic circuit during redox reactions.

A DC electrolytic voltage source may be connected between terminal 1710, and terminal 1715*b* or 1720*b*. A combination of high frequency current sources and passive networks may be connected to port 1720 and to port 1715. Passive networks may include matched terminations and inductive or capacitive networks for tuning the transmission line 1707 to a resonant frequency. High frequency current sources may use bipolar transistors, field effect transistors (MESFET, MOSFET, or JFET), or static induction transistors. Silicon, gallium arsenide, gallium nitride, or silicon carbide may be used for fabricating transistors.

FIG. 17B shows an electrical schematic 1701 for an embodiment of a single-ended electrolytic transmission line including electrolytic transmission line 1705 coupled to an electrolytic power supply 1730, a DC power supply 1725 and an active switch 1720. electrolytic power supply 1730 is a DC power supply that may also have a fast pulse capability. Power supply 1730 provides a redox potential to the electrolytic cell 1706. DC power supply 1730 provides a current that is modulated by active switch 1720. Optional filter capacitor $C_f$ is located in close proximity to the transmission line 1707 and may be used to improve the high frequency response of the circuit by diminishing the effects of lead resistance and inductance associated with DC power supply 1725. Active switch 1720 may be operated in a linear mode or a switched mode, and may be used as a class B amplifier.

FIG. 17C shows an electrical schematic 1702 for an embodiment of a push-pull electrolytic transmission line including electrolytic transmission line 1705 coupled to an electrolytic power supply 1740, an amplifier 1745 and a passive matching network 1735. electrolytic power supply 1740 is a DC power supply that may also have a fast pulse capability. Electrolytic power supply 1740 provides a redox potential to the electrolytic cell 1706. Amplifier 1745 provides the magnetic pumping current to the electrolytic transmission line 1707. Amplifier 1745 may be configured as a linear amplifier (e.g., class A or class B), or may be configured as a switching amplifier (e.g., class E or class F).

FIG. 17D shows an electrical schematic 1703 for an embodiment of a dual-drive electrolytic transmission line 1708 including electrolytic transmission line 1709 coupled to an electrolytic power supply 1750, DC power supplies 1755*a* and 1755*b*, and active switches 1765*a* and 1765*b*. Electrolytic transmission line 1709 includes a common conductor 1712*a* and two separate return conductors 1712*b* and 1712*c*. Active switches 1765*a* and 1765*b* may be driven 180 degrees out of phase to provide a full-wave alternating magnetic pumping current in the common conductor 1712*a*. The dual-drive electrolytic transmission line 1708 may be used with the parallel plate transmission line duct 1608 of FIG. 16D.

Figure 18A:
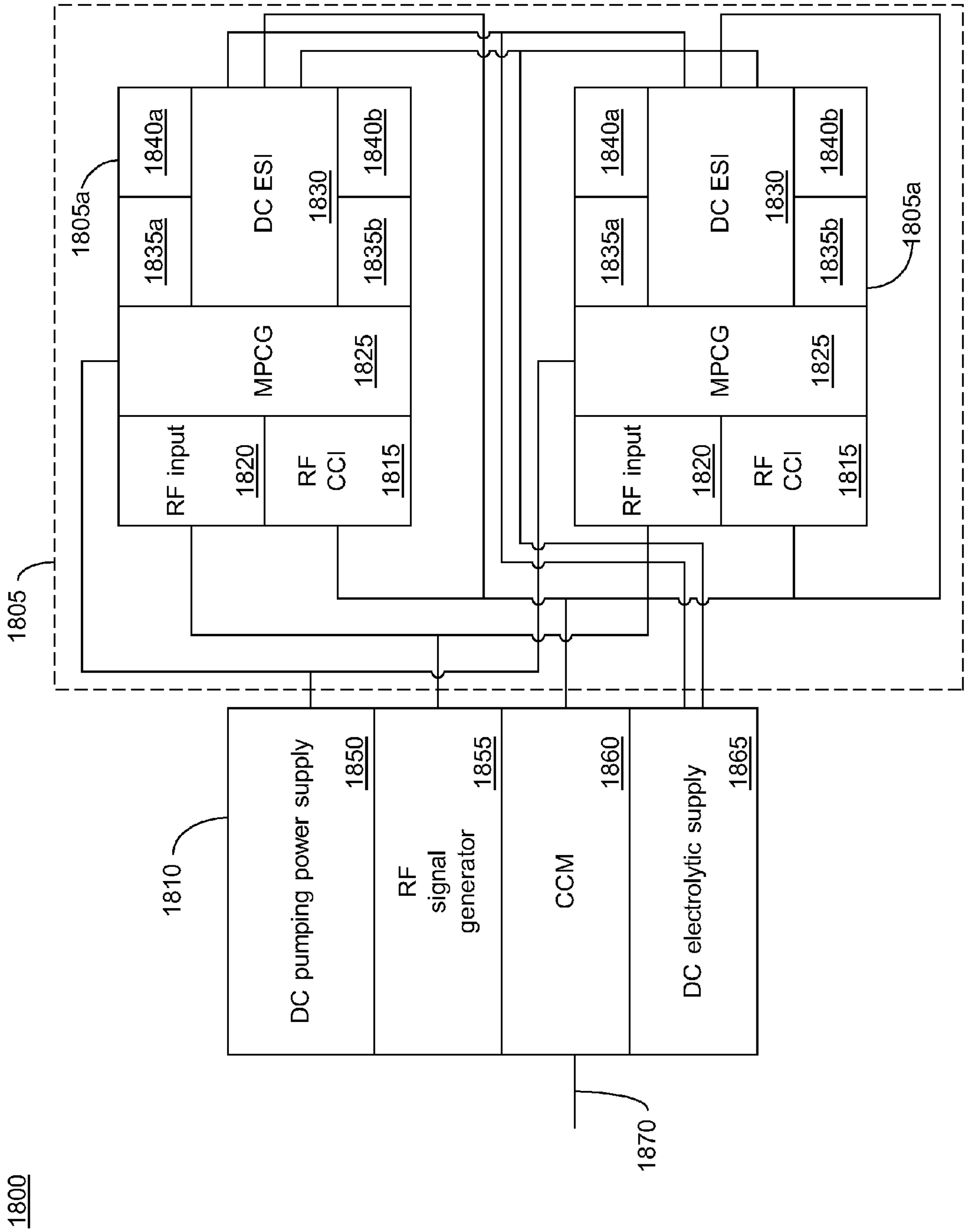
FIG. 18A shows a block diagram for an array of electrolytic transmission line modules in accordance with an embodiment of the present invention.

FIG. 18A shows a block diagram 1800 for an embodiment of an array 1805 of electrolytic transmission line modules 1805*a* coupled to an array controller 1810. The array controller 1810 may provide a variety of functions that serve the individual modules 1805*a*. Among these functions are the supply of DC power, RF signals, and communications and control. A DC pumping power supply 1850 provides the current that is used for magnetic pumping. Due to the losses associated with high frequency currents, the pumping current is supplied as a direct current to the module 1805 and converted to a high frequency alternating current by an amplifier or switch that is associated with the RF command control interface (RF CCI) 1815 of the module 1805*a*.

The RF signal generator 1855 may generate a single frequency signal or may generate and combine signals at two or more pumping frequencies. The RF signal generator 1855 is coupled to an RF input 1820 of the module 1805*a*. For complex pumping signals or signals requiring high accuracy, The RF signal generator 1855 avoids the burdening of each module 1805*a* with additional circuitry. The signal provided by the RF signal generator 1855 to each module 1805*a* is typically a low level signal (e.g., less than 1 dBm). The RF signal generator 1855 may be monitored by the communications and control module (CCM) 1860. Among the parameters that may be monitored are voltage, current, frequency, and temperature. The CCM 1860 may provide a control signal to the RF signal generator 1855 for tuning purposes.

The CCM 1860 monitors the DC pumping power supply 1850 and the DC electrolytic supply 1865, and may also provide regulation of the DC pumping power supply 1850 and the DC electrolytic supply 1865. The array controller may have an external data link 1870 for communicating with a higher level controller in a hierarchy. The time required for diagnostic and monitoring functions, and the signal level required by each module 1805 will limit the number of modules 1805*a* that are coupled to an individual controller 1810. In systems with many modules operating in parallel, it is desirable to be able to detect, disable and replace defective modules.

Module 1805*a* includes two interfaces that are coupled to CCM 1860. The RF CCI module provides monitoring and/or control of the RF input 1820 and the magnetic pumping current generator (MPCG) 1825. In embodiments that do not rely on an external RF signal, the RF CCI 1815 includes a frequency synthesis capability for driving the MPCG 1825. The DC electrolytic supply interface (DC ESI) 1830 provides monitoring and/or control of the electrolytic current provided by the DC electrolytic supply 1865. The RF CCI 1815 and DC ESI 1830 may include test circuits that may be switched in or out. The RF CCI 1815 and/or the DC ESI 1830 has an address that allows the CCM to identify a particular module 1805*a* for command, data logging, and reporting purposes.

Figure 18B:
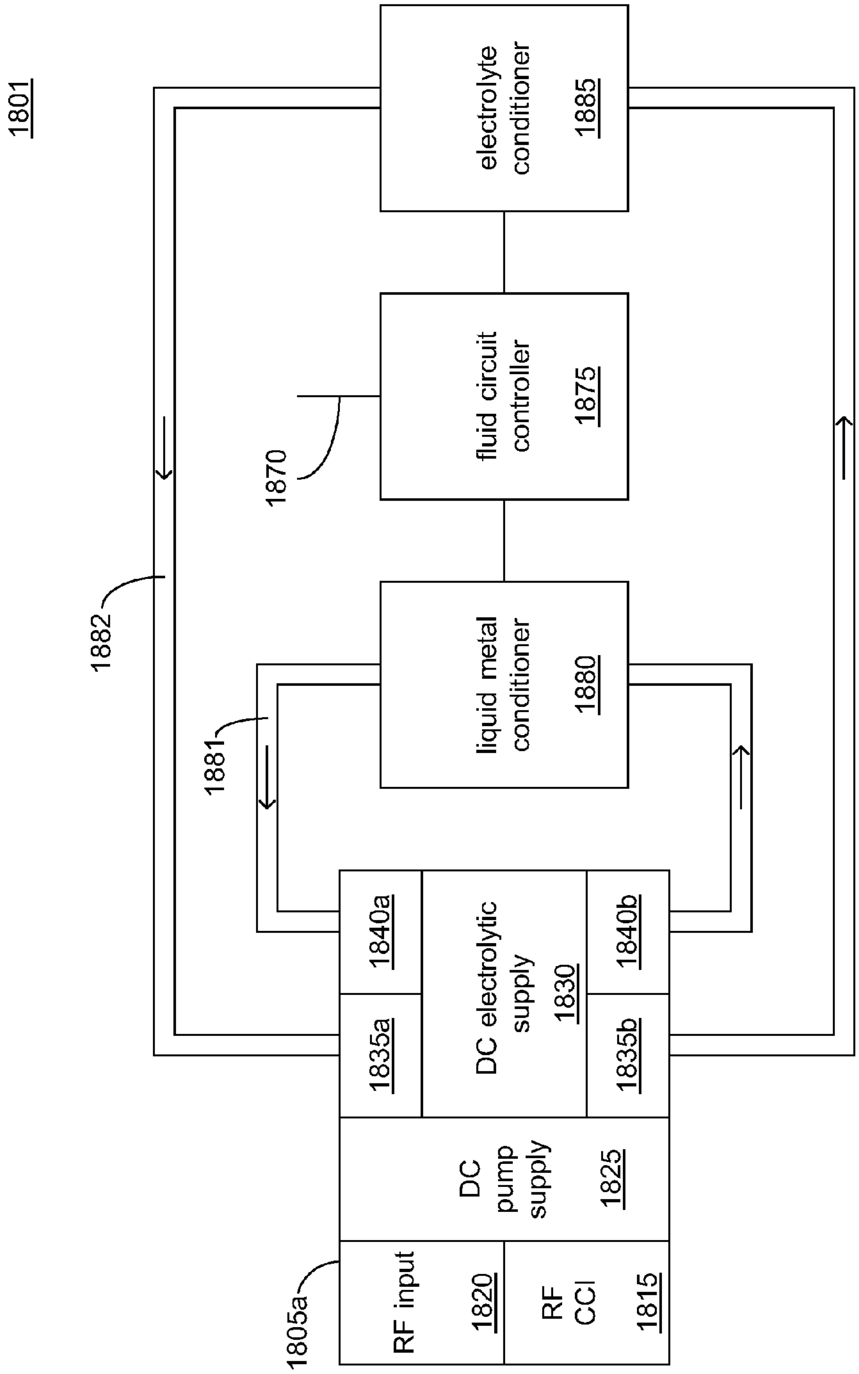
FIG. 18B shows a block diagram for an electrolytic transmission line module coupled to fluid conditioning modules in accordance with an embodiment of the present invention.

FIG. 18B shows a block diagram 1801 for an embodiment of an electrolytic transmission line module 1805 coupled to a liquid metal conditioner 1880 at ports 1835*a* and 1835*b*, and to an electrolyte conditioner 1885 at ports 1840*a* and 1840*b*. The liquid metal conditioner 1880 and the electrolyte conditioner 1885 are controlled by a fluid circuit controller 1875 that has an external data link 1870 for communicating with a higher level controller. The liquid metal conditioner 1880 provides for circulation, composition, and temperature control of a liquid metal 1881 through the module 1805. Heating and cooling of the liquid metal 1881 may be associated with the precipitation or extraction of species reduced from the electrolyte 1882 flowing in the module 1805*a*. In some embodiments, a liquid metal may form intermetallic compounds with the reduced species (e.g., $GaU_3$). In other embodiments, the liquid metal may be an alloy having a dissolved getter element that forms intermetallic compounds with the reduced species. The liquid metal may be a eutectic alloy (e.g., In—Ga).

The electrolyte conditioner 1885 provides for circulation and temperature control of the electrolyte 1882, and may also provide for composition adjustment of the electrolyte. The temperature of the liquid metal 1881 and electrolyte 1882 may be adjusted to prevent undesirable precipitation of reduced species or intermetallic compounds in a porous working electrode. Since magnetic pumping current provides localized heating, the liquid metal temperature will typically be higher in regions adjacent to the electrolyte.

The fluid circuit controller 1875 provides for monitoring and control of the liquid metal conditioner 1880 and electrolyte conditioner 1885. The fluid circuit controller may stop circulation of the liquid metal and/or electrolyte in response to notification of a defective module 1805. The liquid metal conditioner 1880 and electrolyte conditioner 1885 may be connected to several modules 1805*a* in parallel. Although a single defective module may result in several modules being removed from service, the fluid control hardware is simplified and the parts count is reduced.

Figure 19:
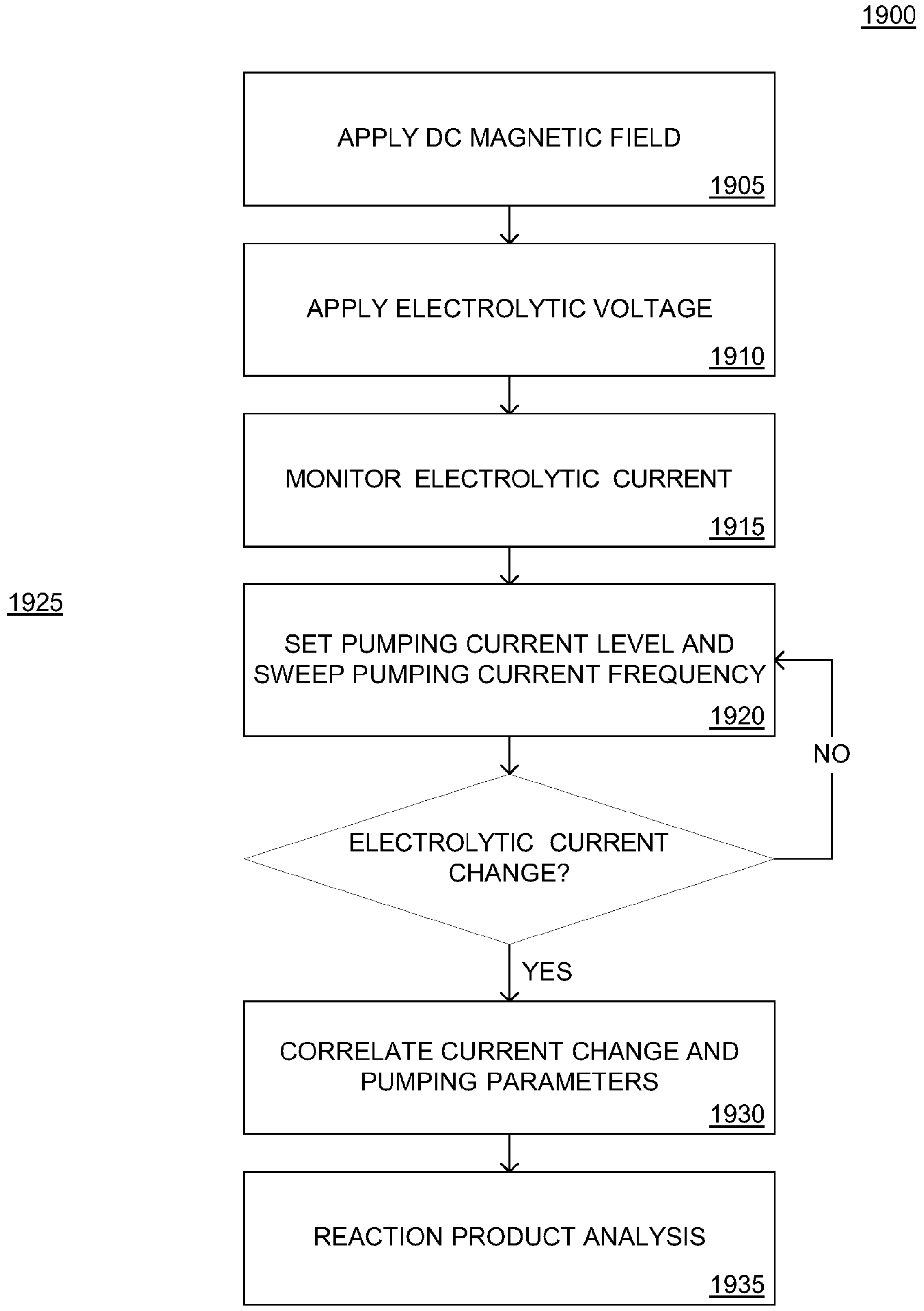
FIG. 19 shows a flow chart for an analytic spin modified electrolytic process in accordance with an embodiment of the present invention.

FIG. 19 shows a flow chart diagram 1900 for an embodiment of a spin-modified electrolytic process such as may be associated with the electrical schematic 1700 of FIG. 17 and the electrolytic transmission line duct array 1405 of FIGS. 14A through 14G. In step 1905, a DC magnetic field is applied to the region of electrolyte adjacent to the surface of a working electrode in an electrolytic cell. The DC magnetic field may be provided by a permanent magnet, electromagnet, or a hybrid magnet. The DC magnetic field induces or increases splitting of the magnetic energy levels for unpaired electrons and establishes one or more resonant frequencies for transitions between the different magnetic energy levels.

In step 1910, an electrolytic voltage is applied across the anode and working electrode of the electrolytic cell (e.g., terminals 1710 and 1720 of FIG. 17A). Electrolyte is typically, but not necessarily flowing through the electrolytic cell. The applied potential is sufficient to provide a reduction reaction at the surface of the working electrode so that an observable steady-state current arises. The observed electrolytic current establishes a baseline electrolytic current for the unpumped electrolytic cell.

In step 1915, the electrolytic current established by the electrolytic voltage applied in step 1910 is monitored for changes that are correlated with subsequent pumping. The magnitude and direction of observed changes will depend upon the electrolyte composition and on the effects of pumping. Current increases may result from pumping enhanced spin conversion and current decreases may result from spin locking.

In step 1920, a magnetic pumping current is applied (e.g., across ports 1715 and 1720 of FIG. 17A.), and the frequency of the applied pumping current is swept through a range including a resonant frequency that is determined by the applied DC magnetic field. The nominal resonant frequency is roughly equal to 28 Mhz times the DC magnetic field strength in millitesla. Thus, the nominal resonant frequency for an applied DC magnetic field of about 36 millitesla will be about 1 GHz. The resonant frequency of a particular unpaired electron will depend upon its g-factor, which may vary depending upon the local environment of the unpaired electron.

In step 1925, the electrolytic current is monitored for a change during the frequency sweep of the magnetic pumping current. If a change in the electrolytic current is not detected during the sweep, then step 1920 is repeated with the magnetic pumping current set to a higher level. If a change in current is detected then step 1930 is executed. In step 1930, the current change is correlated with the DC magnetic field and frequency and amplitude of the magnetic pumping current.

In step 1935, an electrolytic transmission line cell is operated using the parameters obtained in step 1930 and the reduction product is collected and analyzed for a change in isotopic or chemical composition with respect to the reduction product from an unpumped electrolytic transmission line cell. In the case of metal cations, an isotope separation effect may be determined. In the case of site specific reaction of organic compounds, a change in chemical product may be observed.

The overall process shown in FIG. 19 can be carried out over a range of DC magnetic field values with associated resonance frequencies, and magnetic pumping current amplitudes. After identifying the effects associated with observed electrolytic current changes at individual frequencies, combinations of resonant frequencies may be applied.

Figure 20:
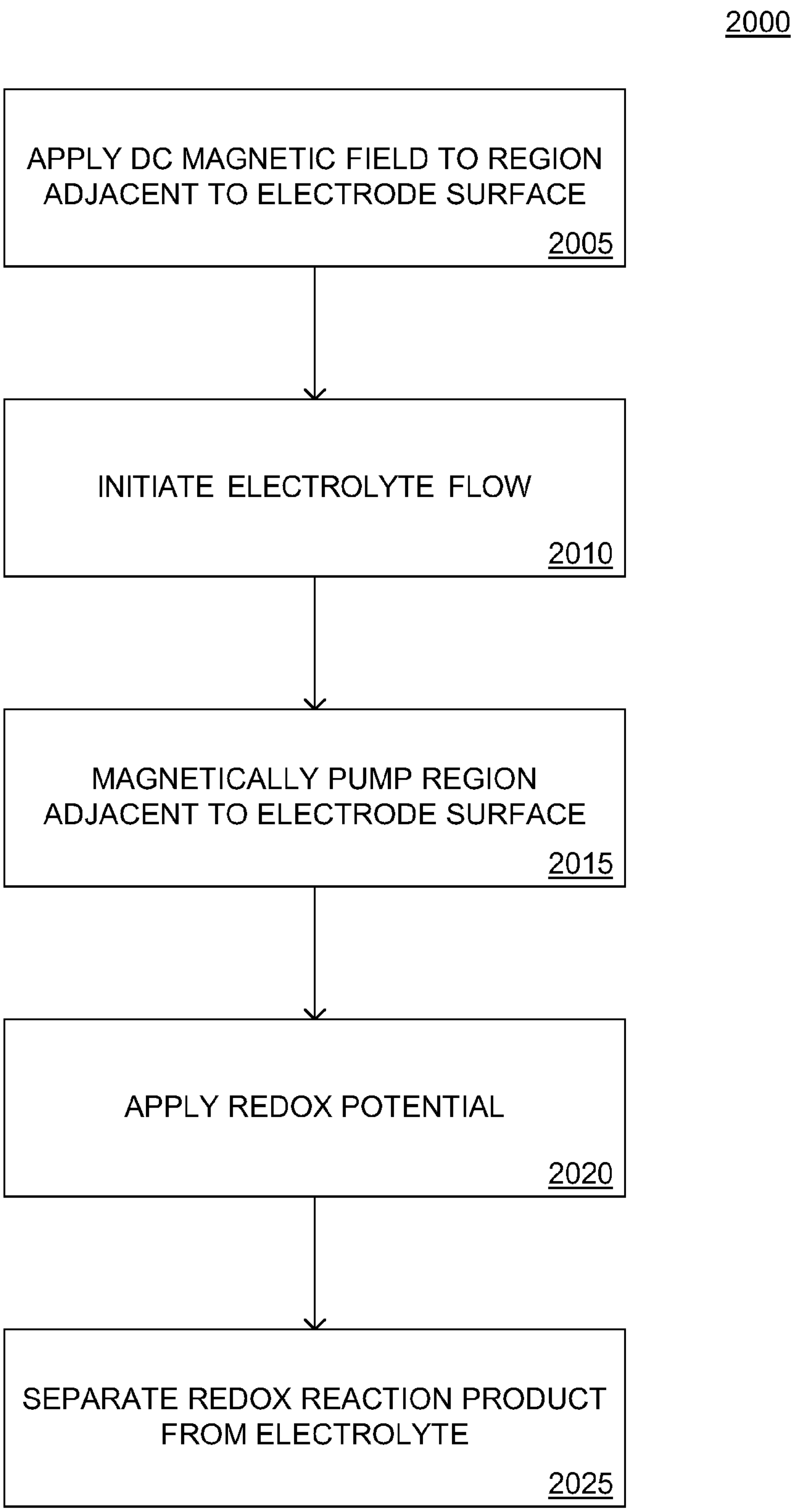
FIG. 20 shows a flow chart for a spin modified electrolytic process in accordance with an embodiment of the present invention.

FIG. 20 shows a flow chart diagram 2000 for an embodiment of a dedicated spin-modified electrolytic manufacturing process such as may be associated with the system shown in FIGS. 18A and 18B, and the electrolytic transmission line duct array 1405 of FIGS. 14A through 14G. In step 2005, a DC magnetic field is applied to an electrolyte region adjacent to a working electrode surface. In step 2010 electrolyte flow is initiated. In step 2015, the electrolyte region adjacent to the working electrode is magnetically pumped by a current flowing in the working electrode. In step 2020, a redox potential is applied to cause electrolysis of species within the electrolyte region adjacent to the electrode. In step 2025, the electrolytic reaction product is separated from the electrolyte.

Figure 21:
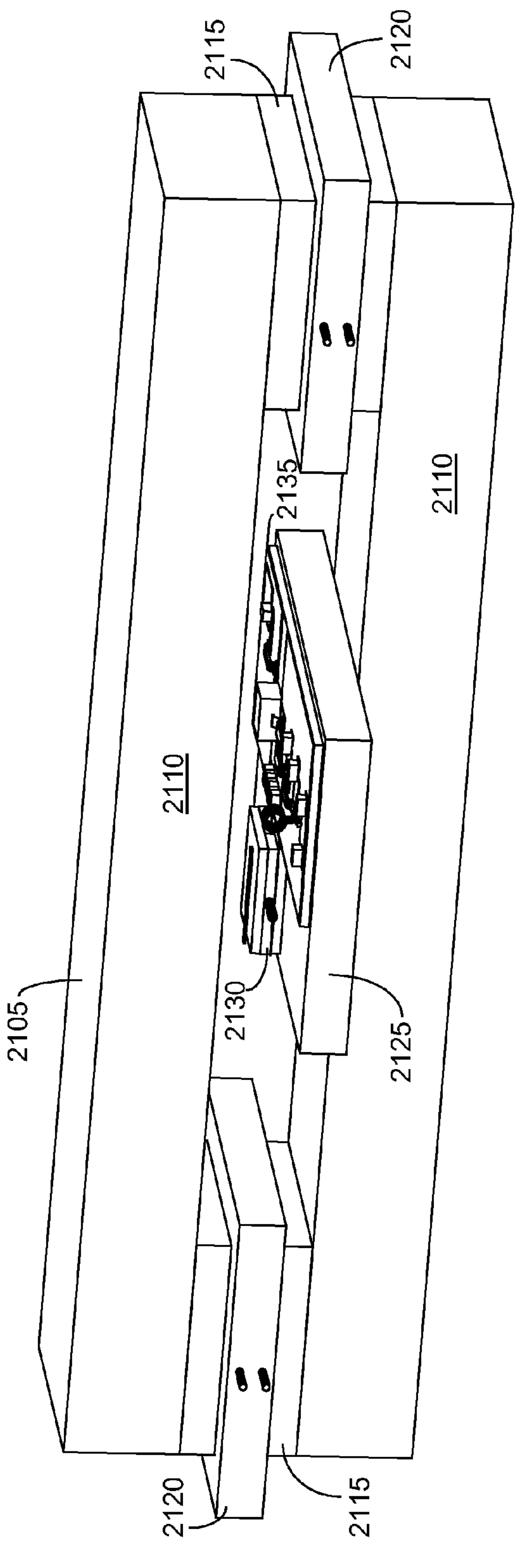
FIG. 21 shows a perspective view of a magnetically pumped electrolytic transmission line duct in accordance with an embodiment of the present invention.

FIG. 21 shows a perspective view 2100 of an embodiment of a magnetically pumped electrolytic transmission line duct. A DC magnetic field is provided by a hybrid magnet 2105 that surrounds a carrier 2125 that supports an electrolytic transmission line duct 2130 and a magnetic pumping circuit 2135. A fixed magnetic flux is provided to the soft yoke pieces 2210 by magnetized pole pieces 2115. Current may be applied to optional windings 2120 to augment or reduce the magnetic flux that is produced in the gap between the pole pieces 2110. Two or more magnetically pumped electrolytic transmission line ducts may be connected in a series electrolyte flow circuit with each being driven at a single frequency.

Figure 22:
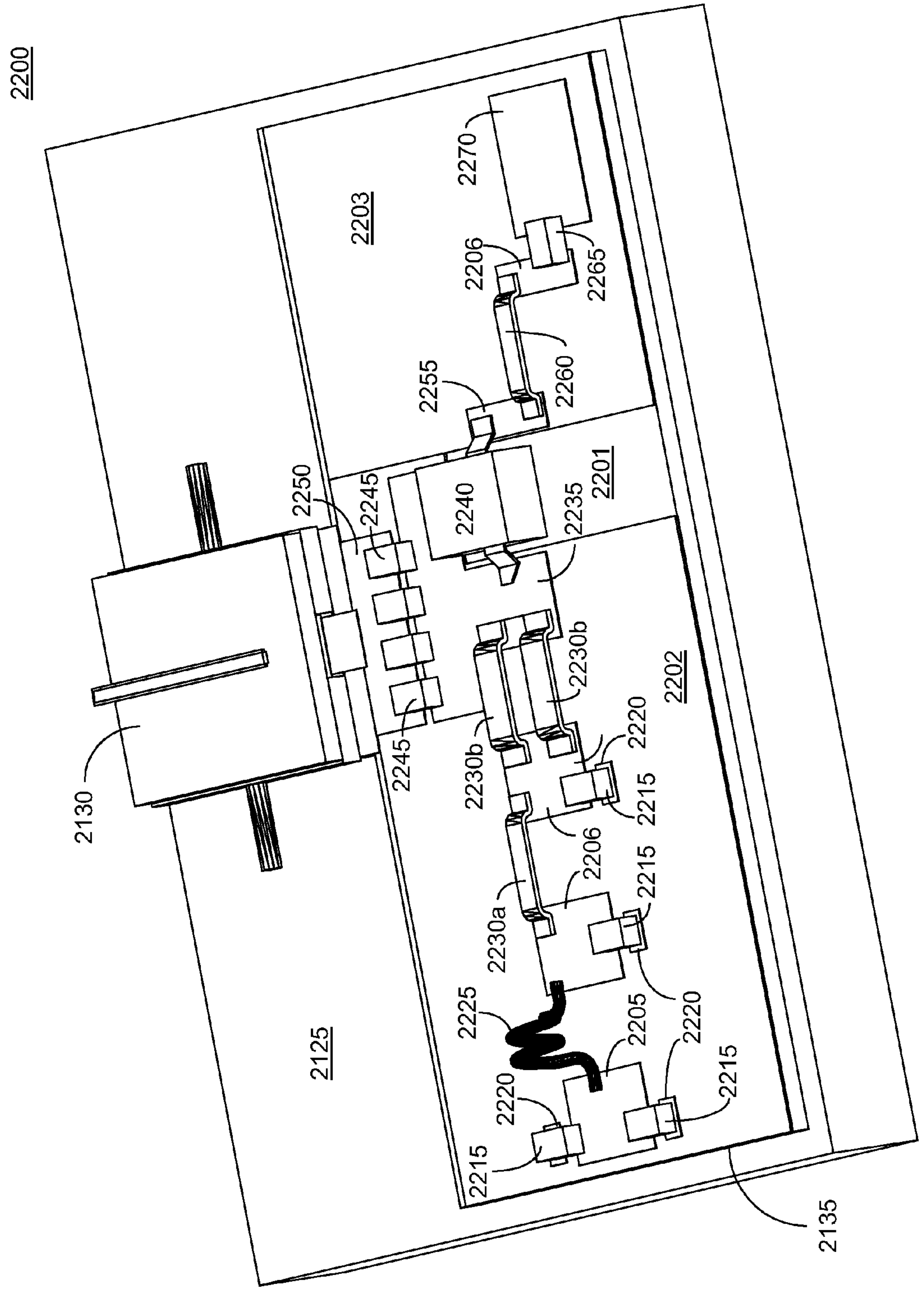
FIG. 22 shows a perspective view of the pumping current circuit and electrolytic transmission line duct of FIG. 21.

FIG. 22 shows a perspective view 2200 of the magnetic pumping current circuit 2135 and electrolytic transmission line duct 2130 of FIG. 21. The carrier 2125 supports a ground plate 2201 that serves as an electrical ground plane and heat sink/spreader. The carrier 2125 may be fabricated from a dielectric material and/or an electrically conductive material. The ground plate 2201 is preferably fabricated from a material with good thermal conductivity (e.g., copper or aluminum) and may have a coating to improve electrical conductivity of the surface.

The ground plate 2201 supports an output dielectric 2202 and an input dielectric 2203. Output dielectric 2202 and input dielectric 2203 are preferably fabricated from materials with a low dielectric loss and may have different thicknesses and/or dielectric constants depending upon the tuning requirements of the circuit. Alternatively, output dielectric 2202 and input dielectric 2203 may be combined into a single dielectric. The magnetic pumping circuit 2135 may be tuned for narrow band operation (e.g., High Q resonance) when being driven at a single frequency, or for wide band operation when being driven at multiple frequencies.

Output dielectric 2202 supports a DC voltage supply pad 2205, bonding pads 2206, drain pad 2235, and an output pad 2250. Depending upon the operating frequency, the size and shape of the DC supply pad 2205, bonding pads 2206, drain pad 2235, and output pad 2250 may be varied to provide different values of series inductance and shunt capacitance. Additional inductance may be provided by coil 2225 and/or air bridge inductors 2230*a* and/or 2230*b*. Coil 2225 may be used to provide a larger fixed inductance relative to the air bridge inductors 2230*a* and 2230*b*, whereas the air bridge inductors 2230*a* and 2230*b* may be tuned by deformation (e.g., partial or complete collapse) to alter series inductance and shunt capacitance. Coil 2225 and air bridge inductors 2230*a* and 2230*b* may be encapsulated with a dielectric (e.g., epoxy) to improve their mechanical stability and/or reduce oxidation.

Optional shunt capacitors 2215 are coupled to the DC voltage supply pad 2205 and bonding pads 2206, and are also coupled to the ground plate 2201 by vias 2220. Shunt capacitors 2215, coil 2225, and air bridge inductors may be attached by solder or conductive adhesives. For instances in which the circuit will be used over a restricted temperature range, the materials may be optimized for electrical performance.

One or more output capacitors 2245 couple the drain pad 2235 to the output pad 2250. Since the output capacitors carry the full magnetic pumping current, it is desirable that they have a low dielectric loss and a low series resistance. Depending upon the tuning requirements, a limited amount of series inductance may be tolerated.

Input dielectric 2203 supports an input pad 2270, bonding pad 2206, and a gate pad 2255. Depending upon the operating frequency, the size and shape of the input pad 2270, bonding pad 2206, and gate pad 2255 may be varied to provide different values of inductance and capacitance. A series air bridge inductor 2260 and a series resistor 2265 are used to provide input tuning for the Field Effect Transistor (FET) 2240. In other embodiments, a series capacitor may also be used in place of, or in addition to, the series resistor 2265. The FET 2240 has its drain coupled to the drain pad 2235, its gate coupled to the gate pad 2255, and its source (bottom surface) coupled to the ground plate 2201. The FET 2240 may be a MOSFET, MESFET, or JFET. In other embodiments, the FET 2240 may be replaced by a bipolar transistor.

Figure 23A:
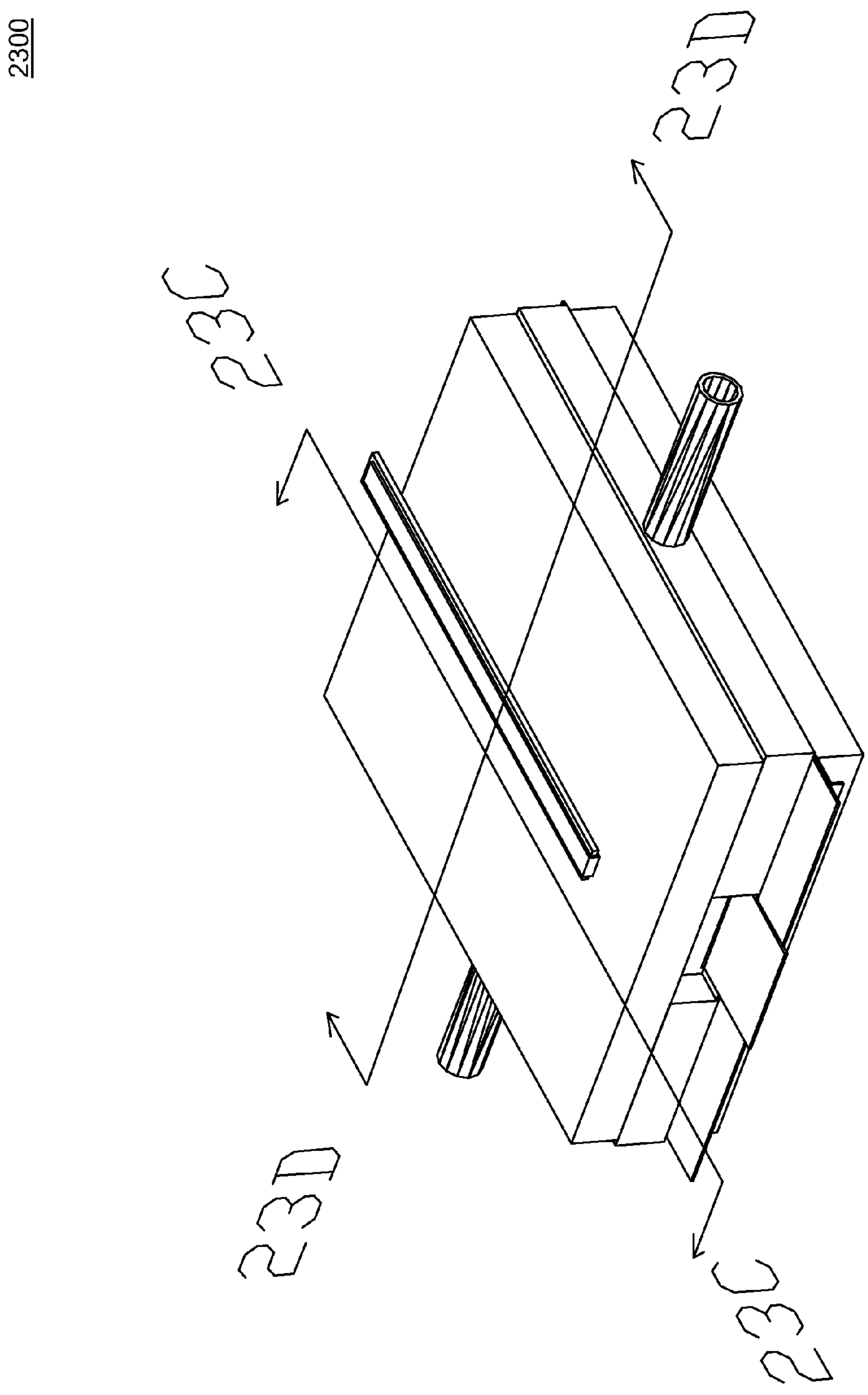
FIG. 23A shows a perspective view of the electrolytic transmission line duct of FIG. 21.
Figure 23B:
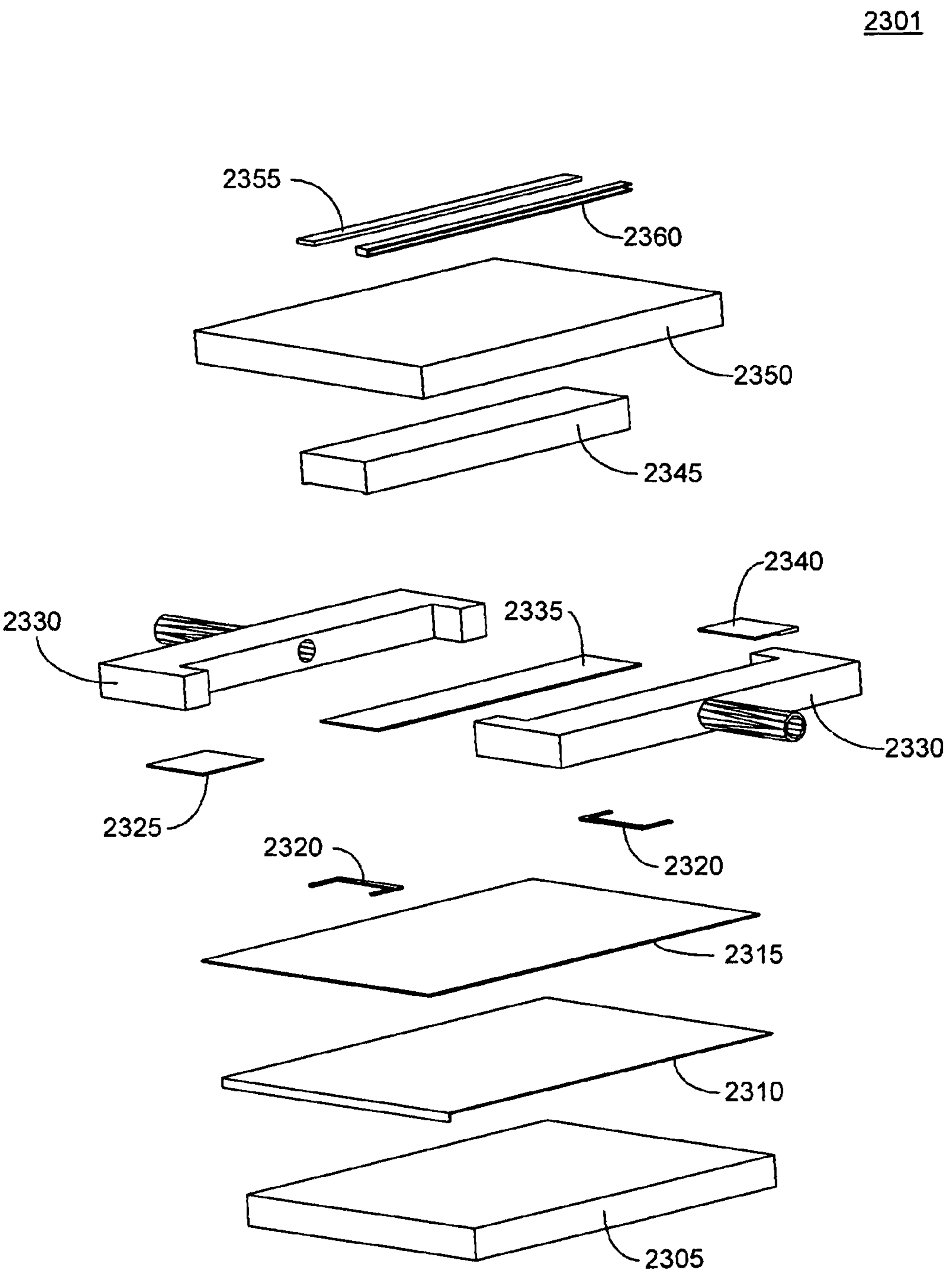
FIG. 23B shows an exploded view of the electrolytic transmission line duct of FIG. 23A.

FIG. 23A shows a close-up perspective view 2300 of an embodiment of the electrolytic transmission line duct 2130 of FIG. 21. FIG. 23B shows an exploded view 2301 of the electrolytic transmission line duct 2130 of FIG. 23A. A chamber base 2305 supports a ground plane 2310 than in turn supports a transmission line dielectric 2315. The ground plane 2310 is preferably a high conductivity metal such as copper or silver. The dielectric 2315 is preferably fabricated from a material with a low dielectric loss and a low dielectric constant. The transmission line dielectric 2315 serves as the floor of the electrolyte chamber and the electrolyte gap adjacent to the cathode 2335. Electrolyte gap spacers 2320 define the height of the electrolyte gap and also serve to mask the ends of the cathode 2335.

The ported chamber walls 2330 serve to define the perimeter of the chamber electrolyte volume and provide ports for the flow of electrolyte through the chamber. The cathode contact 2325 provides for the coupling of the cathode 2335 to an alternating current source, and the transmission line short 2340 couples the cathode directly to the ground plane 2310. The ported chamber walls may be fabricated from silicon dioxide and/or an organic polymer (e.g., polytetrafluoroethylene). The cathode contact 2325 and transmission line short are preferably fabricated from a material with high electrical conductivity (e.g., copper or silver). The cathode 2335 is preferably fabricated from a material with a high electrical conductivity and may also have a coating to provide electrolyte compatibility and/or particular spin characteristics (e.g., gold). The cathode support 2345 provides support for the cathode 2335 and is preferably fabricated from a low-loss dielectric material. The chamber top 2350 defines the upper extent of the electrolyte volume and mates with the cathode support 2345 and the ported chamber walls 2330.

cathode support 2345 and ported chamber walls 2330 may be fabricated in part from adhesively bonded glass or ceramic elements. Thin sheets of fused quartz or other ceramic may be diced to provide the elements. Injection molding or casting may also be used to fabricate the electrolytic transmission line duct 2130 if proper fixturing is used to maintain the spatial relationship between the cathode 2335 and the ground plane 2310 (e.g., a soluble core).

The combination of the cathode 2335, transmission line short 2340, transmission line dielectric 2315, and electrolyte gap are similar to a shorted microstrip transmission line which the substrate is a composite made up of the transmission line dielectric 2315 and a liquid electrolyte. The effective wavelength will be determined largely by the dielectric constants of the transmission line dielectric 2315 and liquid electrolyte. At high frequencies where the length of the cathode 2335 is an appreciable fraction of the working wavelength, current nodes may form along the transmission line. These nodes are generally undesirable since they may produce holes in the oscillating magnetic field. In a preferred embodiment the cathode length exposed to electrolyte is less than one quarter of the effective wavelength at the operating frequency. In another preferred embodiment, the exposed cathode length is less than one eighth of the effective wavelength.

For other embodiments in which the exposed cathode length is appreciably greater than the effective wavelength, the transmission line short 2340 is preferably replaced by a matched termination to prevent reflections that lead to standing waves and problematic reductions in the local oscillating magnetic field at the cathode surface. Although a matched termination may be used to increase the usable cathode length, it will tend to increase the loss in the transmission line. A matched termination is generally preferred at higher frequencies where the effective wavelength is short.

For example, at 280 Mhz an exposed cathode length of one centimeter may be achieved comfortably within the one eighth effective wavelength limitation. However, at 2 GHz, the effective wavelength in air is less than 15 centimeters. Thus, the effective relative dielectric constant of the transmission line substrate would have to be less than two in order to maintain a one eighth effective wavelength limit for an exposed cathode length of one centimeter. Although materials such as foamed polymers may be used to achieve low dielectric constants, a degree of structural strength is sacrificed.

An optional field sensing loop 2360 situated above the chamber top 2350 is supported by a loop support dielectric 2355. The field sensing loop 2360 may be used to measure the current in the cathode 2335 when coupled to an instrument such as a spectrum analyzer or oscilloscope. The field sensing loop may also be used to provide feedback to a control circuit (e.g., RF CCI 1815 of FIG. 18A). Although not shown in FIG. 23A or FIG. 23B, upstream and/or downstream anodes such as those shown in FIG. 13E and FIG. 14B may be used to complete the electrolytic circuit. It is generally desirable to isolate anodes from the fields generated by the magnetic pumping current.

Figure 23C:
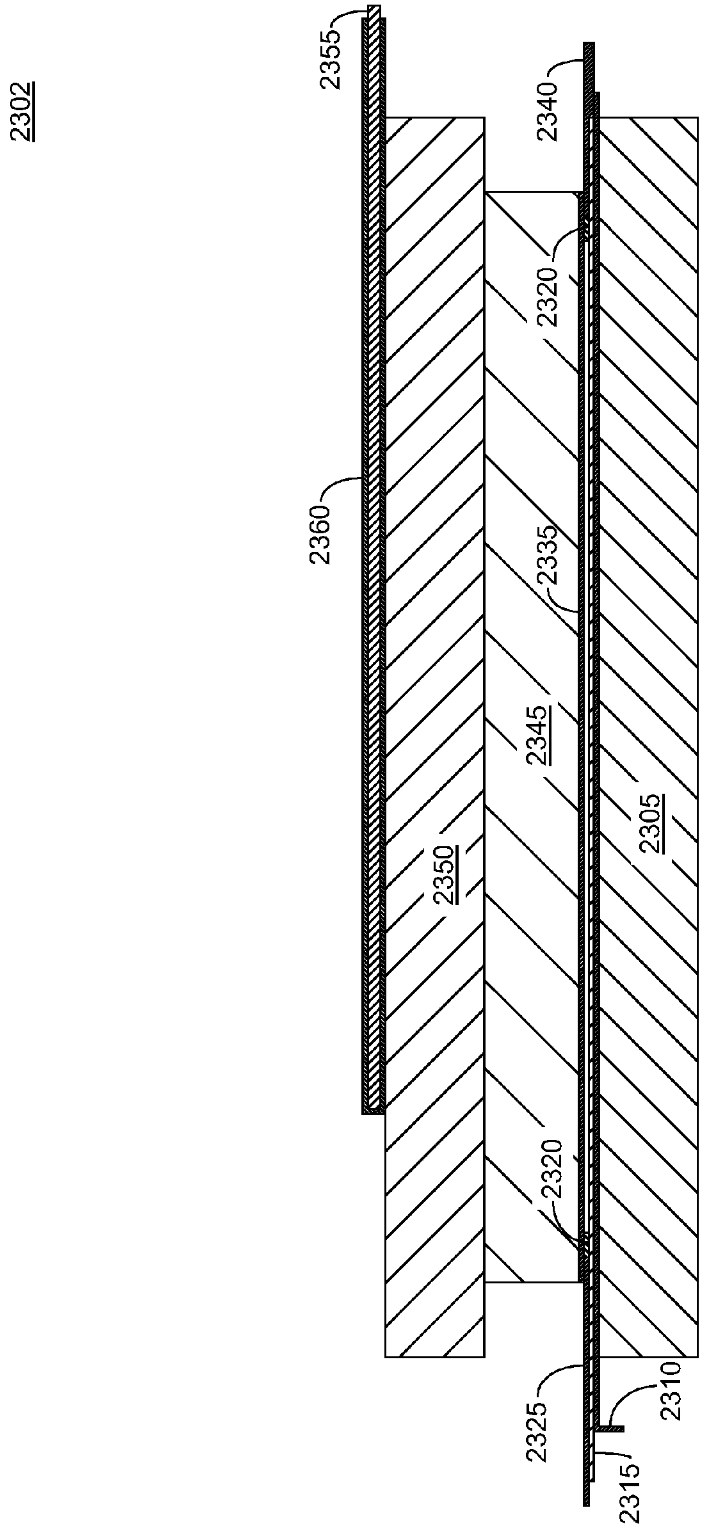
FIG. 23C shows a long section view of the electrolytic transmission line duct of FIG. 23A.

FIG. 23C shows a long section view 2302 of the electrolytic transmission line duct shown in FIG. 23A. Close spacing between the cathode 2335 and ground plane 2310 is desirable to minimize the inductance that is required to obtain a given magnetic field intensity at the surface of the cathode. It is also desirable that the exposed portion of the cathode 2335 be located in proximity to the short 2340, since the effective wavelength is measured from the short for purposes of reflection and interference. For narrow electrolyte gaps, it is preferable that the chamber top 2350, cathode support 2345, and chamber base 2305 be sufficiently stiff to maintain the dimensional stability of the ground plane 2310 and cathode 2335.

Figure 23D:
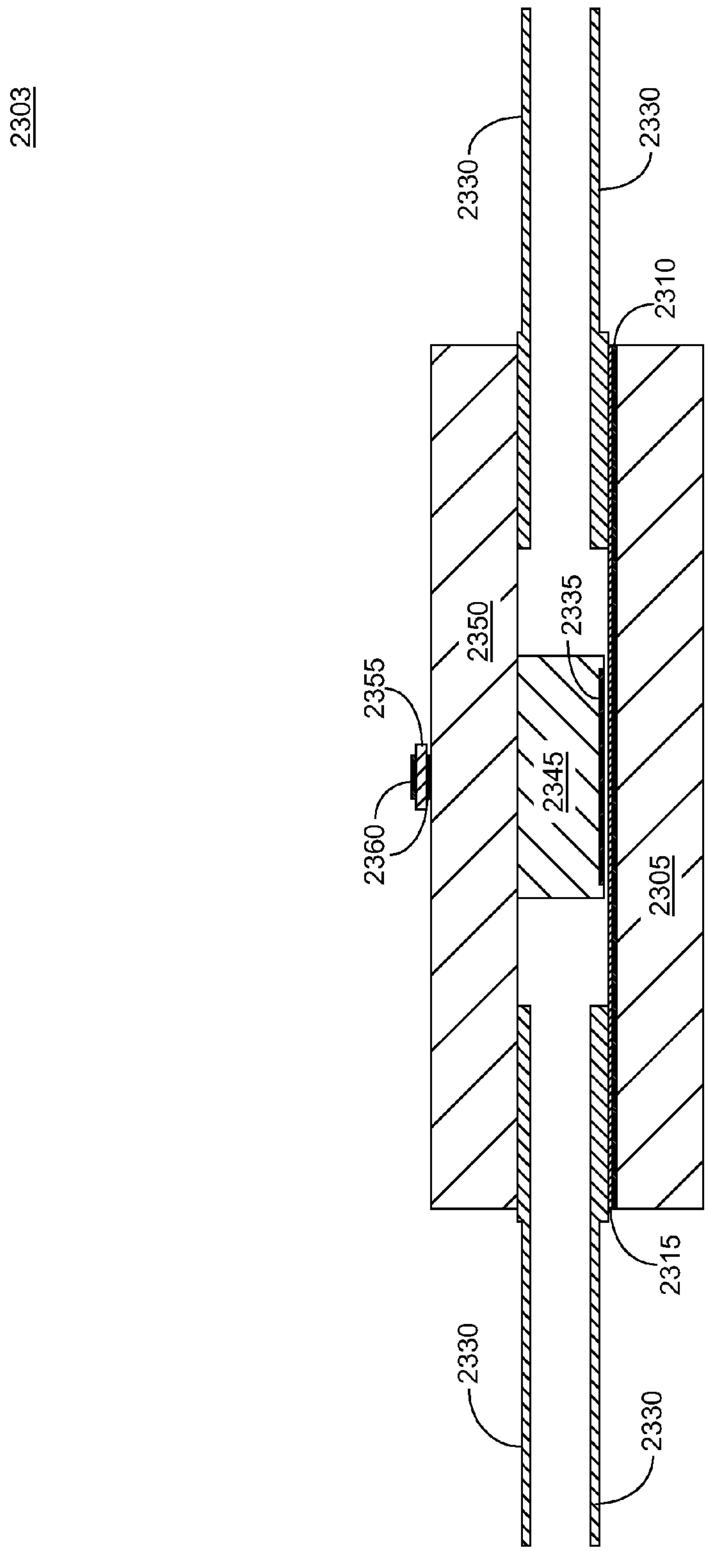
FIG. 23D shows a cross section view of the electrolytic transmission line duct of FIG. 23A.

FIG. 23D shows a cross section view 2303 of the electrolytic transmission line duct 2130 of FIG. 21. The width of the cathode support 2345 and the height of the electrolyte gap between the cathode 2335 and transmission line dielectric 2315 are largely responsible for the flow resistance of the electrolytic transmission line duct 2130. In order to minimize the hydraulic forces acting to deform the electrolytic transmission line duct 2130, it is desirable to minimize the electrolyte volume, while maintaining uniform flow along the length of the cathode. It is also desirable to minimize the volume of the electrolyte in the vicinity of the cathode and ground plane since the electrolyte will generally be a lossier material than the dielectric materials used in the construction of the electrolytic transmission line duct 2130.

Figure 24:
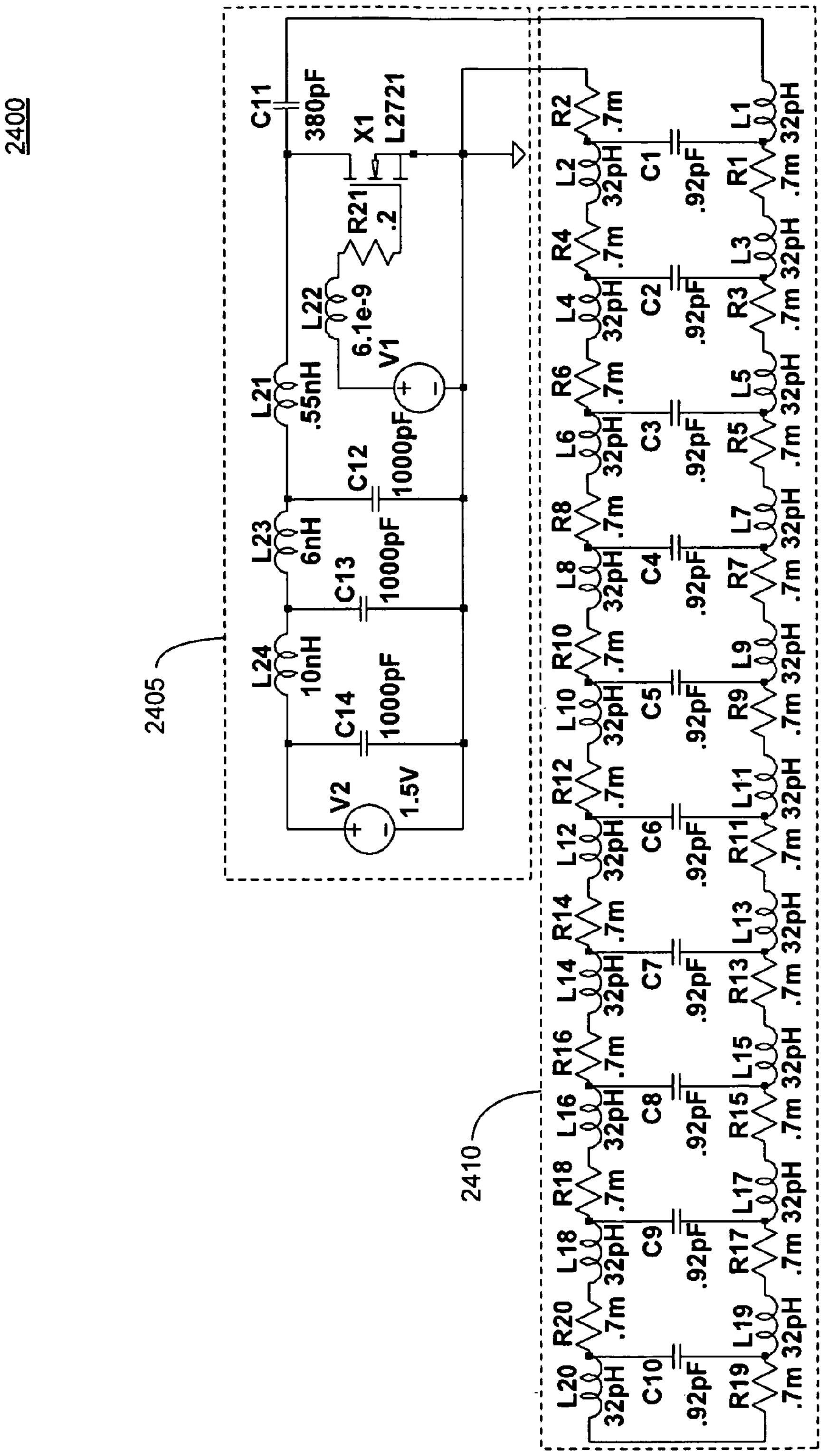
FIG. 24 shows an electrical circuit schematic for a magnetically pumped electrolytic transmission line duct in accordance with an embodiment of the present invention.

FIG. 24 shows an electrical circuit schematic 2400 for an embodiment of magnetically pumped electrolytic cell similar to that shown in FIG. 21 and FIG. 22. A high frequency current source 2405 corresponding to magnetic pumping circuit 2135 drives a shorted transmission line 2410 that corresponds to the electrolytic transmission line duct 2130. The high frequency current source 2405 includes a 1.5 volt DC supply V2 and a gate driver V1. Gate driver V1 provides a 0.2 volt 280 MHz sine wave signal combined with a 3 volt DC bias to the gate of FET X1. FET X1 is a Polyfet L2721 LDMOS device. In other embodiments, a JFET such as NEC's NE6510179A GaAs device may be used. At 280 MHz, the DC magnetic field provided by hybrid magnet 2105 may be about 10 millitesla.

Passive elements L21, L23, L24, C12, C13, and C14 provide a filter network that isolates the DC supply V2 from the RF signal produced by FET X1, and also provides tuning in combination with C11 for maximizing the current in the transmission line 2410 while reducing the drive voltage requirements. Thus, two distinct resonant phenomena may be produced, with both having the same frequency. An electron paramagnetic resonance frequency may be established using an applied DC magnetic field, and the transmission line circuit may be tuned to resonate at the established electron paramagnetic resonance frequency. Since very little power is required for spin modification, it is desirable to produce the magnetic pumping current at a low voltage to minimize overall power consumption. In an embodiment, the magnitude of the capacitive reactance of C11 is between fifty percent and one hundred and fifty percent of the inductive reactance of transmission line 2410 at the operating frequency.

At 280 MHz, the input to FET X1 is largely capacitive and series inductance L22 is provided to tune the input. At higher frequencies (e.g., 1 GHz) the input to FET X1 may be inductive, and inductor L22 may be replaced by a series capacitor. Although it is generally desirable to minimize the input and output impedances seen by FET X1, resistor R22 may be used to ballast the gate of FET X1 and reduce the effects associated with variation or drift in component values and supply voltages.

The shorted transmission line 2410 may be realized in an embodiment of the electrolytic transmission line duct 2310, in which the cathode 2355 has a width of about 100 mils and a length of about 400 mils; and with an associated aqueous electrolyte gap and fluorocarbon polymer transmission line dielectric each having a thickness of about 3 mils. The combination of high frequency current source 2405 and this particular embodiment of shorted transmission line 2410 may be used to generate a peak magnetic field in excess of 10 gauss at 280 MHz.

Figure 25:
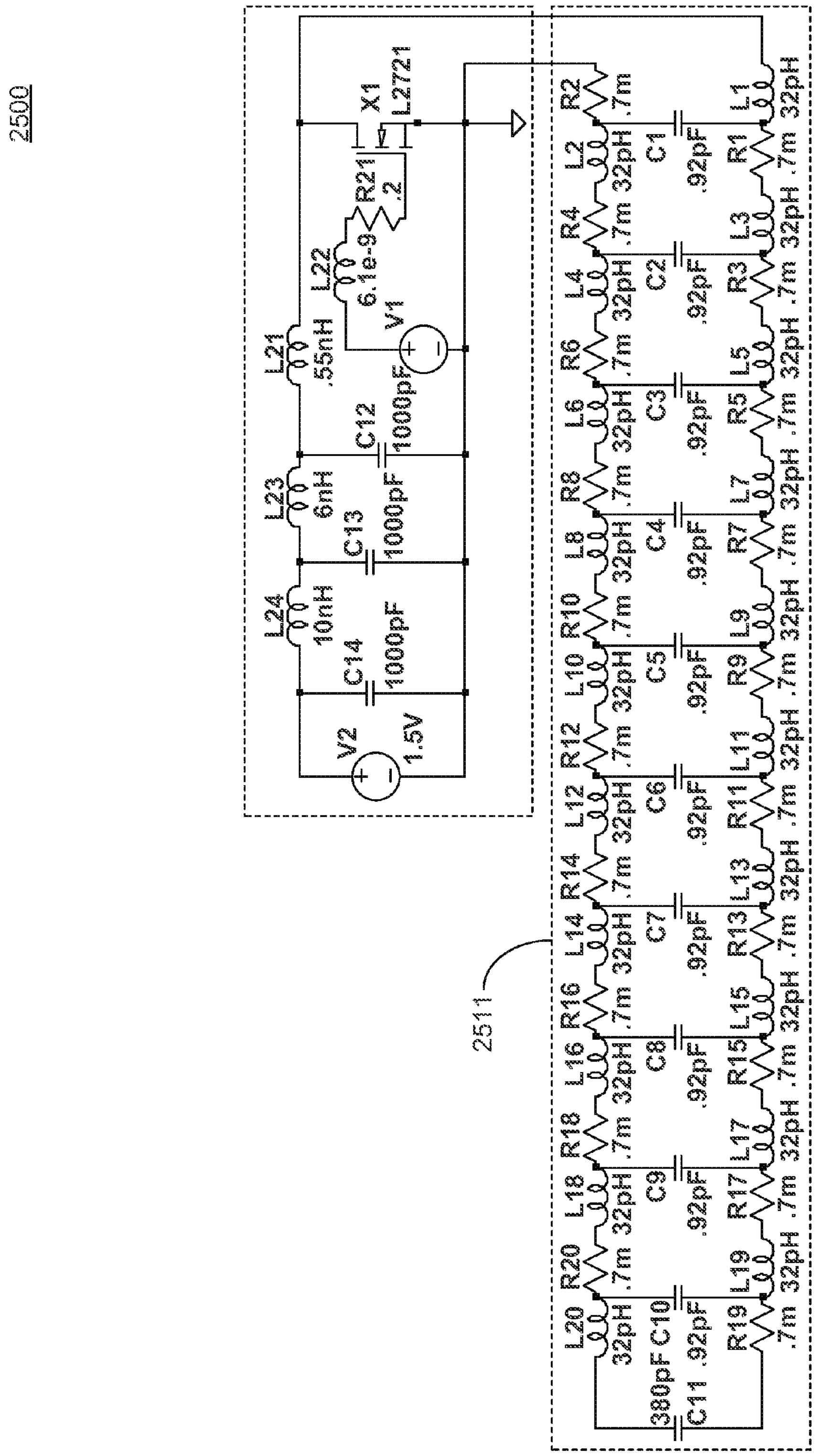
FIG. 25 shows an electrical circuit schematic for a magnetically pumped electrolytic transmission line duct with a capacitively terminated transmission line in accordance with an embodiment of the present invention.

FIG. 25 shows an electrical circuit schematic 2500 for an embodiment of magnetically pumped electrolytic transmission line duct similar to that shown in FIG. 24 that may be used in systems that can be treated as lumped circuits. The transmission line 2511 is terminated with capacitance C11 instead of a short circuit. In an embodiment, the magnitude of the capacitive reactance of C11 is between fifty percent and one hundred and fifty percent of the inductive reactance of transmission line 2511 at the operating frequency.

Figure 26:
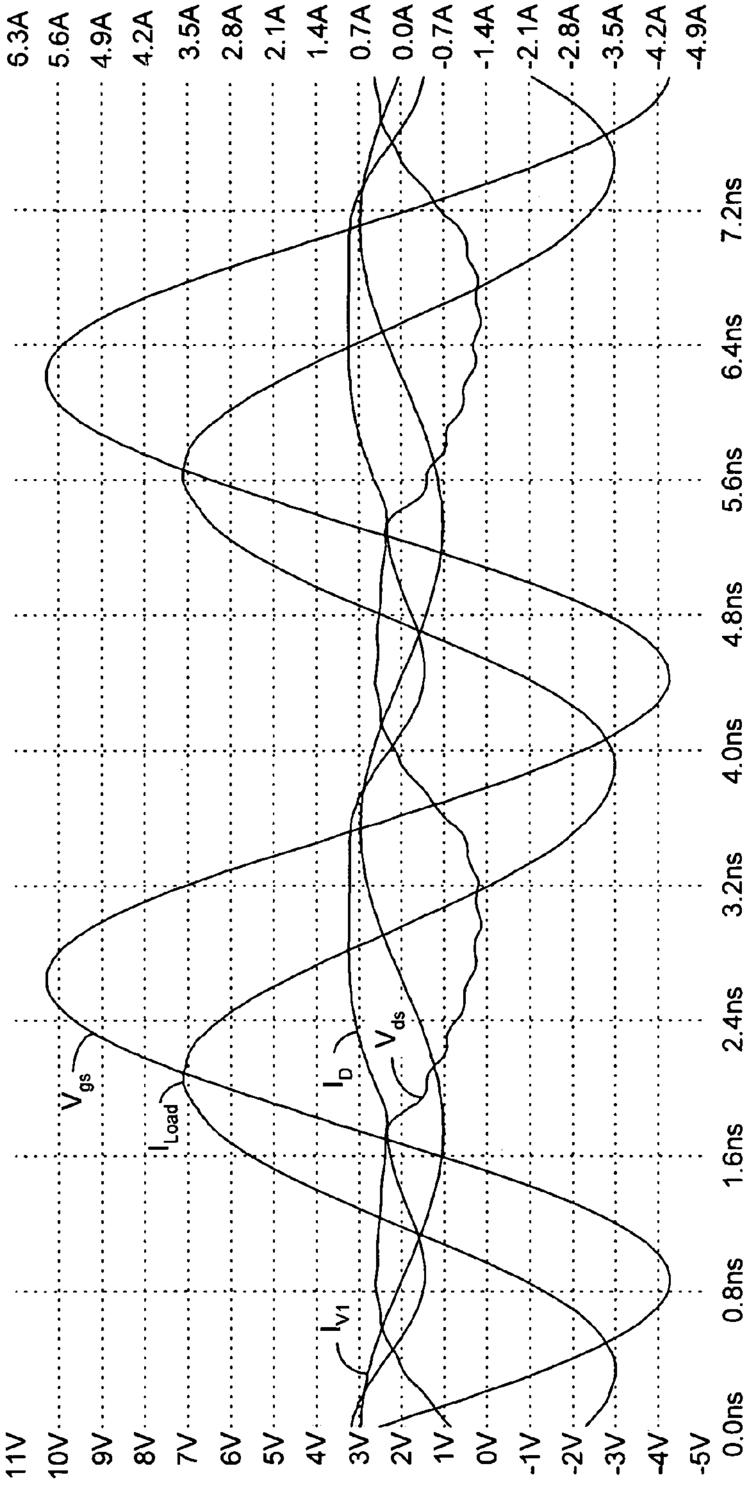
FIG. 26 shows a model waveform plot for the circuit shown in FIG. 24.

FIG. 26 shows an LTSpice model waveform plot 2600 for the circuit shown in FIG. 24. The peak current $I_{Load}$ in the shorted transmission line 2410 is about 3.5 amperes, which is sufficient to produce a magnetic field in excess of 10 gauss at the surface of the cathode 2355 in the above described particular embodiment. Although the L2721 device is not optimized for this particular application, it provides a relatively large drive $I_{Load}$ in relation to an ID of less than one ampere. Both $V_g$ and $I_{V1}$ could be reduced by using a device specifically designed for this application (e.g., a JFET); however, the waveform plot 2600 illustrates the performance that can be obtained with a commercially available device. It should also be noted that the $V_{ds}$ of about 2.6 volts is well below the 36 volt rating of the L2721 device.

Figure 27A:
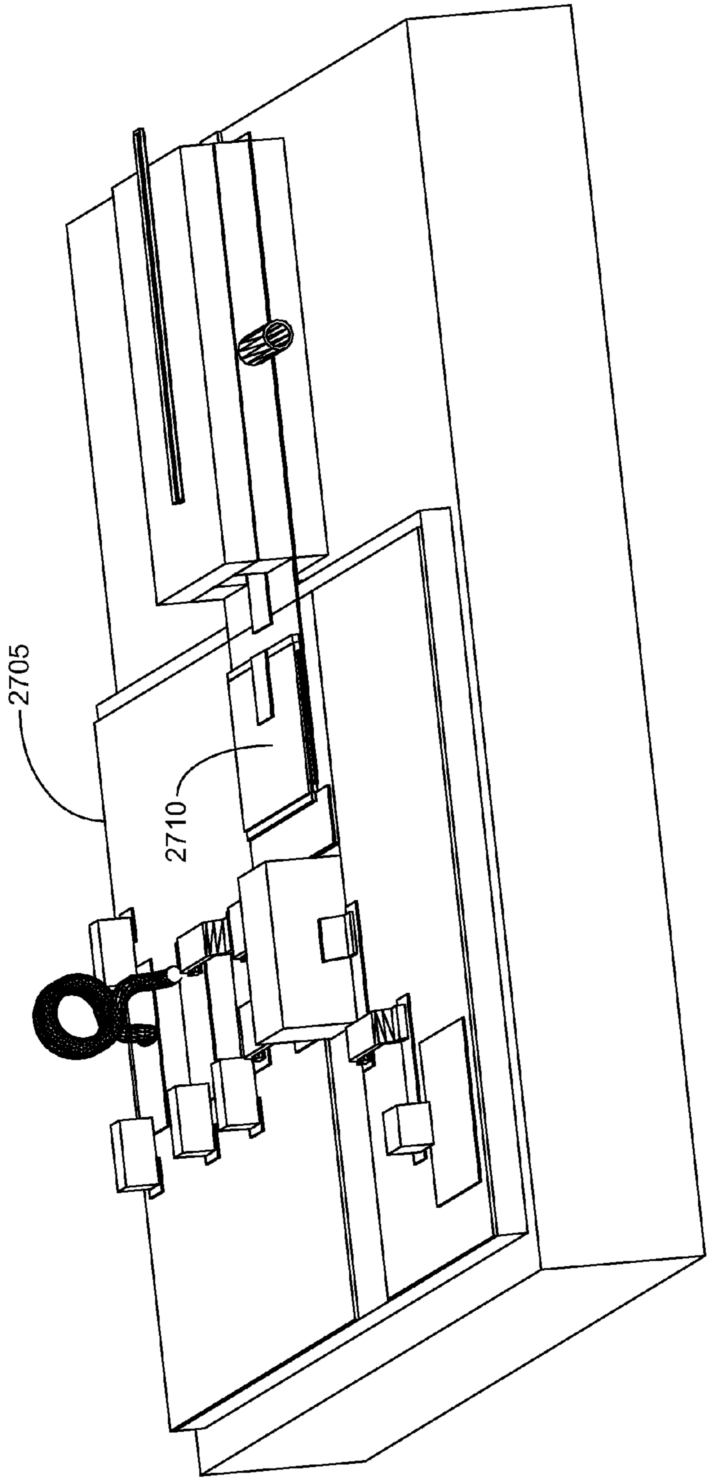
FIG. 27A shows a perspective view of a pumping current circuit board with an integrated capacitor in accordance with an embodiment of the present invention.
Figure 27B:
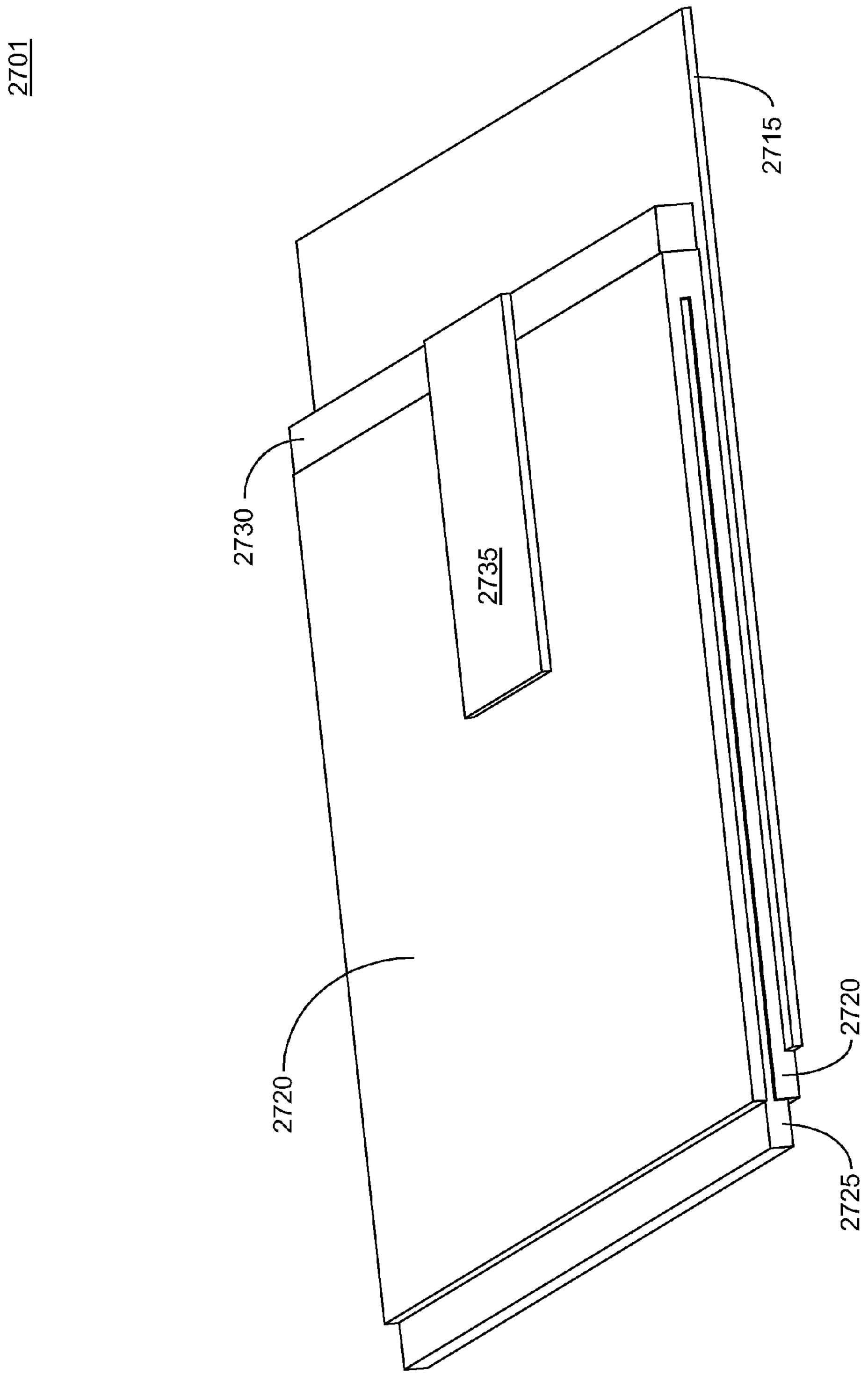
FIG. 27B shows a close-up perspective view of the integrated capacitor shown in FIG. 27A.

FIG. 27A shows a perspective view 2700 of a pumping current circuit board 2705 with an integrated capacitor 2710. Integrated capacitors may be produced by using conductive and dielectric sheets and adhesives. FIG. 27B shows a perspective view of the integrated capacitor 2710 shown in FIG. 27A. A first conductive sheet 2715 is separated from a second conductive sheet 2725 by a dielectric 2720. Conductive sheets 2715 and 2725 may be fabricated from copper. Dielectric 2720 may be alumina-filled polystyrene or epoxy. The dielectric 2720 wraps around the top surface of the second conductive sheet 2725, providing a region where additional conductive material 2735 may be deposited for tuning purposes. The additional material 2735 is coupled to the first conductive sheet 2715 by conductive spacer 2730. The additional material 2735 may be applied as a piece of foil or as a conductive adhesive. Multiple layers of dielectric and conductive materials may be used.

While the invention has been described in detail with reference to preferred embodiments thereof, it will be apparent to one skilled in the art that various changes can be made, and equivalents employed, without departing from the scope of the invention. Various embodiments of power supplies, active switches, transmission line structures, fluid circuits, electrode assemblies, circuit assemblies, and magnets have been disclosed using a variety of components. Monitoring, corrective, and control capabilities may be partitioned between individual modules or components in various ways. Within the scope of the invention, combinations of the aforementioned disclosed components other than those combinations explicitly disclosed may be used in a system for isotope selective chemical reactions.

What is claimed:

1. An electrolytic transmission line duct system comprising:

a transmission line comprising a first conductor and a second conductor, separated by an electrolyte filled gap and a dielectric, wherein said first conductor comprises a wetted length in contact with said electrolyte and said second conductor is isolated from said electrolyte by said dielectric;

a chamber enclosing said electrolyte gap, said chamber comprising an inlet port and an outlet port for providing an electrolyte flow through said electrolyte filled gap; and, wherein said transmission line has an inductance of less than 100 nanohenries, a capacitance greater than 0.1 picofarad, and a characteristic impedance of less than 100 ohms.

2. The electrolytic transmission line duct system of claim 1, further comprising an alternating current source coupled to said transmission line for providing an alternating magnetic field at the surface of said wetted length, wherein said alternating current source has an operating frequency between 10 MHz and 10GHz.

3. The electrolytic transmission line duct system of claim 2, wherein said wetted length is less than one quarter of the effective wavelength associated with said operating frequency.

4. The electrolytic transmission line duct system of claim 3, wherein said wetted length is less than one eighth of the effective wavelength associated with said operating frequency.

5. The electrolytic transmission line duct system of claim 2, wherein said alternating current source comprises a DC voltage source coupled to a transistor by a filter network.

6. The electrolytic transmission line duct system of claim 1, wherein said transmission line is terminated by a short circuit.

7. The electrolytic transmission line duct system of claim 1, wherein said transmission line is terminated by a capacitor.

8. The electrolytic transmission line duct system of claim 1, wherein said first conductor is coupled to an alternating current source by a capacitor.

9. The electrolytic transmission line duct system of claim 1, wherein said electrolyte comprises a deuterated compound.

10. A magnetically pumped electrolytic cell comprising:

a transmission line comprising a first conductor and a second conductor separated by an electrolyte filled gap and a dielectric, wherein said first conductor comprises a wetted cathode length in contact with said electrolyte and said second conductor is isolated from said electrolyte by said dielectric;

a chamber enclosing said wetted cathode length, said chamber comprising an inlet port and an outlet port for providing an electrolyte flow through said electrolyte filled gap;

an electrolytic power supply for reducing a cationic species at the surface of said wetted cathode length, wherein said electrolytic power supply is DC coupled to said first conductor and is also DC coupled to an anode in contact with said electrolyte;

a magnet disposed about said chamber for providing a magnetic flux at the surface of said wetted cathode length; and an alternating current source for providing an alternating magnetic field at the surface of said wetted cathode length coupled to said transmission line, wherein said alternating current source has an operating frequency between 10 MHz and 10GHz.

11. The magnetically pumped electrolytic cell of claim 10, wherein said wetted cathode length is less than one quarter of the effective wavelength associated with said operating frequency.

12. The magnetically pumped electrolytic cell claim 10, wherein said alternating current source comprises a DC voltage source coupled to a transistor by a filter network.

13. The magnetically pumped electrolytic cell of claim 10, wherein said transmission line is terminated by a short circuit.

14. The magnetically pumped electrolytic cell of claim 10, wherein said transmission line is terminated by a capacitor.

15. The magnetically pumped electrolytic cell of claim 10, wherein said first conductor is coupled to said alternating current source by a capacitor.

16. The magnetically pumped electrolytic cell of claim 10, wherein said electrolyte comprises a deuterated compound.

17. The magnetically pumped electrolytic cell of claim 10, wherein said electrolyte comprises a room temperature ionic liquid (RTIL).

18. The magnetically pumped electrolytic cell of claim 10, wherein said electrolyte comprises an aprotic solvent.

19. The magnetically pumped electrolytic cell of claim 10, wherein said electrolyte comprises an actinide.

20. The magnetically pumped electrolytic cell of claim 19, wherein said electrolyte comprises uranium.

21. A magnetically pumped chemical reaction cell comprising:

a magnetic excitation duct;

a working fluid within said magnetic excitation duct;

a catalytic surface disposed within said magnetic excitation duct wherein said working fluid is in contact with said catalytic surface;

a magnet disposed about said magnetic excitation duct for providing a magnetic flux at said catalytic surface; and an alternating current source for providing an alternating magnetic field at said catalytic surface within said magnetic excitation duct, wherein said alternating current source has an operating frequency between 10 MHz and 10 GHz.

22. The magnetically pumped chemical reaction cell of claim 21, wherein said magnetic excitation duct comprises a resonant structure.

23. The magnetically pumped chemical reaction cell of claim 21, wherein said magnetic flux is essentially perpendicular to said alternating magnetic field.

24. The magnetically pumped chemical reaction cell of claim 21, further comprising a photolytic duct segment coupled to said magnetic excitation duct.

25. The magnetically pumped chemical reaction cell of claim 21, wherein said magnetic excitation duct comprises a single-turn solenoid.

26. The magnetically pumped chemical reaction cell of claim 21, wherein said working fluid is an organic solvent.

* * * * *